US012522804B2

(12) United States Patent
Ibuki et al.

(10) Patent No.: US 12,522,804 B2
(45) Date of Patent: Jan. 13, 2026

(54) METHOD FOR PRODUCING PANCREATIC β CELLS

(71) Applicants: KANEKA CORPORATION, Osaka (JP); NATIONAL CENTER FOR GLOBAL HEALTH AND MEDICINE, Tokyo (JP)

(72) Inventors: Masato Ibuki, Kobe (JP); Hirotoshi Matsuta, Kobe (JP); Hitoshi Okochi, Tokyo (JP); Shigeharu Yabe, Tokyo (JP); Satsuki Fukuda, Tokyo (JP)

(73) Assignees: KANEKA CORPORATION, Osaka (JP); NATIONAL CENTER FOR GLOBAL HEALTH AND MEDICINE, Tokyo (JP)

( * ) Notice: Subject to any disclaimer, the term of this patent is extended or adjusted under 35 U.S.C. 154(b) by 1335 days.

(21) Appl. No.: 17/049,362

(22) PCT Filed: Apr. 26, 2019

(86) PCT No.: PCT/JP2019/017978
§ 371 (c)(1),
(2) Date: Oct. 21, 2020

(87) PCT Pub. No.: WO2019/208788
PCT Pub. Date: Oct. 31, 2019

(65) Prior Publication Data
US 2021/0246427 A1    Aug. 12, 2021

(30) Foreign Application Priority Data

Apr. 27, 2018  (JP) .................................. 2018-087226
Dec. 28, 2018  (JP) .................................. 2018-247334

(51) Int. Cl.
*C12N 5/071* (2010.01)

(52) U.S. Cl.
CPC ......... *C12N 5/0676* (2013.01); *C12N 5/0678* (2013.01); *C12N 2501/15* (2013.01); *C12N 2501/155* (2013.01); *C12N 2501/33* (2013.01); *C12N 2501/727* (2013.01); *C12N 2501/998* (2013.01); *C12N 2501/999* (2013.01); *C12N 2506/23* (2013.01)

(58) Field of Classification Search
CPC ............... C12N 5/0676; C12N 5/0678; C12N 2501/15; C12N 2501/155; C12N 2501/33; C12N 2501/727; C12N 2501/998; C12N 2501/999; C12N 2506/23; C12N 2500/25; C12N 2501/115; C12N 2501/119; C12N 2506/45
See application file for complete search history.

(56) References Cited

U.S. PATENT DOCUMENTS 10,633,635 B2 * 4/2020 Rieck ................... A61K 35/39
2017/0362572 A1  12/2017 Rieck et al.

FOREIGN PATENT DOCUMENTS

| JP | 2009-528066 A | 8/2009 |
| WO | WO 2007/103282 A2 | 9/2007 |
| WO | WO 2016/100898 A1 | 6/2016 |
| WO | WO 2017/222879 A1 | 12/2017 |

OTHER PUBLICATIONS

Thermo Fisher catalog, DMEM https://www.thermofisher.com/us/en/home/technical-resources/media-formulation.8.html (Year: 2016).*
Ameri, "FGF signaling in specification of hESC-derived definitive endoderm," Doctoral Dissertation, Lund University, Sweden, Jan. 29, 2010, XP055070092, pp. 1-91.
Extended European Search Report for European Application No. 19792166.1, dated Jan. 7, 2022.
Nostro et al., "Generation of beta cells from human pluripotent stem cells: Potential for regenerative medicine," Seminars in Cell & Developmental Biology, vol. 23, No. 6, Aug. 2012, XP055223341, pp. 701-710 (10 pages total).
International Search Report, issued in PCT/JP2019/017978, PCT/ISA/210, dated Jul. 30, 2019.
Loo et al., "An arduous journey from human pluripotent stem cells to functional pancreatic β cells", Diabetes Obes Metab, 2018, vol. 20, p. 3-13, total 14 pages.
Rezania et al., "Reversal of diabetes with insulin-producing cells derived in vitro from human pluripotent stem cells", Nature Biotechnology, 2014, vol. 32, No. 11, p. 1121-1133, total 17 pages.
Yabe et al., "Efficient generation of functional pancreatic β-cells from human induced pluripotent stem cells", Journal of Diabetes, Feb. 2017, vol. 9, No. 2, p. 168-179.

(Continued)

*Primary Examiner* — Fereydoun G Sajjadi
*Assistant Examiner* — Masudur Rahman
(74) *Attorney, Agent, or Firm* — Birch, Stewart, Kolasch & Birch, LLP

(57) ABSTRACT

A problem addressed by the present invention is to provide a method for producing pancreatic β cells from endothermal cells that have been induced to differentiate from pluripotent stem cells, wherein the method allows the production of pancreatic β cells of high quality, and to provide pancreatic progenitor (PP) cells, pancreatic endocrine precursor (EP) cells, and pancreatic β cells produced by the above-mentioned method. The present invention provides a method for producing pancreatic β cells that includes culturing primitive gut tube (PGT) cells, which have been induced to differentiate from pluripotent stem cells, in the presence of a protein kinase C (PKC) activator, thereby producing posterior foregut (PFG) cells; next culturing the cells in the presence of retinoic acid or an analog thereof, thereby producing pancreatic progenitor (PP) cells; next culturing the cells in the presence of a Notch signaling inhibitor and a ROCK signaling inhibitor, thereby producing pancreatic endocrine precursor (EP) cells; and next culturing the cells in the presence of an insulin receptor signaling activator, transferrin, and selenous acid, thereby producing pancreatic β cells.

10 Claims, 4 Drawing Sheets

Specification includes a Sequence Listing.

(56) References Cited

OTHER PUBLICATIONS

Yabe et al., "Induction of functional islet-like cells from human iPS cells by suspension culture", Regenerative Therapy 10, Jan. 2, 2019, p. 69-76, total 9 pages.

* cited by examiner

METHOD FOR PRODUCING PANCREATIC β CELLS

TECHNICAL FIELD

The present invention relates to a method for producing pancreatic β cells. The present invention also relates to pancreatic progenitor (PP) cells, pancreatic endocrine precursor (EP) cells, and pancreatic β cells produced by the above-mentioned method producing for pancreatic β cells.

BACKGROUND ART

Considerable expectations are being placed on regenerative medicine as an alternative to organ transplantation, which has a donor shortage issue, and in the development of new therapies for intractable diseases and the like. Embryonic stem cells (ES cells) and induced pluripotent stem cells (iPS cells) have pluripotency and infinite proliferative capacity, and are thus expected to be able to serve as cell sources for preparing the cells required for regenerative medicine. In order to put regenerative medicine using such pluripotent stem cells into practice, a technique for efficiently inducing the differentiation of pluripotent stem cells into target somatic cells needs to be established, and various differentiation induction methods have been reported.

For example, pancreatic β cells are useful in cell therapy for diabetes. Thus, methods for efficiently producing pancreatic β cells from pluripotent stem cells have been explored. Non-Patent Document 1 is a review regarding processes for generating functional pancreatic β cells from human iPS cells. Non-Patent Document 2 describes a method for efficiently generating functional pancreatic β cells from human iPS cells. Non-Patent Document 2 describes that, in stage 1, iPS cells were differentiated into endodermal cells; in stage 2, the endodermal cells were induced to differentiate to primitive gut tube (PGT) cells; in stage 3, the cells were induced to differentiate to posterior foregut (PFG) cells; in stage 4, the cells were induced to differentiate to pancreatic progenitor (PP) cells; in stage 5, the cells were induced to differentiate to pancreatic progenitor (PP) cells; and in stage 6, the cells were induced to differentiate to pancreatic β cells.

CITATION LIST

Non-Patent Literature

[Non-Patent Document 1]
  Larry Sai Weng Loo, MSc. et al., *Diabetes Obes Metab.*, 2018:20-3-13
[Non-Patent Document 2]
  Shigeharu G. Yabe et al., *Journal of Diabetes*, 2017 Feb., 9(2):168-179

DISCLOSURE OF INVENTION

Technical Problem

Although, as mentioned above, culturing methods for inducing the differentiation of pluripotent stem cells into pancreatic β cells have been reported, there is a need to improve the differentiation induction efficiency to raise the quality of the cells as pancreatic β cells in terms of the therapeutic effects as cell therapy formulations.

Accordingly, the present invention addresses the problem of providing a method for producing pancreatic β cells from primitive gut tube cells that have been induced to differentiate from pluripotent stem cells, wherein the method makes it possible to efficiently produce pancreatic β cells from the primitive gut tube cells, and also makes it possible for the pancreatic β cells to be of high quality. Furthermore, the present invention addresses the problem of providing pancreatic progenitor (PP) cells, pancreatic endocrine precursor (EP) cells, and pancreatic β cells produced by the above-mentioned method for producing pancreatic β cells.

Solution to Problem

As a result of diligent investigations towards solving the abovementioned problem, the present inventors discovered that primitive gut tube (PGT) cells which have been induced to differentiate from pluripotent stem cells can be induced to differentiate, via posterior foregut (PFG) cells, pancreatic progenitor (PP) cells and pancreatic endocrine precursor (EP) cells, to pancreatic β cells by being cultured, respectively, in prescribed conditions, and that these pancreatic β cells exhibit excellent normalization activity of blood glucose levels in diabetes model mice. The present invention was completed on the basis of this discovery.

In other words, according to the present description, the following invention is provided.

<1> A method for producing pancreatic β cells comprising:
  (a) a step of culturing primitive gut tube (PGT) cells, which have been induced to differentiate from pluripotent stem cells, in the presence of a protein kinase C (PKC) activator, thereby producing posterior foregut (PFG) cells;
  (b) a step of culturing the posterior foregut (PFG) cells in the presence of retinoic acid or an analog thereof, thereby producing pancreatic progenitor (PP) cells;
  (c) a step of culturing the pancreatic progenitor (PP) cells in the presence of a Notch signaling inhibitor and a ROCK signaling inhibitor, thereby producing pancreatic endocrine precursor (EP) cells; and
  (d) a step of culturing the pancreatic endocrine precursor (EP) cells in the presence of an insulin receptor signaling activator, transferrin, and selenous acid, thereby producing pancreatic β cells.

<1-1> A method for producing pancreatic β cells comprising:
  (a) a step of culturing primitive gut tube (PGT) cells, which have been induced to differentiate from pluripotent stem cells, in the presence of a protein kinase C (PKC) activator under culture conditions suitable for inducing differentiation to posterior foregut (PFG) cells, thereby producing posterior foregut (PFG) cells;
  (b) a step of culturing the posterior foregut (PFG) cells in the presence of retinoic acid or an analog thereof under culture conditions suitable for inducing differentiation to pancreatic progenitor (PP) cells, thereby producing pancreatic progenitor (PP) cells;
  (c) a step of culturing the pancreatic progenitor (PP) cells in the presence of a Notch signaling inhibitor and a ROCK signaling inhibitor under culture conditions suitable for inducing differentiation to pancreatic endocrine precursor (EP) cells, thereby producing pancreatic endocrine precursor (EP) cells; and
  (d) a step of culturing the pancreatic endocrine precursor (EP) cells in the presence of an insulin receptor signaling activator, transferrin, and selenous acid under culture conditions suitable for inducing differentiation to pancreatic β cells, thereby producing pancreatic β cells.

<2> The method for producing pancreatic β cells according to <1>, wherein the step of culturing primitive gut tube (PGT) cells, which have been induced to differentiate from pluripotent stem cells, in the presence of a protein kinase C (PKC) activator is performed in the absence of FGF2.

<3> The method for producing pancreatic β cells according to <1> or <2>, wherein the step of culturing pancreatic progenitor (PP) cells in the presence of a Notch signaling inhibitor and a ROCK signaling inhibitor is a step of culturing the cells in a culture medium containing nicotinamide.

<4> The method for producing pancreatic β cells according to any one of <1> to <3>, wherein the step of culturing the pancreatic endocrine precursor (EP) cells in the presence of an insulin receptor signaling activator, transferrin, and selenous acid is performed in the absence of FGF2.

<5> The method according to any one of <1> to <4>, wherein the primitive gut tube (PGT) cells, which have been induced to differentiate from pluripotent stem cells, are cells obtained by a step of culturing pluripotent stem cells under conditions in which the cells can be induced to differentiate to endodermal cells, and a step of culturing the cells under conditions in which the endodermal cells can be induced to differentiate to primitive gut tube (PGT) cells.

<6> The method according to <5>, wherein the step of inducing the differentiation of pluripotent stem cells to endodermal cells is a step of culturing the pluripotent stem cells in a culture medium containing a TGFβ superfamily signaling activator, and thereafter culturing the cells in a culture medium to which FGF2 and BMP4 are not added.

<7> The method according to <5> or <6>, wherein the step of inducing the differentiation of endodermal cells to primitive gut tube (PGT) cells is a step of culturing the endodermal cells in the absence of a bone morphogenetic protein (BMP) signaling inhibitor.

<8> The method producing for pancreatic β cells according to any one of <1> to <7>, wherein the step of culturing primitive gut tube (PGT) cells, which have been induced to differentiate from pluripotent stem cells, in the presence of a protein kinase C (PKC) activator is performed in the absence of a TGF-β signaling inhibitor.

<9> The method for producing pancreatic β cells according to any one of <1> to <8>, wherein the step of culturing primitive gut tube (PGT) cells, which have been induced to differentiate from pluripotent stem cells, in the presence of a protein kinase C (PKC) activator is performed in the presence of at least one of an FGF receptor signaling activator and an insulin receptor signaling activator.

<10> The method for producing pancreatic β cells according to any one of <1> to <9>, wherein the step of culturing primitive gut tube (PGT) cells, which have been induced to differentiate from pluripotent stem cells, in the presence of a protein kinase C (PKC) activator is performed in the presence of at least one of FGF7 and insulin.

<11> The method for producing pancreatic β cells according to any one of <1> to <10>, wherein the step of culturing the posterior foregut (PFG) cells in the presence of retinoic acid or an analog thereof is performed in the presence of at least one of an FGF receptor signaling activator, an insulin receptor signaling activator, a bone morphogenetic protein (BMP) signaling inhibitor, a PKC activator, an HH signaling inhibitor, and a TGF-β receptor signaling inhibitor.

<12> The method for producing pancreatic β cells according to any one of <1> to <11>, wherein the step of culturing the posterior foregut (PFG) cells in the presence of retinoic acid or an analog thereof is performed in the presence of at least one of FGF10, insulin, ILV, SANT1, and RepSox.

<13> The method for producing pancreatic β cells according to any one of <1> to <12>, wherein the step of culturing the posterior foregut (PFG) cells in the presence of retinoic acid or an analog thereof is further performed in the presence of at least one substance selected from zinc and LDN.

<14> The method for producing pancreatic β cells according to any one of <1> to <13>, wherein the step of culturing the pancreatic progenitor (PP) cells in the presence of a Notch signaling inhibitor and a ROCK signaling inhibitor is performed in the presence of at least one substance selected from among an EGF receptor signaling activator, an insulin receptor signaling activator, a GLP-1 (glucagon-like peptide-1) receptor signaling activator, an HH signaling inhibitor, a TGF-β receptor signaling inhibitor, a growth factor stabilizer, and nicotinamide.

<15> The method for producing pancreatic β cells according to any one of <1> to <14>, wherein the step of culturing the pancreatic progenitor (PP) cells in the presence of a Notch signaling inhibitor and a ROCK signaling inhibitor is performed in the presence of at least one substance selected from among EGF, insulin, Exendin 4, SANT1, RepSox, heparin, and nicotinamide.

<16> The method for producing pancreatic β cells according to any one of <1> to <15>, wherein the step of culturing the pancreatic endocrine precursor (EP) cells in the presence of an insulin receptor signaling activator, transferrin, and selenous acid is performed in the presence of at least one substance selected from among a TGF-β superfamily signaling activator, a GLP-1 (glucagon-like peptide-1) receptor signaling activator, a hepatocyte growth factor, an insulin-like growth factor, an adenylate cyclase activator (substance elevating intracellular cAMP concentration), a TGF-β receptor signaling inhibitor, a growth factor stabilizer, and nicotinamide.

<17> The method for producing pancreatic β cells according to any one of <1> to <16>, wherein the step of culturing the pancreatic endocrine precursor (EP) cells in the presence of an insulin receptor signaling activator, transferrin, and selenous acid is performed in the presence of at least one substance selected from among BMP4, Exendin 4, HGF, IGF-1, forskolin, RepSox, heparin, and nicotinamide.

<18> The method for producing pancreatic β cells according to any one of <1> to <17>, wherein the bone morphogenetic protein (BMP) signaling inhibitor is dorsomorphin or LDN193189.

<19> The method for producing pancreatic β cells according to any one of <1> to <18>, wherein the retinoic acid or an analog thereof is EC23.

<20> The method for producing pancreatic β cells according to any one of <1> to <19>, wherein the Notch signaling inhibitor is dibenzazepine (DBZ) and the ROCK signaling inhibitor is Y27632.

<21> Pancreatic progenitor (PP) cells wherein gene expression of the GNAS gene and/or the GCK gene is elevated, and/or expression of the CD44 gene is reduced in comparison with pancreatic progenitor (PP) cells produced by a method including:
(a) a step of culturing primitive gut tube (PGT) cells, which have been induced to differentiate from pluripotent stem cells, in the absence of a protein kinase C (PKC) activator, thereby producing posterior foregut (PFG) cells; and
(b) a step of culturing the posterior foregut (PFG) cells in the presence of retinoic acid or an analog thereof.

<22> Pancreatic endocrine precursor (EP) cells wherein expression of the LIG1 gene is reduced in comparison with pancreatic endocrine precursor (EP) cells produced by a method including:
(a) a step of culturing primitive gut tube (PGT) cells, which have been induced to differentiate from pluripotent stem cells, in the absence of a protein kinase C (PKC) activator, thereby producing posterior foregut (PFG) cells;
(b) a step of culturing the posterior foregut (PFG) cells in the presence of retinoic acid or an analog thereof, thereby producing pancreatic progenitor (PP) cells; and
(c) a step of culturing the pancreatic progenitor (PP) cells in the absence of a Notch signaling inhibitor and a ROCK signaling inhibitor.
<23> Pancreatic β cells wherein expression of at least one or more genes selected from the group consisting of the ADCY1 gene, the ADCY2 gene, and the PLCB4 gene is elevated, and/or expression of the SMAD9 gene is reduced in comparison with pancreatic β cells produced by a method including:
(a) a step of culturing primitive gut tube (PGT) cells, which have been induced to differentiate from pluripotent stem cells, in the absence of a protein kinase C (PKC) activator, thereby producing posterior foregut (PFG) cells;
(b) a step of culturing the posterior foregut (PFG) cells in the presence of retinoic acid or an analog thereof, thereby producing pancreatic progenitor (PP) cells;
(c) a step of culturing the pancreatic progenitor (PP) cells in the absence of a Notch signaling inhibitor and a ROCK signaling inhibitor, thereby producing pancreatic endocrine precursor (EP) cells; and
(d) a step of culturing the pancreatic endocrine precursor (EP) cells in the presence of an insulin receptor signaling activator and transferrin.
<24> The pancreatic β cells according to <23>, wherein the step of culturing the pancreatic endocrine precursor (EP) cells in the presence of an insulin receptor signaling activator and transferrin is a step of culturing the cells in a culture medium containing selenous acid.

Advantageous Effects of Invention

The method for producing pancreatic β cells according to the present invention is able to produce pancreatic β cells, which exhibit excellent normalization activity of blood glucose levels, from primitive gut tube (PGT) cells derived from pluripotent stem cells. Additionally, the pancreatic β cells produced by the present invention exhibit excellent normalization activity of blood glucose levels and are useful as high-quality cell therapy formulations.

BEST MODE FOR CARRYING OUT THE INVENTION

Figure 1:
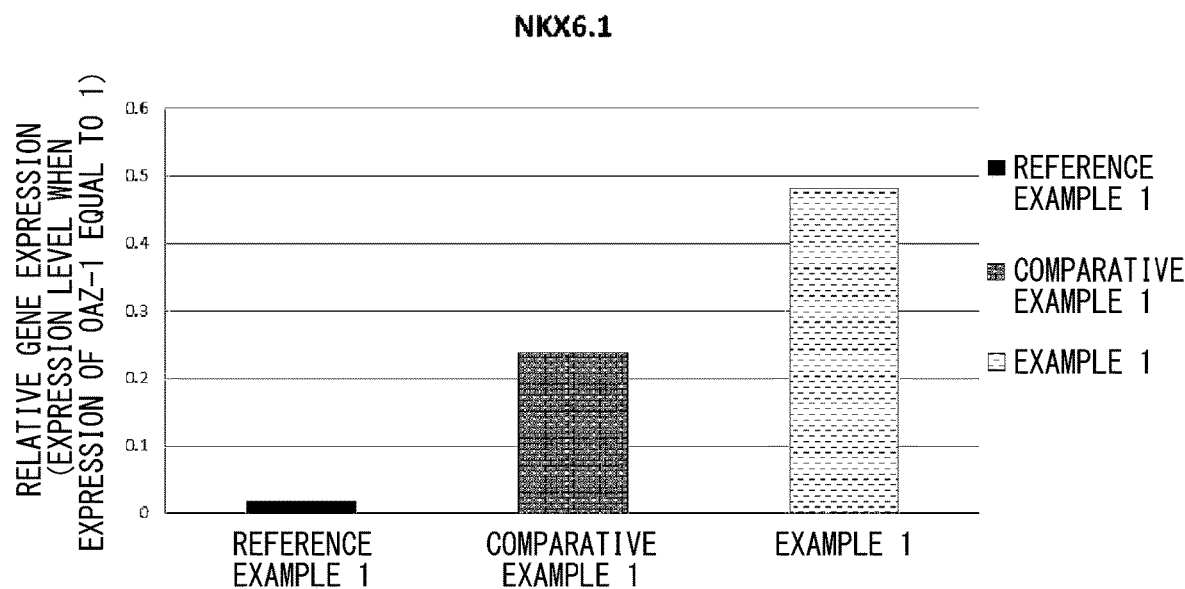
FIG. 1 indicates the results of analysis of the expression of a pancreatic β cell marker gene (NKX6.1) in pancreatic β cells induced to differentiate from human iPS cells.

Hereinafter, embodiments of the present invention will be described in detail, but the following description is to facilitate understanding of the present invention. The scope of the present invention is not limited to the following embodiments, and other embodiments suitably substituted with features of the following embodiments by a person skilled in the art are also included in the scope of the present invention.

[Explanation of Terminology]

In the present invention, "in the absence of an inhibitor" means "in a culture medium to which the inhibitor is not added".

In connection with the culture medium in the present invention, the term "is not added" indicates that a factor such as a protein, a peptide, or a compound specified as not added to a culture or a conditioned medium is not exogenously added. If a factor such as a protein, a peptide, or a compound specified as not added to a culture or a conditioned medium is brought in by continuous culture operation, the amount of the factor is adjusted to be less than 1% (volume/volume), less than 0.5% (volume/volume), less than 0.1% (volume/volume), less than 0.05% (volume/volume), less than 0.01% (volume/volume), or less than 0.001% (volume/volume).

In connection with gene expression levels, the term "elevated" indicates that the expression of a gene is increased over that of a specific gene expression level in a cell population to be compared, and is, relative to the cell population to be compared, 1.1 times or more, 1.2 times or more, 1.3 times or more, 1.4 times or more, 1.5 times or more, 1.6 times or more, 1.7 times or more, 1.8 times or more, 1.9 times or more, 2.0 times or more, 2.1 times or more, 2.2 times or more, 2.3 times or more, 2.4 times or more, 2.5 times or more, 2.6 times or more, 2.7 times or more, 2.8 times or more, 2.9 times or more, 3.0 times or more, 3.1 times or more, 3.2 times or more, 3.3 times or more, 3.4 times or more, 3.5 times or more, 3.6 times or more, 3.7 times or more, 3.8 times or more, 3.9 times or more, 4.0 times or more, 4.1 times or more, 4.2 times or more, 4.3 times or more, 4.4 times or more, 4.5 times or more, 4.6 times or more, 4.7 times or more, 4.8 times or more, 4.9 times or more, 5.0 times or more, 5.1 times or more, 5.2 times or more, 5.3 times or more, 5.4 times or more, 5.5 times or more, 5.6 times or more, 5.7 times or more, 5.8 times or more, 5.9 times or more, 6.0 times or more, 6.1 times or more, 6.2 times or more, 6.3 times or more, 6.4 times or more, 6.5 times or more, 6.6 times or more, 6.7 times or more, 6.8 times or more, 6.9 times or more, 7.0 times or more, 7.1 times or more, 7.2 times or more, 7.3 times or more, 7.4 times or more, 7.5 times or more, 7.6 times or more, 7.7 times or more, 7.8 times or more, 7.9 times or more, 8.0 times or more, 8.1 times or more, 8.2 times or more, 8.3 times or more, 8.4 times or more, 8.5 times or more, 8.6 times or more, 8.7 times or more, 8.8 times or more, 8.9 times or more, 9.0 times or more, 9.1 times or more, 9.2 times or more, 9.3 times or more, 9.4 times or more, 9.5 times or more, 9.6 times or more, 9.7 times or more, 9.8 times or more, 9.9 times or more, 10.0 times or more, 20 times or more, 30 times or more, 40 times or more, 50 times or more, 60 times or more, 70 times or more, 80 times or more, 90 times or more, 100 times or more, 250 times or more, 500 times or more, 750 times or more, 1000 times or more, 5000 times or more, or 10000 times or more.

In connection with gene expression levels, the term "reduced" indicates that the expression of a gene is reduced from that of a specific gene expression level in a cell population to be compared, and is, relative to the cell population to be compared, 1.1 times or less, 1.2 times or less, 1.3 times or less, 1.4 times or less, 1.5 times or less, 1.6 times or less, 1.7 times or less, 1.8 times or less, 1.9 times or less, 2.0 times or less, 2.1 times or less, 2.2 times or less, 2.3 times or less, 2.4 times or less, 2.5 times or less, 2.6 times or less, 2.7 times or less, 2.8 times or less, 2.9 times or less, 3.0 times or less, 3.1 times or less, 3.2 times or less, 3.3 times or less, 3.4 times or less, 3.5 times or less, 3.6 times or less, 3.7 times or less, 3.8 times or less, 3.9 times or less, 4.0 times or less, 4.1 times or less, 4.2 times or less, 4.3 times or less, 4.4 times or less, 4.5 times or less, 4.6 times or less, 4.7 times or less, 4.8 times or less, 4.9 times or less, 5.0 times or less, 5.1 times or less, 5.2 times or less, 5.3 times or less, 5.4 times or less, 5.5 times or less, 5.6 times or less, 5.7 times or less, 5.8 times or less, 5.9 times or less, 6.0 times or less, 6.1 times or less, 6.2 times or less, 6.3 times or less, 6.4 times or less, 6.5 times or less, 6.6 times or less, 6.7 times or less, 6.8 times or less, 6.9 times or less, 7.0 times or less, 7.1 times or less, 7.2 times or less, 7.3 times or less, 7.4 times or less, 7.5 times or less, 7.6 times or less, 7.7 times or less, 7.8 times or less, 7.9 times or less, 8.0 times or less, 8.1 times or less, 8.2 times or less, 8.3 times or less, 8.4 times or less, 8.5 times or less, 8.6 times or less, 8.7 times or less, 8.8 times or less, 8.9 times or less, 9.0 times or less, 9.1 times or less, 9.2 times or less, 9.3 times or less, 9.4 times or less, 9.5 times or less, 9.6 times or less, 9.7 times or less, 9.8 times or less, 9.9 times or less, 10.0 times or less, 20 times or less, 30 times or less, 40 times or less, 50 times or less, 60 times or less, 70 times or less, 80 times or less, 90 times or less, 100 times or less, 250 times or less, 500 times or less, 750 times or less, 1000 times or less, 5000 times or less, or 10000 times or less.

<Aggregate>

The aggregate in the present invention may be referred to alternatively by the term "clump", "cluster", or "spheroid", and generally refers to an assemblage of a group of cells that are not dissociated into single cells.

<Pluripotent Stem Cell>

The pluripotent stem cells in the present invention refer to cells that have multilineage differentiation potential (pluripotency), being able to differentiate into all or multiple types of cells constituting a living body, and that can continue to proliferate endlessly while maintaining pluripotency in an in-vitro culture under suitable conditions. Specific examples thereof include embryonic stem cells (ES cells), pluripotent stem cells derived from embryonic primordial germ cells (EG cells; see *Proc Natl Acad Sci USA*, 1998, 95:13726-31), pluripotent stem cells derived from the spermary (GS cells; see *Nature*, 2008, 456:344-9), induced pluripotent stem cells (iPS cells), somatic stem cells (tissue stem cells), and the like. The pluripotent stem cells are preferably iPS cells or ES cells, and are more preferably iPS cells. The term "embryonic" refers to embryos derived by somatic nuclear transfer in addition to embryos derived by syngamy.

As the ES cells, it is possible to use cells derived from any warm-blooded animal, preferably a mammal. Examples of the mammals include mice, rats, guinea pigs, hamsters, rabbits, cats, dogs, sheep, swine, bovines, horses, goats, simians, and humans. Cells derived from humans are preferably used.

Specific examples of ES cells include ES cells of mammals or the like established by culturing early embryos before implantation, ES cells established by culturing early embryos produced by nuclear transfer of the nuclei of somatic cells, and ES cells obtained by modifying genes on chromosomes of these ES cells using genetic engineering techniques. The ES cells can be prepared in accordance with methods normally implemented in the relevant field and in publicly known documents. Mouse ES cells were established by Evans et al. (Evans et al., 1981, *Nature* 292:154-6) and Martin et al. (Martin, G. R. et al., 1981, *Proc Natl Acad Sci* 78: 7634-8) in 1981. Human ES cells were established by Thomson et al. (Thomson et al., *Science*, 1998, 282:1145-7) in 1998, and are available from WiCell Research Institute (website: http://www.wicell.org/, Madison, Wisconsin, USA), the National Institute of Health in the USA, Kyoto University, or the like, or can be purchased, for example, from Cellartis (website: http://www.cellartis.com/, Sweden).

Induced pluripotent stem cells (iPS cells) are cells having pluripotency, obtained by reprogramming somatic cells. Multiple groups have succeeded in producing iPS cells, including such groups as the group including professor Shinya Yamanaka at Kyoto University, the group including Rudolf Jaenisch at the Massachusetts Institute of Technology, the group including James Thomson at the University of Wisconsin, and the group including Konrad Hochedlinger at Harvard University. For example, the international patent publication WO 2007/069666 describes a somatic nucleus reprogramming factor containing the gene products of an Oct family gene, a Klf family gene, and a Myc family gene, as well as a somatic nucleus reprogramming factor containing the gene products of an Oct family gene, a Klf family gene, a Sox family gene, and a Myc family gene. The publication further describes a method for producing induced pluripotent stem cells by reprogramming somatic nuclei, comprising a step of bringing the above-mentioned nucleus reprogramming factors into contact with somatic cells.

The types of somatic cells used for producing the iPS cells are not particularly limited, and any type of somatic cell may be used. Specifically, the somatic cells include all cells constituting a living body other than reproductive cells, and may be differentiated somatic cells or undifferentiated stem cells. The somatic cells may be from any of mammals, birds, fish, reptiles, and amphibians, and there are no particular limitations. However, they are preferably from mammals (for example, rodents such as mice, or primates such as humans), and are particularly preferably from mice or humans. When human somatic cells are used, somatic cells from fetuses, newborns, or adults may be used. Specific examples of somatic cells include fibroblasts (for example, dermal fibroblasts), epithelial cells (for example, gastric epithelial cells, liver epithelial cells, and alveolar epithelial cells), endothelial cells (for example, blood vessels and lymph vessels), nerve cells (for example, neurons and glial cells), pancreatic cells, white blood cells (B cells, T cells, etc.), marrow cells, muscle cells (for example, skeletal muscle cells, smooth muscle cells, and cardiac muscle cells), hepatic parenchymalcells, non-hepatic parenchymal cells, adipose cells, osteoblasts, cells constituting the periodontium (for example, periodontal membrane cells, cementoblasts, gingival fibroblasts, and osteoblasts), and cells constituting the kidneys, the eyes and the ears.

iPS cells are stem cells having the ability to self-replicate over a long period of time under prescribed culture conditions (for example, under the conditions for culturing ES cells) and having multipotency for differentiation into any of ectodermal cells, mesodermal cells, or endodermal cells, under prescribed differentiation induction conditions. Additionally, when the iPS cells are transplanted to test animals such as mice, they may be stem cells having the ability to form teratomas.

To produce iPS cells from somatic cells, at least one or more reprogramming genes are first introduced into the somatic cells. The reprogramming genes are genes encoding reprogramming factors having the function of reprogramming the somatic cells so as to become iPS cells. Specific examples of combinations of reprogramming genes include, but are not limited to, the following combinations:
  (i) an Oct gene, a Klf gene, a Sox gene, and a Myc gene;
  (ii) an Oct gene, a Sox gene, a NANOG gene, and a LIN28 gene;
  (iii) an Oct gene, a Klf gene, a Sox gene, a Myc gene, a hTERT gene, and a SV40 large T gene; or
  (iv) an Oct gene, a Klf gene, and a Sox gene.

Aside from the above, a method in which transgenes are further reduced (*Nature*, 2008 Jul. 31, 454(7204):646-50), a method using a low-molecular-weight compound (*Cell Stem Cell*, 2009 Jan. 9, 4(1):16-9; *Cell Stem Cell*, 2009 Nov. 6, 5(5):491-503), a method using transcription factor proteins instead of genes (*Cell Stem Cell*, 2009 May 8, 4(5):381-4), and the like have been reported, and the iPS cells may be iPS cells produced by any of these methods.

Although the mode of introduction of the reprogramming factors into cells is not particularly limited, examples include gene transfer using plasmids, transfection with synthetic RNA, and direct introduction of the proteins. Additionally, iPS cells produced by methods using microRNA or RNA, low-molecular-weight compounds, or the like may be used. The pluripotent stem cells, including ES cells and iPS cells, may be commercially available products or cells received by distribution, or may be newly produced.

As the iPS cells, it is possible to use, for example, the 253G1 cell line, the 253G4 cell line, the 201B6 cell line, the 201B7 cell line, the 409B2 cell line, the 454E2 cell line, the 606A1 cell line, the 610B1 cell line, the 648A1 cell line, the 1201C1 cell line, the 1205D1 cell line, 1210B2 cell line, the 1231A3 cell line, the 1383D2 cell line, the 1383D6 cell line, the iPS-TIG120-3f7 cell line, the iPS-TIG120-4f1 cell line, the iPS-TIG114-4f1 cell line, the RPChiPS771-2 cell line, the 15M63 cell line, the 15M66 cell line, the HiPS-RIKEN-1A cell line, the HiPS-RIKEN-2A cell line, the HiPS-RIKEN-12A cell line, the Nips-B2 cell line, the TkDN4-M cell line, the TkDA3-1 cell line, the TkDA3-2 cell line, the TkDA3-4 cell line, the TkDA3-5 cell line, the TkDA3-9 cell line, the TkDA3-20 cell line, the hiPSC 38-2 cell line, the MSC-iPSC1 cell line, the BJ-iPSC1 cell line, and the like.

As the ES cells, it is possible to use, for example, the KhES-1 cell line, the KhES-2 cell line, the KhES-3 cell line, the KhES-4 cell line, the KhES-5 cell line, the SEES1 cell line, the SEES2 cell line, the SEES3 cell line, the HUES8 cell line, the CyT49 cell line, the H1 cell line, the H9 cell line, the HS-181 cell line, and the like. Newly produced clinical-grade iPS cells or ES cells may also be used.

<Endodermal Cell>

Endodermal cells have the ability to differentiate into the tissues of organs such as the digestive tract, the lung, the thyroid gland, the pancreas, and the liver, the cells of secretory glands opening onto the digestive tract, and the peritoneum, the pleura, the larynx, the auditory tube, the trachea, the bronchi, and the urinary tract (most of the bladder and the urethra, and part of the ureter). In general, they are sometimes referred to as the definitive endoderm (DE). Differentiation from pluripotent stem cells to endodermal cells can be confirmed by measuring the expression levels of genes specific to endodermal cells. Examples of genes specific to endodermal cells include SOX17, FOXA2, CXCR4, AFP, GATA4, EOMES, and the like. In the present description, endodermal cells are sometimes referred to alternatively as the definitive endoderm.

<Primitive Gut Tube Cell>

Primitive gut tube cells form the foregut, the midgut, and the hindgut. The midgut is connected to the yolk sac and the extraembryonic allantois branches from the hindgut. Additionally, the pharynx in the respiratory system is also formed from the foregut. There are organs, such as the stomach and the intestines, into which the gut tubes directly differentiate, and those like the liver, the gall bladder, the pancreas, (the spleen (lymphoid organs)), and the like that are formed by budding from gut tubes. The differentiation from endodermal cells to primitive gut tube cells can be confirmed by measuring the expression levels of genes that are specific to primitive gut tube cells. Examples of genes that are specific to primitive gut tube cells include HNF-1β, HNF-4a, and the like.

<Posterior Foregut (PFG) Cell>

The differentiation from primitive gut tube cells to posterior foregut cells can be confirmed by measuring the expression levels of genes specific to posterior foregut cells. Examples of genes specific to posterior foregut cells include PDX1, HNF6, and the like.

In the PFG cells of the present invention, it is preferable for gene expression related to the pathway "Maturity onset diabetes of the young" to be elevated. For example, it is preferable for the expression levels of the genes indicated in Table 1 to be elevated in comparison with PFG cells prepared by existing methods. Additionally, it is preferable for gene expression related to the pathways "Viral myocarditis" and "Proteoglycans in cancer" to be reduced. For example, it is preferable for the expression levels of the genes indicated in Tables 2 and 3 to be reduced in comparison with PFG cells prepared by existing methods.

<Pancreatic Progenitor (PP) Cell>

Pancreatic progenitor cells are cells that are differentiated from posterior foregut cells, the cells being able to differentiate to pancreatic exocrine cells and endocrine cells. The differentiation from posterior foregut cells to pancreatic progenitor cells can be confirmed by measuring the expression levels of genes specific to pancreatic progenitor cells. Examples of genes specific to pancreatic progenitor cells include PDX1, NKX6.1, and the like.

In the PP cells of the present invention, it is preferable for gene expression related to the pathway "Maturity onset diabetes of the young", the pathway "Morphine addiction", the pathway "GABAergic synapse", the pathway "Dopaminergic synapse", the pathway "Retrograde endocannabinoid signaling", the pathway "Serotonergic synapse", the pathway "Insulin secretion", the pathway "Glutamatergic synapse", the pathway "Circadian entrainment", the pathway "Amphetamine addiction", the pathway "Neuroactive ligand-receptor interaction", the pathway "cAMP signaling pathway", and the pathway "Alcoholism" to be elevated. For example, it is preferable for the expression levels of the genes indicated in Tables 4 to 16 to be elevated in comparison with PP cells prepared by existing methods. Additionally, it is preferable for gene expression related to the pathway "p53 signaling pathway", the pathway "Focal adhesion", the pathway "PI3K-Akt signaling pathway", the pathway "ECM-receptor interaction", and the pathway "Graft-versus-host disease" to be reduced. For example, it is preferable for the expression levels of the genes indicated in Tables 17 to 21 to be reduced in comparison with PP cells prepared by existing methods.

As examples of the pancreatic progenitor (PP) cells in the present invention, there are cells in which the gene expression of the GNAS gene and/or the GCK gene is elevated and/or the expression of the CD44 gene is reduced in comparison with pancreatic progenitor (PP) cells produced by the method of Reference Example 1 to be described below.

<Pancreatic Endocrine Precursor (EP) Cell>

Pancreatic endocrine precursor cells are cells that are differentiated from pancreatic progenitor cells, the cells being able to differentiate to pancreatic endocrine cells (α cells, β cells, δ cells, ε cells, PP cells, etc.). The differentiation to pancreatic endocrine precursor cells can be confirmed by measuring the expression levels of genes specific to pancreatic endocrine precursor cells. Examples of genes specific to pancreatic endocrine precursor cells include PDX1, NKX6.1, NeuroG3, NeuroD1, and the like.

In the EP cells of the present invention, it is preferable for gene expression related to the pathway "Insulin secretion", the pathway "Maturity onset diabetes of the young", the pathway "GABAergic synapse", the pathway "Dopaminergic synapse", the pathway "Synaptic vesicle cycle", the pathway "Glutamatergic synapse", the pathway "Retrograde endocannabinoid signaling", the pathway "cAMP signaling pathway", the pathway "Circadian entrainment", the pathway "Serotonergic synapse", the pathway "Alcoholism", and the pathway "Morphine addiction" to be elevated. For example, it is preferable for the expression levels of the genes indicated in Tables 22 to 34 to be elevated in comparison with EP cells prepared by existing methods. Additionally, it is preferable for gene expression related to the pathway "DNA replication", the pathway "Cell cycle", the pathway "Pathways in cancer", the pathway "Mismatch repair", the pathway PI3K-Akt signaling pathway", the pathway "p53 signaling pathway", the pathway "Fanconi anemia pathway", the pathway "Homologous recombination", the pathway "ECM-receptor interaction", and the pathway "Small cell lung cancer" to be reduced. For example, it is preferable for the expression levels of the genes indicated in Tables 34 to 43 to be reduced in comparison with EP cells prepared by existing methods. As examples of the pancreatic endocrine precursor (EP) cells in the present invention, there are cells in which the expression of the LIG1 gene is reduced in comparison with pancreatic endocrine precursor (EP) cells produced by the method of Reference Example 1.

<Pancreatic β Cell>

Pancreatic β cells are cells that are differentiated from pancreatic endocrine precursor cells, the cells secreting insulin. The differentiation from pancreatic endocrine precursor cells to pancreatic β cells can be confirmed by measuring the expression levels of genes specific to pancreatic β cells. Examples of genes specific to pancreatic β cells include insulin, NKX6.1, MAFA, PDX1, and the like.

In the pancreatic β cells of the present invention, it is preferable for gene expression related to the pathway "Dopaminergic synapse", the pathway "Insulin secretion", the pathway "Synaptic vesicle cycle", the pathway "GABAergic synapse", the pathway "Synaptic vesicle cycle", the pathway "GABAergic synapse", the pathway "Glutamatergic synapse", the pathway "Retrograde endocannabinoid signaling", the pathway "Circadian entrainment", the pathway "Alcoholism", the pathway "Serotonergic synapse", the pathway "Cholinergic synapse", the pathway "Morphine addiction", the pathway "Adrenergic signaling in cardiomyocytes", and the pathway "Maturity onset diabetes of the young" to be elevated. For example, it is preferable for the expression levels of the genes indicated in Tables 45 to 56 to be elevated in comparison with pancreatic β cells prepared by existing methods. Additionally, it is preferable for gene expression related to the pathway "Cell cycle", the pathway "ECM-receptor interaction", the pathway "PI3K-Akt signaling pathway", the pathway "Proteoglycans in cancer", the pathway "Pathways in cancer", the pathway "Focal adhesion", the pathway "DNA replication", and the pathway "TGF-beta signaling pathway" to be reduced. For example, it is preferable for the expression levels of the genes indicated in Tables 57 to 64 to be reduced in comparison with pancreatic β cells prepared by existing methods.

Details regarding the pathways can be referenced at "KEGG pathway" (http://www.genome.jp/kegg/pathway.html).

As examples of the pancreatic β cells in the present invention, there are cells in which the expression of at least one or more genes selected from the group consisting of the ADCY1 gene, the ADCY2 gene, and the PLCB4 gene is elevated and/or the expression of the SMAD9 gene is reduced in comparison with pancreatic β cells produced by the method of Reference Example 1.

<Signaling and Factors>

(Protein Kinase C (PKC) Activator)

PKC is a protein associated with the control of many cell functions such as cell proliferation and cell death, gene transcription and translation, cell morphology, intercellular contact, and the like. PKC is a type of protein kinase that phosphorylates hydroxyl groups in serine residues and threonine residues in matrix proteins, and there are at least ten or more isozymes thereof. The isozymes are classified in three sub-families, namely, classical, novel, and atypical, depending on the structures, the activation mechanisms, and the bioactivity thereof. The classical PKC isozymes (α, βI, βII, and γ) require diacyl glycerol (DAG) and $Ca^{2+}$ for the activation thereof. DAG is generated together with inositol 1,4,5-triphosphate (IP3) by the hydrolysis of phosphatidyl inositol 4,5-diphosphate (PIP2) by means of phospholipase C (PLC). When IP3 disperses in a cell and binds to an IP3-sensitive $Ca^{2+}$ channel in the endoplasmic reticulum, the $Ca^{2+}$ ions are released into the cytoplasm. When these $Ca^{2+}$ ions bind with PKC, the PKC moves into the cell membrane. There, PKC interacts with DAG at the C1 domain. Then, the PKC undergoes a structural change in which the regulatory region is separated from the catalytic domain thereof, and thus becomes active. The novel PKC isozymes (δ, ε, θ, and η) are activated only by DAG. This is due to the fact that the affinity of the C1 domain in novel PKC isozymes to DAG is much higher than that of the classical types. The atypical PKC isozymes (ζ, Mζ, and 1/λ) do not require either DAG or $Ca^{2+}$, for the activation thereof, and are activated by means of second messengers that are various lipid metabolism products (Khalil, 2010; Wu-Zhang and Newton, 2013; Mochly-Rosen et al., 2012).

The PKC activator may be any substance that activates at least one or more PKC isozymes among the above-mentioned PKC isozymes.

Although the PKC activator is not particularly limited, it is possible to use, for example, indolactam V (ILV), okadaic acid, phorbol-12-myristate 13-acetate (PMA), bryostatin 1, 1-alpha,25-dihydroxyvitamin $D_3$, prostratin, 1,2-dioctanoyl-sn-glycerol, 1-oleoyl-2-acetyl-sn-glycerol (OAG), oleic acid, ingenol 3-angelate, DCP-LA, PIP2, phorbol-12,13-dibutyrate, 8(S)-HETE, and derivatives thereof.

(Notch Signaling Inhibitor)

Notch signaling is highly involved in the survival, the proliferation and the differentiation of many cells, and is also involved in ontogeny together with cytokine/tyrosine kinase, Wnt, the TGF-β family/Smad, hedgehog, and integrin. Abnormalities in Notch signaling are also associated with carcinogenesis, the proliferation of cancer cells, and the survival of cancer stem cells. Notch receptor is a single-pass transmembrane protein that comprises a functional extracellular domain (NECD), a transmembrane domain (TM), and an intracellular domain (NICD). As a result of processing of Notch receptor in the endoplasmic reticulum (ER) and the Golgi body in a cell that receives a signal, cleavage occurs (S1 cleavage), and furthermore, a glycan binds thereto, generating a heterodimer that is stabilized by calcium ions ($Ca^{2+}$), but this is formed from the NECD, which is attached by non-covalently bonding to the TM-NICD inserted in the membrane. The receptor that has been processed in this way is next transferred to the cell membrane, and it becomes possible for a ligand to bind thereto. In mammals, members of the Delta-like (DLL1, DLL3, and DLL4) and Jagged (JAG1 and JAG2) families, which are present in the cells sending the signals, function as ligands for the Notch signal receptors. When a ligand binds thereto, the NECD is immediately cleaved (S2 cleavage) from the TM-NICD domain by TACE (ADAM metal protease TNF-α converting enzyme). This NECD keeps the ligand in a bound state, and this complex undergoes endocytosis and recycling/degradation in the cell on the signal-transmitting side. In the cell on the signal-receiving side, γ-secretase (also involved in Alzheimer's disease) releases (S3 cleavage) the NICD from the TM, as a result of which the NICD is translocated into the nucleus, where it is associated with a CSL (CBF1/Su(H)/Lag-1) family transcription factor complex. As a result thereof, Myc, p21, and HES family members, which are standard Notch target genes, are subsequently activated.

Examples of the Notch signaling inhibitor include IMR-1, FLI-06, crenigacestat (LY3039478), and the like. Additionally, γ-secretase inhibitors such as DBZ (dibenzazepine), DAPT (N-[N-(3,5-difluorophenacetyl-L-alanyl)]-(S)-phenylglycine t-butyl ester), LY411575, dibenzazepine (YO-01027), R04929097, nirogacestat (PF-03084014, PF-3084014), L-685,458, semagacestat (LY450139), avagacestat (BMS-708163), MK-0752, and the like may also be used as the Notch signaling inhibitor.

(ROCK Signaling Inhibitor)

ROCK (rho-associated coiled-coil-forming kinase/rho-binding kinase) converts myosin light chains to an activated structure by means of phosphorylation of the myosin light chains and myosin light chain phosphatase. Furthermore, ROCK deactivates cofilin, which is an actin-depolymerizing factor, by phosphorylation of LIM kinase, thus suppressing actin deopolymerization. In addition thereto, ROCK phosphorylates many substrates and is involved in diverse biological functions such as cell motility, cell polarity, cell adhesion, cell division, apoptosis, and transcriptional regulation. Examples of ROCK signaling inhibitors include Y27632, thiazovivin, fasudil (HA-1077) HCl, GSK429286A, RKI-1447, GSK180736A (GSK180736), hydroxyfasudil (HA-1100) HCl, Y-399983 HCl, netarsudil (AR-13324) 2HCl, GSK269962 A HCl, Ripasudil (K-115) hydrochloride dihydrate, KD025 (SLx-2119), AT13148, and the like.

(Bone Morphogenetic Protein (BMP) Signaling Inhibitor)

Bone morphogenetic protein (BMP) signals are signals that are mediated by bone morphogenetic protein (BMP) ligands, serving various roles in vertebrates. During embryogenesis, the dorsoventral axis is established by a BMP signaling gradient formed by the coordinated expression of ligands, receptors, coreceptors, and soluble antagonists. BMP is a regulator that is important for gastrulation, mesodermal induction, organogenesis, and cartilaginous bone formation, and that controls the fates of pluripotent stem cell populations.

BMP receptors comprise complexes of type I receptors (activin receptor-like kinase; ALK-1, ALK-2, ALK-3 or ALK-6) and type II receptors (ActRII, ActRIIB or BMPRII), and the activated type I receptor kinases cause phosphorylation of two serine residues located on the C terminus of the R-Smad (receptor-regulated Smad) protein. An R-Smad (Smad1, Smad5 or Smad8) that is phosphorylated by the ligand (BMP) binding to a receptor is called a BR-Smad (BMP R-Smad). Two molecules of R-Smad that have been phosphorylated form a heterotrimer with Smad4 and undergo nuclear translocation, thereby regulating the transcription of target genes.

The bone morphogenetic protein (BMP) signaling inhibitor is not particularly limited as long as it is a substance that inhibits BMP signaling, which begins with ligands (BMP-4 or the like) binding to receptors. However, it is preferably a substance that inhibits at least one of ALK-1, ALK-2, ALK-3, and ALK-6. Additionally, a substance that inhibits a ligand binding to a receptor (such as an antagonist antibody) may be used as the BMP signaling inhibitor.

The bone morphogenetic protein (BMP) signaling inhibitor is not particularly limited, but inhibitors and the like that act on I-type receptors (ALK-1, ALK-2, ALK-3, or ALK-6) can effectively inhibit BMP signaling, and examples include dorsomorphin, LDN193189, LDN-214117, LDN-212854, K02288, ML347, and the like.

(Hedgehog (HH) Signaling Inhibitor)

Hedgehog (HH) signals are known as being embryonic cell growth factors and morphogenetic factors. Additionally, they have been demonstrated as being capable of functioning to control tissue stem cells as well as homeostasis and tissue regeneration in adults. Abnormalities in embryonic HH signaling are a cause of congenital diseases such as holoprosencephaly, and the sustained activity of HH signaling in adults is considered to be associated with various forms of cancer including skin basal cell carcinoma and medulloblastoma. As hedgehog signaling ligands, three types of HH ligands (SHH, Sonic hedgehog; 1HH, Indian hedgehog; and DHH, Desert hedgehog) are known in mammals. In the state in which there are no hedgehog ligands (the off state), Patched, which is a receptor of the hedgehog family ligands, normally binds to Smoothened (Smo), which is a G protein-coupled transmembrane protein, and inhibits the association of Smoothened with the membrane. In the off state, SuFu and COS2 (which is Kif7 in vertebrates) isolate groups of Gli, which is a transcription factor that binds to microtubules, in the primary cilium. Gli is phosphorylated by PKA, CKI and GSK-3, and Gli activating factors (Gli1 and Gli2 in mammals) are decomposed by β-TrCP, or Gli suppression factors (Gli3 or truncated Ci in *Drosophila*) are produced in a preserved pathway, which leads to suppression of hedgehog target genes. In the activated state (the on state), the hedgehog ligand binds to Patched, thereby allowing Smoothened, mediated by β-arrestin, to move into the primary cilium, where the activity of G proteins associated therewith inhibits the inhibitory kinase activity that acts on Gli, allowing Gli to freely undergo nuclear translocation, thereby activating hedgehog target genes such as those for Cyclin D, Cyclin E, Myc, and Patched.

The hedgehog (HH) signaling inhibitor is not particularly limited as long as it is a substance that inhibits the above-mentioned hedgehog signaling, but examples thereof are substances that inhibit signaling by acting on Smo and the like. Additionally, antagonist antibodies that inhibit the binding of the hedgehog ligands to receptors such as Patched may also be used as the hedgehog signaling inhibitor.

The hedgehog (HH) signaling inhibitor is not particularly limited, but examples include SANT1, cyclopamine, sonidegib, PF-5274857, glasdegib, taladegib, BMS-833923, MK-4101, vismodegib, GANT61, jervine, HPI-4, and the like. For example, SANT-1 is an HH signaling antagonist that has strong cell penetration properties and that inhibits signaling by binding directly to the Smo receptors, and thus can be favorably used.

(TGF-β Receptor Signaling Inhibitor)

TGF-β receptor (TGFβ) signaling is signaling that involves ligands of transforming growth factor β (TGFβ), and that plays a central role in cell processes such as, for example, the growth, proliferation, differentiation and apoptosis of cells. The binding of TGFβ ligands to type II receptors (serine/threonine kinase), which gradually increases and phosphorylates type I receptors (ALK5), is involved in TGFβ signaling. Next, these type I receptors phosphorylate receptor-regulated SMADs (R-SMADs; for example, SMAD1, SMAD2, SMAD3, SMAD5, SMAD8, or SMAD9) that bind to SMAD4. Then, these SMAD complexes enter nuclei and serve roles in transcriptional regulation.

The TGFβ signaling inhibitor is not particularly limited as long as it is a substance that inhibits the above-mentioned TGFβ signaling, but examples thereof are substances that act on ALK5 and inhibit the phosphorylation thereof. Additionally, antagonist antibodies that inhibit the binding of TGFβ to receptors and the like may also be used as the TGFβ signaling inhibitor.

The TGFβ signaling inhibitor is not particularly limited, but for example, inhibitors that act on ALK5 can be favorably used. Examples include SB431542, galunisertib, LY2109761, SB525334, SB505124, GW788388, LY364947, RepSox, SD-208, vactosertib, LDN-212854, and the like.

(Retinoic Acid)

Retinoic acid is a carboxylic acid derivative of vitamin A, and exists in the form of several stereoisomers such as all-trans retinoic acid (also known as tretinoin), 9-cis retinoic acid (also known as alitretinoin), and 13-cis retinoic acid (also known as isotretinoin). Retinoic acid serves the main role in the bioactivity of retinoids and carotenoids in the living body, as a natural ligand of retinoic acid receptor (RAR), which is one of nuclear receptors. RAR is known to form a heterodimer with retinoid X receptor (RXR, the ligand is 9-cis retinoic acid) and serve as a ligand-inducible transcription factor that binds to promoters in specific target gene groups, thereby positively or negatively controlling the expression of the target gene groups by the transcription level. Even compounds having chemical structures that are not at all similar to vitamin A are referred to as retinoids, including synthetic compounds exhibiting extremely high binding affinity to these specific receptors.

(Retinoic Acid Analog)

Retinoic acid (RA) is known to have the function of promoting cell differentiation and apoptosis, or stopping the cell division cycle, and is also used when inducing the differentiation of pluripotent stem cells. The retinoic acid analog is not limited as long as it is a substance that activates retinoic acid receptor (PAR) and retinoid X receptor (RXR), which are nuclear receptors. Examples include EC23, EC19, AC 261066, AC 55649, adapalene, AM 580, AM 80, BMS 753, BMS 961, CD 1530, CD 2314, CD 437, Ch 55, isotretinoin, tazarotene, TTNPB, and the like. EC23 is a stable compound that is less susceptible to degradation by light than retinoic acid is, and can therefore be favorably used.

(Insulin Receptor Signaling Activator)

Insulin receptors are expressed in the liver, skeletal muscles, adipose tissue, nerve cells, and the like, and insulin receptor signaling is known to be involved in the formation, maintenance and repair of the neural network. Insulin is an important hormone that regulates important energy functions such as glucose and lipid metabolism. Insulin activates insulin receptor (IR) tyrosine kinase and performs recruitment and phosphorylation of different substrate adapters such as the IRS (insulin receptor substrate) family. Tyrosine-phosphorylated IRS provides binding sites to many signaling partners. Among these, PI3K (phosphoinositide 3-kinase) plays an important role in insulin function, mainly through the activation of Akt (protein kinase B) and PKC (protein kinase C). Activated Akt causes glycogen synthesis by inhibiting GSK-3 (glycogen synthase kinase), protein synthesis by means of mTOR (mammalian target of *rapa*) and downstream factors, and cell survival by inhibiting proapoptotic factors (Bad, transcription factor Forkhead family, GSK-3, etc.). Insulin receptor signaling also has cell growth and cell division effects, and as with the activation of the Ras/MAPK pathway, Akt cascades are mainly involved in the effects thereof.

Although the insulin receptor signaling activator is not particularly limited as long as it is a substance that activates the above-mentioned insulin receptor signaling, examples include ligands that bind to insulin receptor and IGF receptor. Additionally, it may be a substance that directly or indirectly activates PI3K, PKC or Akt.

The insulin receptor signaling activator is preferably insulin, insulin-like growth factor-1 (IGF-1), IGF-2, or the like. Additionally, PI3-kinase activator (Santa Cruz, product number sc-3036), 740 Y-P and the like, which are PI3K activators, can also be used as the insulin receptor signaling activator.

(FGF Receptor Signaling Activator)

FGF (fibroblast growth factor) receptor signaling is signaling that is mediated by FGF receptors and that occurs on the RAS-MAPK pathway and the PI3K-AKT pathway. It is involved in various cell functions such as cell proliferation, cell death, angiogenesis, epithelial-to-mesenchymal transitions (EMT), and the like, and also serves an important role in controlling embryogenesis and post-natal development of the skeletal structure.

It is sufficient for the FGF receptor signaling activator to be a substance that activates signaling as mentioned above, and typical examples thereof are ligands (FGF family) that bind to FGF receptors. Additionally, activators of the RAS-MAPK pathway and the PI3K-AKT pathway may also be used as FGF receptor signaling activators.

Examples of FGF receptor signaling activators include those in the FGF family, among which FGF7, FGF3, FGF10, FGF22, FGF1, FGF2, FGF4, FGF5, FGF6, FGF8, FGF17, FGF18, FGF19, FGF16, FGF20, FGF19, FGF21, FGF23, and the like are preferable, and FGF7 is particularly preferable.

(EGF Receptor Signaling Activator)

Epithelial growth factor (EGF) is a 6045 Da protein, composed of 53 amino acid residues and three intramolecular disulfide bonds, which binds as a ligand to epithelial growth factor receptor (EGFR) that is present on cell surfaces, and which serves an important role in regulating cell growth and proliferation. Examples of EGF receptor signaling activators include EGF and the like.

(GLP-1 (Glucagon-Like Peptide-1) Receptor Signaling Activator)

Glucagon-like peptide-1 (GLP-1), which is an incretin hormone that is secreted in the living body, increases cAMP by acting through GLP-1 receptor, and promotes insulin secretion in a manner dependent on the glucose concentration. Examples of GLP-1 receptor signaling activators include GLP-1, Exendin 4, and the like.

(Growth Factor Stabilizer)

Growth factor stabilizers refer to substances having a growth factor stabilization function. Growth factor stabilization is not particularly limited as long as it is a function for suppressing the reduction of the amount of extracellular growth factors, such as the function of suppressing the decomposition of growth factors or the function of promoting the extracellular secretion of growth factors. Examples of growth factor stabilizers include heparin, heparin sulfate, and the like.

(Hepatocyte Growth Factor)

Hepatocyte growth factor (HGF) is a type of cytokine that is involved in tissue regeneration and repair in the living body. Hepatocyte growth factor is known to act on various cells besides hepatocytes, promoting the proliferation of epithelial cells and endothelial cells, and acting as a neurotrophic factor on nerve cells.

(Insulin-Like Growth Factor)

Insulin-like growth factor is a polypeptide having a structure similar to proinsulin, and is known to be involved in cell proliferation, survival and migration, and in the production of the extracellular matrix including collagen. Insulin-like growth factor exhibits cell division promotion activity by binding to a common receptor known as insulin-like growth factor receptor-1 (IGFR1) in various cell types including tumor cells. Examples of insulin-like growth factors include insulin-like growth factor-I (IGF-I) and insulin-like growth factor-II (IGF-II).

(Adenylate Cyclase Activator (Substance Elevating Intracellular cAMP Concentration))

Adenylate cyclase is an enzyme that catalyzes the conversion of ATP to 3',5'-cycloAMP (cAMP) and pyrophosphate. cAMP is a molecule, known as a second messenger, that is important for signaling in eukaryotes. Examples of adenylate cyclase activators include forskolin and NKH477.

(TGFβ Superfamily Signaling Activator)

TGFβ superfamily signaling plays a very important role in the regulation of cell proliferation, differentiation, and the development of a wide variety of biological systems. In general, signaling is initiated by serine/threonine receptor kinase multimer formation caused by ligands, and by the phosphorylation of intracellular signaling molecules such as Smad1/5/8 for the bone morphogenetic protein (BMP) pathway, or by the phosphorylation of Smad2/3 for the TGFβ β/activin pathway and the NODAL/activin pathway. The phosphorylation of the carboxyl group terminals of Smads by activated receptors results in the formation of partners with Smad4, which is a signal transducer similar thereto, promoting nuclear translocation. It is known that activated Smads control various biological effects by partnering with transcription factors to perform transcriptional regulation that is specific to the cell state.

Examples of genes involved in the TGFβ superfamily signaling pathway include the activin A gene, the BMP2 gene, the BMP3 gene, the BMP4 gene, the BMP5 gene, the BMP6 gene, the BMP7 gene, the BMP8 gene, the BMP13 gene, the GDF2 (growth differentiation factor 2) gene, the GDF3 gene, the GDF5 gene, the GDF6 gene, the GDF7 gene, the GDF8 gene, the GDF11 gene, the TGF-β1 gene, the TGF-β2 gene, the TGF-β3 gene, the AMH (anti-Mullerian hormone) gene, the paired-like homeodomain 2 (PITX2) gene, the NODAL gene, and the like.

The TGFβ superfamily signaling activator is not particularly limited as long as it is a substance that activates signaling on the bone morphogenetic protein (BMP) pathway, the TGFβ/activin pathway, and/or the NODAL/activin pathway. For example, it is possible to use activin A, BMP2, BMP3, BMP4, BMP5, BMP6, BMP7, BMP8, BMP13, GDF2, GDF5, GDF6, GDF7, GDF8, GDF 11, TGF-β1, TGF-β2, TGF-β3, AMH, PITX2, and/or NODAL. In particular, a substance that activates signaling on the TGFβ/activin pathway can be favorably used. Specifically, it is preferable to use at least one type selected from the group consisting of activin A and BMP4, and it is particularly preferable to use all of activin A and BMP4.

(WNT Signaling Activator)

WNT signaling refers to a series of actions to promote nuclear translocation of β-catenin, and to activate the functions thereof as a transcription factor. WNT signaling is caused by intercellular interactions, and for example, includes a series of processes in which a protein known as WNT3A, secreted from a certain cell, acts on another cell, causing β-catenin in the cell to undergo nuclear translocation and to act as a transcription factor. The series of processes triggers the first phenomena of organ construction, such as epithelial-mesenchymal interactions. WNT signaling is known to control various cell functions including proliferation and differentiation of cells, and cell motility in organogenesis and early development, by the activation of three pathways, namely, the (β-catenin pathway, the PCP pathway, and the $Ca^{2+}$ pathway.

Examples of genes involved in the WNT signaling pathway include the WNT3A gene and the like.

The WNT signaling activator is not particularly limited, and may be of any type as long as it exhibits inhibitory activity against glycogen synthase kinase-3 (GSK-3). It is possible to use, for example, a bis-indolo (indirubin) compound (BIO) ((2'Z,3'E)-6-bromoindirubin-3'-oxime), an acetoxime analog thereof, namely, BIO-acetoxime ((2'Z, 3'E)-6-bromoindirubin-3'-acetoxime), a thiadiazolidine (TDZD) analog (4-benzyl-2-methyl-1,2,4-thiadiazolidine-3, 5-dione), an oxothiadiazolidine-3-thione analog (2,4-dibenzyl-5-oxothiadiazolidine-3-thione), a thienyl α-chloromethyl ketone compound (2-chloro-1-(4,4-dibromo-thiophen-2-yl)-ethanone), a phenyl α-bromomethyl ketone compound (α-4-dibromoacetophenone), a thiazole-containing urea compound (N-(4-methoxybenzyl)-N'-(5-nitro-1,3-thiazol-2-yl)urea), a GSK-β peptide inhibitor such as H-KEAP-PAPPQSpP-NH$_2$, particularly preferably CHIR99021 (CAS: 252917-06-9), or the like. WNT3A can also be favorably used.

[1] Method for Producing Pancreatic β Gut Cells from Primitive Gut Tube (PGT) Cells The method for producing pancreatic β cells according to the present invention is a method including a step of producing posterior foregut (PFG) cells from primitive gut tube (PGT) cells that have been induced to differentiate from pluripotent stem cells; a step of producing pancreatic progenitor (PP) cells from the posterior foregut (PFG) cells; a step of producing pancreatic endocrine precursor (EP) cells from the pancreatic progenitor (PP) cells; and a step of producing pancreatic β cells (β) from the pancreatic endocrine precursor cells.

The method for producing pancreatic β cells from primitive gut tube (PGT) cells induced to differentiate from pluripotent stem cells will be explained.

In step (a) in the present invention, the primitive gut tube (PGT) cells that have been induced to differentiate from pluripotent stem cells are cultured in the presence of a protein kinase (PKC) activator, thereby producing posterior foregut (PFG) cells.

In step (b) in the present invention, the posterior foregut (PFG) cells are cultured in the presence of retinoic acid or an analog thereof, thereby producing pancreatic progenitor (PP) cells.

In step (c) in the present invention, the pancreatic progenitor (PP) cells are cultured in the presence of a Notch signaling inhibitor and a ROCK signaling inhibitor, thereby producing pancreatic endocrine precursor (EP) cells.

In step (d) in the present invention, the pancreatic endocrine precursor (EP) cells are cultured in the presence of an insulin receptor signaling activator, transferrin, and selenous acid, thereby producing pancreatic β cells. Hereinafter, each step will be explained. The induction of differentiation from pluripotent stem cells to primitive gut tube cells will be described below.

<Culture Conditions>

The culturing of the cells when inducing the differentiation of primitive gut tube (PGT) cells to pancreatic β cells may be implemented by using either an adhesion culture or a suspension culture, but a suspension culture is preferable. The cells may be suspension cultured by adhering them to a microcarrier or the like, suspension cultured in the form of cell clumps composed only of cells, or a polymer such as collagen may be intermixed into the cell clumps. Thus, the form of the culture is not particularly limited.

The culture temperature when inducing differentiation from the primitive gut tube (PGT) cells to pancreatic β cells is not particularly limited as long as the culture temperature is suitable for culturing the cells that are used, but the culture temperature should generally be 30° C. to 40° C., preferably approximately 37° C.

The cells should preferably be cultured by using a $CO_2$ incubator or the like, in an atmosphere with a $CO_2$ concentration of approximately 1% to 10%, preferably 5%.

<Culture Period>

The culture period for the differentiation culture to posterior foregut (PFG) cells in step (a) is not particularly limited as long as the cells are converted to a cell type in which the cell properties of posterior foregut (PFG) cells are exhibited. For example, it is sufficient for the period to be 2 weeks or less, more specifically 1 day or more and 10 days or less, more preferably 2 days or more and 7 days or less, even more preferably 3 days or more and 5 days or less, and in one example, 4 days.

The culture period for the differentiation culture to pancreatic progenitor (PP) cells in step (b) is not particularly limited as long as the cells are converted to a cell type in which the cell properties of pancreatic progenitor (PP) cells are exhibited. For example, it is sufficient for the period to be 2 weeks or less, more specifically 1 day or more and 10 days or less, more preferably 2 days or more and 7 days or less, even more preferably 2 days or more and 4 days or less, and in one example, 3 days.

The culture period for the differentiation culture to pancreatic endocrine precursor (EP) cells in step (c) is not particularly limited as long as the cells are converted to a cell type in which the cell properties of pancreatic endocrine precursor (EP) cells are exhibited. For example, it is sufficient for the period to be 2 weeks or less, more specifically 1 day or more and 10 days or less, more preferably 3 days or more and 10 days or less, even more preferably 5 days or more and 9 days or less, and in one example, 7 days.

The culture period for the differentiation culture to pancreatic β cells in step (d) is not particularly limited as long as the cells are converted to a cell type in which the cell properties of pancreatic β cells are exhibited. For example, it is sufficient for the period to be 3 weeks or less, more specifically 3 days or more and 20 days or less, more preferably 5 days or more and 14 days or less, even more preferably 7 days or more and 12 days or less, and in one example, 10 days.

<Culture Medium>

As the culture medium used in step (a) to step (d), an MEM medium, a BME medium, a DMEM medium, a DMEM/F12 medium, an αMEM medium, an IMDM medium, an ES medium, a DM-160 medium, a Fisher medium, an F12 medium, a WE medium, an RPM11640 medium, an Essential6™ medium (Thermo Fisher Scientific), or the like may be used in accordance with the types of cells. The above-mentioned culture media may include glucose, the glucose concentration being preferably 1 mM to 100 mM, more preferably 2 mM to 50 mM, and even more preferably 5 mM to 30 mM.

The culture medium may further contain bovine serum albumin (BSA) or human serum albumin (HSA). Preferably, the BSA or HSA contains 2 mg/g or less of lipids and 0.2 mg/g or less of free fatty acids.

The lower limit of the amount of BSA added to the culture medium is preferably 0.01%, more preferably 0.05%, more preferably 0.10%, and more preferably 0.15%. The upper limit of the amount of BSA added to the culture medium is preferably 1.00%, more preferably 0.90%, more preferably 0.80%, more preferably 0.70%, more preferably 0.60%, more preferably 0.50%, more preferably 0.40%, more preferably 0.30%, more preferably 0.25%, more preferably 0.20%, and more preferably 0.15%.

The culture medium may further contain antibiotics such as penicillin and streptomycin. For example, the culture medium may include 0.1% to 2% (volume/volume) of penicillin and 0.1% to 2% (volume/volume) of streptomycin.

The culture medium may also contain a B27 (registered trademark) supplement.

The lower limit of the amount of the B27 (registered trademark) supplement added to the culture medium is preferably 0.01%, more preferably 0.1%, more preferably 0.2%, more preferably 0.3%, more preferably 0.4%, more preferably 0.5%, more preferably 0.6%, more preferably 0.7%, more preferably 0.8%, and more preferably 0.9%. The upper limit of the amount of the B27 (registered trademark) supplement added to the culture medium is preferably 10%, more preferably 9%, more preferably 8%, more preferably 7%, more preferably 6%, more preferably 5%, more preferably 4%, more preferably 3%, more preferably 2%, and more preferably 1%.

The culture medium may contain insulin, transferrin, and selenous acid. The insulin, transferrin, and selenous acid may be contained in the culture medium in the form of a commercially available mixture such as a B27 supplement.

The lower limit of the amount of transferrin added to the culture medium is preferably 0.001 mg/L, more preferably 0.01 mg/L, more preferably 0.1 mg/L, more preferably 1 mg/L, more preferably 1.1 mg/L, more preferably 1.2 mg/L, more preferably 1.3 mg/L, more preferably 1.4 mg/L, more preferably 1.5 mg/L, and more preferably 1.6 mg/L. The upper limit of the amount of transferrin added to the culture medium is preferably 1000 mg/L, more preferably 500 mg/L, more preferably 100 mg/L, more preferably 90 mg/L, more preferably 80 mg/L, more preferably 70 mg/L, more preferably 60 mg/L, more preferably 50 mg/L, more preferably 40 mg/L, more preferably 30 mg/L, more preferably 20 mg/L, more preferably 10 mg/L, more preferably 9 mg/L, more preferably 8 mg/L, more preferably 7 mg/L, more preferably 6 mg/L, more preferably 5 mg/L, more preferably 4 mg/L, more preferably 3 mg/L, and more preferably 2 mg/L.

The lower limit of the amount of selenous acid added to the culture medium is preferably 0.001 µg/L, more preferably 0.01 µg/L, more preferably 0.1 µg/L, more preferably 1 µg/L, more preferably 1.1 µg/L, more preferably 1.2 µg/L, more preferably 1.3 µg/L, more preferably 1.4 µg/L, more preferably 1.5 µg/L, more preferably 1.6 µg/L, more preferably 1.7 µg/L, more preferably 1.8 µg/L, more preferably 1.9 µg/L, and more preferably 2 µg/L. The upper limit of the amount of selenous acid added to the culture medium is preferably 1000 µg/L, more preferably 500 µg/L, more preferably 100 µg/L, more preferably 90 µg/L, more preferably 80 µg/L, more preferably 70 µg/L, more preferably 60 µg/L, more preferably 50 µg/L, more preferably 40 µg/L, more preferably µg/L, more preferably 20 µg/L, more preferably 10 µg/L, more preferably 9 µg/L, more preferably 8 µg/L, and more preferably 7 µg/L.

[2] Differentiation-Inducing Factor Used to Induce Differentiation from Primitive Gut Tube Cells to Posterior Foregut Cells, and Other Additives In step (a) in the present invention, primitive gut tube (PGT) cells, which have been induced to differentiate from pluripotent stem cells, are cultured in the presence of a protein kinase C (PKC) activator under culture conditions suitable for inducing differentiation to posterior foregut (PFG) cells, thereby producing posterior foregut (PFG) cells.

The culture conditions suitable for inducing differentiation to posterior foregut (PFG) cells are not particularly limited as long as they are culture conditions that can appropriately induce the differentiation of primitive gut tube (PGT) cells, which have been induced to differentiate from pluripotent stem cells, to posterior foregut (PFG) cells. Although the differentiation induction medium is not particularly limited as long as it is a culture medium that induces the differentiation of endodermal cells to primitive gut tube (PGT) cells, as one embodiment, the cells are cultured in the differentiation induction medium described below.

The lower limit of the amount of the PKC activator contained in the culture medium used in the aforementioned step (a) is preferably 0.01 µmoL/L, more preferably 0.02 µmoL/L, more preferably 0.05 µmoL/L, more preferably 0.1 µmoL/L, more preferably 0.2 µmoL/L, and more preferably 0.3 µmoL/L. The upper limit of the amount of the PKC activator contained in the culture medium is preferably 10 µmoL/L, more preferably 5 µmoL/L, more preferably 1 µmoL/L, more preferably 0.8 µmoL/L, more preferably 0.5 µmoL/L, more preferably 0.4 µmoL/L, and more preferably 0.3 µmoL/L.

The culture medium used in the aforementioned step (a) may contain a hedgehog (HH) signaling inhibitor (such as SANT1).

The lower limit of the amount of the HH signaling inhibitor (such as SANT1) added to the culture medium is preferably 0.01 µmol/L, more preferably 0.02 µmol/L, more preferably 0.03 µmol/L, more preferably 0.05 µmol/L, more preferably 0.10 µmol/L, more preferably 0.15 µmol/L, more preferably 0.20 µmol/L, and more preferably 0.25 µmol/L. The upper limit of the amount of the HH signaling inhibitor (such as SANT1) added to the culture medium is preferably 5.0 µmol/L, more preferably 4.0 µmol/L, more preferably 3.0 µmol/L, more preferably 2.0 µmol/L, more preferably 1.0 µmol/L, more preferably 0.80 µmol/L, more preferably 0.70 µmol/L, more preferably 0.60 µmol/L, more preferably 0.50 µmol/L, more preferably 0.40 µmol/L, more preferably 0.30 µmol/L, and more preferably 0.35 µmol/L.

The culture medium used in step (a) may contain a retinoic acid analog (such as EC23).

The lower limit of the amount of the retinoic acid analog (such as EC23) added to the culture medium is preferably 0.01 µmol/L, more preferably 0.02 µmol/L, more preferably 0.03 µmol/L, more preferably 0.05 µmol/L, more preferably 0.1 µmol/L, more preferably 0.2 µmol/L, more preferably 0.3 µmol/L, more preferably 0.4 µmol/L, and more preferably 0.5 µmol/L. The upper limit of the amount of the retinoic acid analog (such as EC23) added to the culture medium is preferably 5.0 µmol/L, more preferably 4.0 µmol/L, more preferably 3.0 µmol/L, more preferably 2.0 µmol/L, more preferably 1.0 µmol/L, more preferably 0.9 µmol/L, more preferably 0.8 µmol/L, more preferably 0.7 µmol/L, more preferably 0.6 µmol/L, and more preferably 0.5 µmol/L.

The culture medium used in step (a) may contain NEAA (such as, for example, 1× non-essential amino acids (NEAA, Wako)).

The lower limit of the amount of NEAA contained in the culture medium is preferably 0.05× NEAA, more preferably 0.1× NEAA, more preferably 0.5× NEAA, more preferably 0.6× NEAA, more preferably 0.7× NEAA, more preferably 0.8× NEAA, more preferably 0.9× NEAA, and more preferably 1× NEAA. The upper limit of the amount of NEAA contained in the culture medium is preferably 20× NEAA, more preferably 15× NEAA, more preferably 10× NEAA, more preferably 5× NEAA, more preferably 4× NEAA, more preferably 3× NEAA, more preferably 2× NEAA, and more preferably 1× NEAA.

The culture medium in step (a) contains a bone morphogenetic protein (BMP) signaling inhibitor.

In the case in which the bone morphogenetic protein (BMP) signaling inhibitor is dorsomorphin, the lower limit of the amount of dorsomorphin contained in the culture medium is preferably 0.01 µmoL/L, more preferably 0.05 µmoL/L, more preferably 0.1 µmoL/L, more preferably 0.3 µmoL/L, more preferably 0.5 µmoL/L, more preferably 0.6 µmoL/L, more preferably 0.7 µmoL/L, more preferably 0.8 µmoL/L, more preferably 0.9 µmoL/L, and more preferably 1 µmoL/L. The upper limit of the amount of dorsomorphin contained in the culture medium is preferably 20 µmoL/L, more preferably 15 µmoL/L, more preferably 10 µmoL/L, more preferably 7 µmoL/L, more preferably 5 µmoL/L, more preferably 4 µmoL/L, more preferably 3 µmoL/L, more preferably 2 µmoL/L, and more preferably 1 µmoL/L.

In the case in which the bone morphogenetic protein (BMP) signaling inhibitor is LDN193189, the lower limit of the amount of LDN193189 contained in the culture medium is preferably 0.01 μmoL/L, more preferably 0.02 μmoL/L, more preferably 0.05 μmoL/L, more preferably 0.1 μmoL/L, and more preferably 0.2 μmoL/L. The upper limit of the amount of LDN193189 contained in the culture medium is preferably 10 μmoL/L, more preferably 5 μmoL/L, more preferably 1 μmoL/L, more preferably 0.8 μmoL/L, more preferably 0.5 μmoL/L, more preferably 0.4 μmoL/L, more preferably 0.3 μmoL/L, and more preferably 0.2 μmoL/L.

The culture medium in step (a) may contain an FGF receptor signaling activator. Particularly preferably, it contains FGF7.

The lower limit of the amount of the FGF receptor signaling activator added to the culture medium in step (a) is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of the FGF receptor signaling activator added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

[3] Differentiation-Inducing Factor Used to Induce Differentiation from Posterior Foregut (PFG) Cells to Pancreatic Progenitor (PP) Cells, and Other Additives In step (b) in the present invention, posterior foregut (PFG) cells are cultured in the presence of retinoic acid or an analog thereof under culture conditions suitable for inducing differentiation to pancreatic progenitor (PP) cells, thereby producing pancreatic progenitor (PP) cells.

The culture conditions suitable for inducing differentiation to pancreatic progenitor (PP) cells are not particularly limited as long as they are culture conditions that can appropriately induce the differentiation of posterior foregut (PFG) cells to pancreatic progenitor (PP) cells.

Although the differentiation induction medium is not particularly limited as long as it is a culture medium that induces the differentiation of posterior foregut (PFG) cells to pancreatic progenitor (PP) cells, as one embodiment, the cells are cultured in the differentiation induction medium described below.

The lower limit of the amount of the retinoic acid or analog thereof (such as EC23) added to the culture medium used in the aforementioned step (b) is preferably 0.01 μmol/L, more preferably 0.02 μmol/L, more preferably 0.03 μmol/L, more preferably 0.05 μmol/L, more preferably 0.1 μmol/L, more preferably 0.2 μmol/L, more preferably 0.3 μmol/L, more preferably 0.4 μmol/L, and more preferably 0.5 μmol/L. The upper limit of the amount of the retinoic acid analog (such as EC23) added to the culture medium is preferably 5.0 μmol/L, more preferably 4.0 μmol/L, more preferably 3.0 μmol/L, more preferably 2.0 μmol/L, more preferably 1.0 μmol/L, more preferably 0.9 μmol/L, more preferably 0.8 μmol/L, more preferably 0.7 μmol/L, more preferably 0.6 μmol/L, and more preferably 0.5 μmol/L.

The culture medium used in step (b) may contain a hedgehog (HH) signaling inhibitor (such as SANT1). The amount of the hedgehog (HH) signaling inhibitor (such as SANT1) added to the culture medium is as described in [2] above.

Additionally, the culture medium used in step (b) may contain NEAA (such as, for example, 1× non-essential amino acids (NEAA, Wako)). The amount of the NEAA added to the culture medium is as described in [2] above.

The culture medium in step (b) may contain a bone morphogenetic protein (BMP) signaling inhibitor. The amount of the bone morphogenetic protein (BMP) signaling inhibitor added to the culture medium is as described in [2] above.

The culture medium in step (b) may contain an FGF receptor signaling activator. Particularly preferably, it is FGF10. The amount of the FGF receptor signaling activator added to the culture medium is as described in [2] above.

The culture medium in step (b) may contain a protein kinase C (PKC) activator. The amount of the protein kinase C (PKC) activator added to the culture medium is as described in [2] above.

The culture medium in step (b) may contain a TGF-β receptor signaling inhibitor (such as RepSOX).

The lower limit of the amount of the TGF-β receptor signaling inhibitor (such as RepSOX) contained in the culture medium is preferably 0.1 μmoL/L, more preferably 0.5 μmoL/L, more preferably 1 μmoL/L, more preferably 3 μmoL/L, more preferably 5 μmoL/L, more preferably 6 μmoL/L, more preferably 7 μmoL/L, more preferably 8 μmoL/L, more preferably 9 μmoL/L, and more preferably 10 μmoL/L. The upper limit of the amount of the TGF-β receptor signaling inhibitor (such as RepSOX) contained in the culture medium is preferably 100 μmoL/L, more preferably 80 μmoL/L, more preferably 50 μmoL/L, more preferably 40 μmoL/L, more preferably 30 μmoL/L, more preferably μmoL/L, more preferably 15 μmoL/L, more preferably 12 μmoL/L, and more preferably 10 μmoL/L.

The culture medium in step (b) may contain $ZnSO_4$.

The lower limit of the amount of $ZnSO_4$ contained in the culture medium is preferably 0.1 μmoL/L, more preferably 0.5 μmoL/L, more preferably 1 μmoL/L, more preferably 3 μmoL/L, and more preferably 5 μmoL/L. The upper limit of the amount of $ZnSO_4$ contained in the culture medium is preferably 100 μmoL/L, more preferably 80 μmoL/L, more preferably 50 μmoL/L, more preferably 40 μmoL/L, more preferably 30 μmoL/L, more preferably 20 μmoL/L, more preferably 15 μmoL/L, more preferably 12 μmoL/L, more preferably 10 μmoL/L, and more preferably 5 μmoL/L.

[4] Differentiation-Inducing Factor Used to Induce Differentiation from Pancreatic Progenitor (PP) Cells to Pancreatic Endocrine Precursor (EP) Cells, and Other Additives In step (c) in the present invention, pancreatic progenitor (PP) cells are cultured in the presence of a Notch signaling inhibitor and a ROCK signaling inhibitor under culture conditions suitable for inducing differentiation to pancreatic endocrine precursor (EP) cells, thereby producing pancreatic endocrine precursor (EP) cells.

The culture conditions are not particularly limited as long as they are culture conditions that can appropriately induce the differentiation of posterior foregut (PP) cells to pancreatic endocrine precursor (EP) cells.

Although the differentiation induction medium is not particularly limited as long as it is a culture medium that induces the differentiation of posterior foregut (PP) cells to pancreatic endocrine precursor (EP) cells, as one embodiment, the cells are cultured in the differentiation induction medium described below.

The lower limit of the amount of the Notch signaling inhibitor (such as DBZ) in the culture medium in the aforementioned step (c) is preferably 0.01 μmol/L, more preferably 0.02 μmol/L, more preferably 0.03 μmol/L, more preferably 0.05 μmol/L, more preferably 0.1 μmol/L, more preferably 0.2 μmol/L, more preferably 0.3 μmol/L, more preferably 0.4 µmol/L, and more preferably 0.5 µmol/L. The upper limit of the amount of the Notch signaling inhibitor (such as DBZ) added to the culture medium is preferably 5.0 µmol/L, more preferably 4.0 µmol/L, more preferably 3.0 µmol/L, more preferably 2.0 µmol/L, more preferably 1.0 µmol/L, more preferably 0.9 µmol/L, more preferably 0.8 µmol/L, more preferably 0.7 µmol/L, more preferably 0.6 µmol/L, and more preferably 0.5 µmol/L.

The culture medium used in step (c) may contain a hedgehog (HH) signaling inhibitor (such as SANT1). The amount of the hedgehog (HH) signaling inhibitor (such as SANT1) added to the culture medium is as described in [2] above.

The culture medium used in step (c) may contain a retinoic acid analog (such as EC23). The amount of the retinoic acid analog added to the culture medium is as described in [2] above.

The culture medium used in step (c) may contain L-glutamine.

The lower limit of the amount of L-glutamine contained in the culture medium is preferably 0.01 mmol/L, more preferably 0.05 mmol/L, more preferably 0.1 mmol/L, more preferably 0.5 mmol/L, more preferably 0.7 mmol/L, more preferably 1.0 mmol/L, more preferably 1.2 mmol/L, more preferably 1.5 mmol/L, and more preferably 2.0 mmol/L. The upper limit of the amount of L-glutamine contained in the culture medium is preferably 100 mmol/L, more preferably 50 mmol/L, more preferably 40 mmol/L, more preferably 30 mmol/L, more preferably 20 mmol/L, more preferably 10 mmol/L, more preferably 9 mmol/L, more preferably 8 mmol/L, more preferably 7 mmol/L, more preferably 6 mmol/L, more preferably 5 mmol/L, more preferably 4 mmol/L, more preferably 3 mmol/L, and more preferably 2 mmol/L.

The culture medium in step (c) may contain a bone morphogenetic protein (BMP) signaling inhibitor. The amount of the bone morphogenetic protein (BMP) signaling inhibitor added to the culture medium is as described in [2] above.

The culture medium in step (c) may contain a TGF-β receptor signaling inhibitor. The amount of the TGF-β receptor signaling inhibitor added to the culture medium is as described in [2] above.

The culture medium in step (c) may contain $ZnSO_4$. The amount of the $ZnSO_4$ added to the culture medium is as described in [3] above.

The culture medium in step (c) may contain a growth factor stabilizer (such as heparin).

The lower limit of the amount of the growth factor stabilizer (such as heparin) added to the culture medium is preferably 0.2 ng/mL, more preferably 0.5 ng/mL, more preferably 1 ng/mL, more preferably 3 ng/mL, more preferably 5 ng/mL, more preferably 6 ng/mL, more preferably 7 ng/mL, more preferably 8 ng/mL, more preferably 9 ng/mL, and more preferably 10 ng/mL. The upper limit of the amount of the growth factor stabilizer (such as heparin) added to the culture medium is preferably 100 ng/mL, more preferably 90 ng/mL, more preferably 80 ng/mL, more preferably 70 ng/mL, more preferably 60 ng/mL, more preferably 50 ng/mL, more preferably 40 ng/mL, more preferably 30 ng/mL, more preferably 20 ng/mL, and more preferably 10 ng/mL.

The culture medium in step (c) may contain nicotinamide.

The lower limit of the amount of nicotinamide contained in the culture medium is preferably 0.1 mmoL/L, more preferably 0.5 mmoL/L, more preferably 1 mmoL/L, more preferably 3 mmoL/L, and more preferably 5 mmoL/L. The upper limit of the amount of nicotinamide in the culture medium is preferably 100 mmoL/L, more preferably 80 mmoL/L, more preferably 50 mmoL/L, more preferably 40 mmoL/L, more preferably 30 mmoL/L, more preferably 20 mmoL/L, more preferably 15 mmoL/L, more preferably 12 mmoL/L, more preferably 10 mmoL/L, and more preferably 5 mmoL/L.

The culture medium in step (c) may contain an EGF receptor signaling activator (such as EGF).

The lower limit of the amount of the EGF receptor signaling activator (such as EGF) added to the culture medium is preferably 0.2 ng/mL, more preferably 0.5 ng/mL, more preferably 1 ng/mL, more preferably 3 ng/mL, more preferably 5 ng/mL, more preferably 7 ng/mL, more preferably 10 ng/mL, more preferably 12 ng/mL, more preferably 15 ng/mL, more preferably 16 ng/mL, more preferably 17 ng/mL, more preferably 18 ng/mL, more preferably 19 ng/mL, and more preferably 20 ng/mL. The upper limit of the amount of the EGF receptor signaling activator (such as EGF) added to the culture medium is preferably 100 ng/mL, more preferably 90 ng/mL, more preferably 80 ng/mL, more preferably 70 ng/mL, more preferably 60 ng/mL, more preferably 50 ng/mL, more preferably 40 ng/mL, more preferably 30 ng/mL, more preferably 25 ng/mL, and more preferably 20 ng/mL.

The culture medium in step (c) may contain a ROCK signaling inhibitor (such as Y27632).

The lower limit of the amount of the ROCK signaling inhibitor (such as Y27632) contained in the culture medium is preferably 0.1 µmoL/L, more preferably 0.5 µmoL/L, more preferably 1 µmoL/L, more preferably 3 µmoL/L, more preferably 5 µmoL/L, more preferably 6 µmoL/L, more preferably 7 µmoL/L, more preferably 8 µmoL/L, more preferably 9 µmoL/L, and more preferably 10 µmoL/L. The upper limit of the amount of the ROCK signaling inhibitor (such as Y27632) contained in the culture medium is preferably 100 µmoL/L, more preferably 80 µmoL/L, more preferably 50 µmoL/L, more preferably 40 µmoL/L, more preferably 30 µmoL/L, more preferably 20 µmoL/L, more preferably 15 µmoL/L, more preferably 12 µmoL/L, and more preferably µmoL/L.

[5] Differentiation-Inducing Factor Used to Induce Differentiation from Pancreatic Endocrine Precursor (EP) Cells to Pancreatic β Cells, and Other Additives In step (d) in the present invention, pancreatic endocrine precursor (EP) cells are cultured in the presence of an insulin receptor signaling activator, transferrin, and selenous acid under culture conditions suitable for inducing differentiation to pancreatic β cells, thereby producing pancreatic β cells.

The culture conditions suitable for inducing differentiation to pancreatic β cells are not particularly limited as long as they are culture conditions that can appropriately induce the differentiation of pancreatic endocrine precursor (EP) cells to pancreatic β cells.

Although the differentiation induction medium is not particularly limited as long as it is a culture medium that induces the differentiation of pancreatic endocrine precursor (EP) cells to pancreatic β cells, as one embodiment, the cells are cultured in the differentiation induction medium described below.

The amounts of the insulin receptor signaling activator, transferrin, and selenous acid added to the culture medium are as described in <Culture medium> above.

The culture medium in step (d) may contain a TGF-β receptor signaling inhibitor.

The amount of the TGF-β receptor signaling inhibitor added to the culture medium is as described in [2] above.

The culture medium in step (d) may contain $ZnSO_4$.

The amount of the $ZnSO_4$ added to the culture medium is as described in [3] above.

The culture medium in step (d) may contain a GLP-1 (glucagon-like peptide-1) receptor signaling activator (such as Exendin 4).

The lower limit of the amount of the GLP-1 (glucagon-like peptide-1) receptor signaling activator (such as Exendin 4) added to the culture medium is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of the GLP-1 (glucagon-like peptide-1) receptor signaling activator (such as Exendin 4) added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

The culture medium in step (d) may contain a growth factor stabilizer (such as heparin).

The amount of the growth factor stabilizer (such as heparin) added to the culture medium is as described in [4] above.

The culture medium in step (d) may contain nicotinamide.
The amount of nicotinamide added to the culture medium is as described in [4] above.

The culture medium in step (d) may contain a TGFβ superfamily signaling activator (such as BMP4).

The lower limit of the amount of the TGFβ superfamily signaling activator (such as BMP4) added to the culture medium is preferably 0.2 ng/mL, more preferably 0.5 ng/mL, more preferably 1 ng/mL, more preferably 3 ng/mL, more preferably 5 ng/mL, more preferably 6 ng/mL, more preferably 7 ng/mL, more preferably 8 ng/mL, more preferably 9 ng/mL, and more preferably 10 ng/mL. The upper limit of the amount of the TGFβ superfamily signaling activator (such as BMP4) added to the culture medium is preferably 100 ng/mL, more preferably 90 ng/mL, more preferably 80 ng/mL, more preferably 70 ng/mL, more preferably 60 ng/mL, more preferably 50 ng/mL, more preferably 40 ng/mL, more preferably 30 ng/mL, more preferably 20 ng/mL, and more preferably 10 ng/mL.

The culture medium in step (d) may contain a hepatocyte growth factor (HGF).

The lower limit of the amount of the hepatocyte growth factor (HGF) added to the culture medium is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of the hepatocyte growth factor (HGF) added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

The culture medium in step (d) may contain an insulin-like growth factor (such as IGF1).

The lower limit of the amount of the insulin-like growth factor (such as IGF1) added to the culture medium is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of the insulin-like growth factor (such as IGF1) added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

The culture medium in step (d) may contain an adenylate cyclase activator (such as forskolin).

The lower limit of the amount of the adenylate cyclase activator (such as forskolin) contained in the culture medium is preferably 0.1 μmoL/L, more preferably 0.3 μmoL/L, more preferably 0.5 μmoL/L, more preferably 0.7 μmoL/L, more preferably 1 μmoL/L, more preferably 2 μmoL/L, more preferably 3 μmoL/L, more preferably 4 μmoL/L, and more preferably 5 μmoL/L. The upper limit of the amount of the adenylate cyclase activator (such as forskolin) contained in the culture medium is preferably 100 μmoL/L, more preferably 80 μmoL/L, more preferably 50 μmoL/L, more preferably 40 μmoL/L, more preferably 30 μmoL/L, more preferably 20 μmoL/L, more preferably 15 μmoL/L, more preferably 10 μmoL/L, more preferably 7 μmoL/L, and more preferably 5 μmoL/L.

[6] Pluripotent Stem Cell Maintenance Culture

In the production method of the present invention, primitive gut tube (PGT) cells induced to differentiate from pluripotent stem cells are used.

Preferably, the primitive gut tube (PGT) cells are cells obtained by a step of culturing the cells under conditions in which pluripotent stem cells can be induced to differentiate to endodermal cells, and a step of culturing the cells under conditions in which the endodermal cells can be induced to differentiate to primitive gut tube (PGT) cells.

The undifferentiated state of the pluripotent stem cells before the induced differentiation to endodermal cells is preferably maintained by using an undifferentiated-state maintenance medium. A culture in which the undifferentiated state of pluripotent stem cells is maintained by using an undifferentiated-state maintenance medium is also called a maintenance culture of pluripotent stem cells.

The undifferentiated-state maintenance medium is not particularly limited as long as it is a culture medium that allows the undifferentiated state of pluripotent stem cells to be maintained. Examples include a culture medium containing a leukemia inhibitory factor that is known to have the property of maintaining the undifferentiated state of mouse embryonic stem cells and mouse induced pluripotent stem cells, a culture medium containing a basic FGF (fibroblast growth factor) that is known to have the property of maintaining the undifferentiated state of human iPS cells, and the like. For example, it is possible to use a human iPS cell medium (DMEM/Ham's F12 (Wako) containing 20% KnockOut serum replacement (KSR; Gibco), 1× non-essential amino acids (NEAA; Wako), 55 μmol/L 2-mercaptoethanol (2-ME; Gibco), 7.5 ng/mL recombinant human fibroblast growth factor 2 (FGF 2; PeproTech) and 0.5× penicillin and streptomycin (PS; Wako)), or an Essential 8 medium (Thermo Fisher Scientific), STEMPRO (registered trademark) hESC SFM (Life Technologies Japan Ltd.), mTeSR1 (Veritas Corporation), TeSR2 (Veritas Corporation), StemFit (registered trademark), or the like, but there is no particular limitation.

The pluripotent stem cells may be maintenance-cultured on suitable feeder cells (for example, SL10 feeder cells, SNL feeder cells, or the like) using an undifferentiated-state maintenance medium as mentioned above. Additionally, the pluripotent stem cells may be maintenance-cultured using the above-mentioned undifferentiated-state maintenance medium on cell culture dishes coated with a cell adhesion protein or an extracellular matrix such as vitronectin, fibronectin, laminin, collagen or matrigel.

The culture temperature is not particularly limited as long as it is a culture temperature suitable for culturing the pluripotent stem cells that are used. Generally, the temperature is 30° C. to 40° C., and is preferably about 37° C.

The cells are preferably cultured by using a $CO_2$ incubator or the like in an atmosphere with a $CO_2$ concentration of about 1% to 10%, preferably 5%.

The maintenance culture of the pluripotent stem cells may be maintained for a desired period of time by subculturing the cells, and it is preferable to form aggregates and induce differentiation by using the pluripotent stem cells, for example, 1 to 100 passages, preferably 10 to 50 passages, more preferably 25 to 40 passages after the maintenance culture.

[7] Formation of Aggregates by Suspension Culturing Pluripotent Stem Cells

As one of the embodiments for forming an aggregate of pluripotent stem cells, cells that have been maintenance-cultured in the undifferentiated state may be detached from feeder cells by using accumax (Innovative Cell Technologies, Inc.) or the like, and the feeder cells are removed by rinsing three or four times with a human iPS cell culture medium. Next, the cells are broken up by pipetting into smaller cell clumps or single cells. Then, the cells are suspended in a culture medium, and thereafter suspension cultured while stirring or rotating until the pluripotent stem cells in the suspension form aggregates.

The suspension culture may be a static culture using the viscosity of the culture medium or the like, a microwell having recesses and protrusions or the like, or may involve culturing the cells under conditions in which a liquid culture medium flows with the use of a spinner or the like. Preferably, the suspension culture involves culturing the cells under conditions in which a liquid culture medium flows. Culturing the cells under conditions in which a liquid culture medium flows preferably involves culturing the cells under conditions in which the liquid culture medium flows so as to promote cell aggregation. Examples of culturing cells under conditions in which the liquid culture medium flows so as to promote cell aggregation include culturing the cells under conditions in which the liquid culture medium flows so that stresses (centrifugal force and centripetal force) due to flow such as rotational flow and rocking flow cause the cells to gather at one point, and culturing the cells under conditions such that the liquid culture medium flows with linear reciprocating motion. The cells are particularly preferably cultured by using rotational flow and/or rocking flow. Furthermore, the cells may be suspension cultured by being adhered to a microcarrier or the like in advance, or suspension cultured in the form of cell clumps composed only of cells, or a polymer such as collagen may be intermixed into the cell clumps. Thus, the form of the culture is not particularly limited.

The culture vessel used for the suspension culture is preferably a vessel with low cell adhesion to the inner surfaces of the vessel. Such vessels with low cell adhesion to the inner surfaces of the vessel include, for example, plates that have been surface-treated for hydrophilization with a biocompatible material. For example, Nunclon™ Sphera (Thermo Fisher Scientific) may be used, but there is no limitation thereon. Additionally, the shape of the culture vessel is not particularly limited, and examples include culture vessels in the shape of a dish, a flask, a well, a bag, a spinner flask, or the like.

The period of time over which the aggregates are formed is not particularly limited as long as the period exceeds 6 hours. Specifically, the aggregates are preferably formed over a period of 1 day, 2 days, 3 days, 4 days, 5 days, 6 days, 7 days, or 2 weeks, 3 weeks, 4 weeks, 5 weeks, 6 weeks, 7 weeks, or 8 weeks.

The suspension culture medium is not particularly limited as long as it contains components that allow pluripotent stem cells to proliferate. An mTeSR1 (Veritas Corporation) culture medium containing 1 to 100 µM of Y-27632 (Cayman) or Essential 8™ containing 1 to 100 µM of Y-27632 (Cayman) and 1 to 100 mg/mL of BSA, or the like may be used.

The conditions for stirring or rotating the suspension culture are not particularly limited as long as they are within a range allowing pluripotent stem cells to form aggregates in the suspension. The upper limit is preferably 200 rpm, more preferably 150 rpm, even more preferably 120 rpm, more preferably 100 rpm, more preferably 90 rpm, more preferably 80 rpm, even more preferably 70 rpm, more preferably 60 rpm, particularly preferably 50 rpm, and most preferably 45 rpm. The lower limit is preferably 1 rpm, more preferably 10 rpm, even more preferably 20 rpm, more preferably 30 rpm, more preferably 40 rpm, and particularly preferably 45 rpm. The rotation width in the case of a rotation culture is not particularly limited, and the lower limit may, for example, be 1 mm, preferably 10 mm, more preferably 20 mm, and most preferably 25 mm. The upper limit of the rotation width may, for example, be 200 mm, preferably 100 mm, preferably 50 mm, more preferably 30 mm, and most preferably 25 mm. The rotation radius in the case of a rotation culture is also not particularly limited, and is preferably set so that the rotation width is within the aforementioned range. The lower limit of the rotation radius may, for example, be 5 mm, preferably 10 mm, and the upper limit may, for example, be 100 mm, preferably 50 mm. The rotation culture conditions are preferably set to be in these ranges because these conditions make it easier for cell aggregates with appropriate dimensions to be produced.

Additionally, the suspension culture may be based on a rocking culture, in which a liquid culture medium is made to flow by rocking agitation. A rocking culture is implemented by rocking a culture vessel containing the liquid culture medium and cells in a plane substantially perpendicular to the horizontal plane. The rocking rate is not particularly limited, and the rocking can be performed with a frequency, for example, of 2 to 50 times, preferably of 4 to 25 times (one complete cycle being regarded as one time) per minute. The rocking angle is not particularly limited, and may, for example, be 0.1° to 20°, and more preferably 2° to 10°. The conditions of the rocking culture are preferably within these ranges because such conditions allow cell clumps with appropriate dimensions to be produced.

Furthermore, the cells may be cultured by agitation by means of motions combining rotation and rocking as described above.

A suspension culture using a spinner flask-shaped culture vessel is a culture that involves agitating a liquid culture medium by using a stirring blade in the culture vessel. The rotation speed and the amount of the culture medium are not particularly limited. If a commercially available spinner flask-shaped culture vessel is used, then the manufacturer-recommended amount of the culture solution may be suitably used. For example, a spinner flask from ABLE Corporation or the like may be suitably used.

In the present invention, the seeding density of the cells in the suspension culture is not particularly limited as long as the seeding density allows the cells to form aggregates, but the seeding density is preferably $1\times10^5$ to $1\times10^7$ cells/mL. The seeding density of the cells is preferably $2\times10^5$ cells/mL or more, $3\times10^5$ cells/mL or more, $4\times10^5$ cells/mL or more, or $5\times10^5$ cells/mL or more, and is preferably $9\times10^6$ cells/mL or less, $8\times10^6$ cells/mL or less, $7\times10^6$ cells/mL or less, $6\times10^6$ cells/mL or less, $5\times10^6$ cells/mL or less, $4\times10^6$ cells/mL or less, $3\times10^6$ cells/mL or less, $2\times10^6$ cells/mL or less, $1.9\times10^6$ cells/mL or less, $1.8\times10^6$ cells/mL or less, $1.7\times10^6$ cells/mL or less, $1.6\times10^6$ cells/mL or less, or $1.5\times10^6$ cells/mL or less. In particular, a cell density in the range from $5\times10^5$ cells/mL to $1.5\times10^6$ cells/mL is preferable.

The cell aggregates include hundreds to thousands of cells per aggregate. In the present invention, the size (diameter) of the cell aggregates is not particularly limited and may, for example, be 50 μm or larger, 55 μm or larger, 60 μm or larger, 65 μm or larger, 70 μm or larger, 80 μm or larger, 90 μm or larger, 100 μm or larger, 110 μm or larger, 120 μm or larger, 130 μm or larger, 140 μm or larger, or 150 μm or larger, and may be 1000 μm or smaller, 900 μm or smaller, 800 μm or smaller, 700 μm or smaller, 600 μm or smaller, 500 μm or smaller, or 400 μm or smaller. Cell aggregates having a diameter of 150 μm to 400 μm are favorable for the present invention. Cell aggregates having diameters outside the above range may be mixed together.

The amount of the culture solution in the suspension culture can be appropriately adjusted in accordance with the culture vessel. For example, when a 12-well plate (the bottom surface area of each well in plan view being 3.5 cm²) is used, the amount may be 0.5 ml/well or more, and 1.5 ml/well or less, more preferably 1 ml/well. For example, when a 6-well plate (the bottom surface area of each well in plan view being 9.6 cm²) is used, the amount may be 1.5 mL/well or more, preferably 2 mL/well or more, and more preferably 3 mL/well or more, and may be 6.0 mL/well or less, preferably 5 mL/well or less, and more preferably 4 mL/well or less. For example, when a 125 mL Erlenmeyer flask (an Erlenmeyer flask having a capacity of 125 mL) is used, the amount may be 10 mL/vessel or more, preferably 15 mL/vessel or more, more preferably 20 mL/vessel or more, more preferably 25 mL/vessel or more, and more preferably 30 mL/vessel or more, and may be 50 mL/vessel or less, more preferably 45 mL/vessel or less, and more preferably 40 mL/vessel or less. For example, when a 500 mL Erlenmeyer flask (an Erlenmeyer flask having a capacity of 500 mL) is used, the amount may be 100 mL/vessel or more, preferably 105 mL/vessel or more, more preferably 110 mL/vessel or more, more preferably 115 mL/vessel or more, and more preferably 120 mL/vessel or more, and may be 150 mL/vessel or less, more preferably 145 mL/vessel or less, more preferably 140 mL/vessel or less, more preferably 135 mL/vessel or less, more preferably 130 mL/vessel or less, and more preferably 125 mL/vessel or less. For example, when a 1000 mL Erlenmeyer flask (an Erlenmeyer flask having a capacity of 1000 mL) is used, the amount may be 250 mL/vessel or more, preferably 260 mL/vessel or more, more preferably 270 mL/vessel or more, more preferably 280 mL/vessel or more, and more preferably 290 mL/vessel or more, and may be 350 mL/vessel or less, more preferably 340 mL/vessel or less, more preferably 330 mL/vessel or less, more preferably 320 mL/vessel or less, and more preferably 310 mL/vessel or less. For example, when a 2000 mL Erlenmeyer flask (an Erlenmeyer flask having a capacity of 2000 mL) is used, the amount may be 500 mL/vessel or more, more preferably 550 mL/vessel or more, and more preferably 600 mL/vessel or more, and may be 1000 mL/vessel or less, more preferably 900 mL/vessel or less, more preferably 800 mL/vessel or less, and more preferably 700 mL/vessel or less. For example, when a 3000 mL Erlenmeyer flask (an Erlenmeyer flask having a capacity of 3000 mL) is used, the amount may be 1000 mL/vessel or more, preferably 1100 mL/vessel or more, more preferably 1200 mL/vessel or more, more preferably 1300 mL/vessel or more, more preferably 1400 mL/vessel or more, and more preferably 1500 mL/vessel or more, and may be 2000 mL/vessel or less, more preferably 1900 mL/vessel or less, more preferably 1800 mL/vessel or less, more preferably 1700 mL/vessel or less, and more preferably 1600 mL/vessel or less. For example, when a 2 L culture bag (a disposable culture bag having a capacity of 2 L) is used, the amount may be 100 mL/bag or more, more preferably 200 mL/bag or more, more preferably 300 mL/bag or more, more preferably 400 mL/bag or more, more preferably 500 mL/bag or more, more preferably 600 mL/bag or more, more preferably 700 mL/bag or more, more preferably 800 mL/bag or more, more preferably 900 mL/bag or more, and more preferably 1000 mL/bag or more, and may be 2000 mL/bag or less, more preferably 1900 mL/bag or less, more preferably 1800 mL/bag or less, more preferably 1700 mL/bag or less, more preferably 1600 mL/bag or less, more preferably 1500 mL/bag or less, more preferably 1400 mL/bag or less, more preferably 1300 mL/bag or less, more preferably 1200 mL/bag or less, and more preferably 1100 mL/bag or less. For example, when a 10 L culture bag (a disposable culture bag having a capacity of 10 L) is used, the amount may be 500 mL/bag or more, more preferably 1 L/bag or more, more preferably 2 L/bag or more, more preferably 3 L/bag or more, more preferably 4 L/bag or more, and more preferably 5 L/bag or more, and may be 10 L/bag or less, more preferably 9 L/bag or less, more preferably 8 L/bag or less, more preferably 7 L/bag or less, and more preferably 6 L/bag or less. For example, when a 20 L culture bag (a disposable culture bag having a capacity of 20 L) is used, the amount may be 1 L/bag or more, more preferably 2 L/bag or more, more preferably 3 L/bag or more, more preferably 4 L/bag or more, more preferably 5 L/bag or more, more preferably 6 L/bag or more, more preferably 7 L/bag or more, more preferably 8 L/bag or more, more preferably 9 L/bag or more, and more preferably 10 L/bag or more, and may be 20 L/bag or less, more preferably 19 L/bag or less, more preferably 18 L/bag or less, more preferably 17 L/bag or less, more preferably 16 L/bag or less, more preferably 15 L/bag or less, more preferably 14 L/bag or less, more preferably 13 L/bag or less, more preferably 12 L/bag or less, and more preferably 11 L/bag or less. For example, when a 50 L culture bag (a disposable culture bag having a capacity of 50 L) is used, the amount may be 1 L/bag or more, more preferably 2 L/bag or more, more preferably 5 L/bag or more, more preferably 10 L/bag or more, more preferably 15 L/bag or more, more preferably 20 L/bag or more, and more preferably 25 L/bag or more, and may be 50 L/bag or less, more preferably 45 L/bag or less, more preferably 40 L/bag or less, more preferably 35 L/bag or less, and more preferably 30 L/bag or less. When the amount of the culture solution is within these ranges, cell aggregates of the appropriate size can be easily formed.

The capacity of the culture vessel that is used may be selected as appropriate and is not particularly limited, but in terms of the area, when seen in plan view, of the bottom surface of the portion in which the liquid culture medium is contained, the lower limit may, for example, be 0.32 cm², preferably 0.65 cm², more preferably 0.95 cm², even more preferably 1.9 cm², still more preferably 3.0 cm², 3.5 cm², 9.0 cm², or 9.6 cm², and the upper limit may, for example, be 1000 cm², preferably 500 cm², more preferably 300 cm², more preferably 150 cm², more preferably 75 cm², still more preferably 55 cm², even more preferably 25 cm², even more preferably 21 cm², and yet more preferably 9.6 cm², or 3.5 cm².

The culture temperature is not particularly limited as long as it is a culture temperature suitable for culturing the pluripotent stem cells that are used. Generally, the temperature is 30° C. to 40° C., and is preferably about 37° C.

The cells are preferably cultured by using a $CO_2$ incubator or the like in an atmosphere with a $CO_2$ concentration of about 1% to 10%, preferably 5%.

[8] Preculturing of Pluripotent Stem Cells

Before inducing the differentiation of the above-mentioned pluripotent stem cell aggregates or pluripotent stem cells into endodermal cells, they may be suspension cultured by using a culture medium containing 2-mercaptoethanol to prepare a cell population. The culture medium used in the preculture may, in accordance with the type of cells, be an MEM medium, a BME medium, a DMEM medium, a DMEM/F12 medium, an αMEM medium, an IMDM medium, an ES medium, a DM-160 medium, a Fisher medium, an F12 medium, a WE medium, an RPMI1640 medium, an Essential 6™ medium (Thermo Fisher Scientific), or the like.

The pluripotent stem cells are precultured in a suspension culture. The above-mentioned suspension culture conditions may be used, and furthermore, the cells may be suspension cultured by being adhered to a microcarrier or the like in advance, suspension cultured in the form of cell clumps composed only of cells, or a polymer such as collagen may be intermixed into the cell clumps. Thus, the form of the preculture is not particularly limited.

The concentration of 2-mercaptoethanol in the culture medium used for the preculture is not particularly limited as long as it is within a range in which the efficiency of differentiation induction increases. For example, the concentration of 2-mercaptoethanol is preferably 1 μM or more, 2 μM or more, 5 μM or more, 10 μM or more, 20 μM or more, 30 μM or more, 40 μM or more, or 50 μM or more, and preferably 200 μM or less, 150 μM or less, 120 μM or less, 100 μM or less, 90 μM or less, 80 μM or less, 70 μM or less, or 60 μM or less.

The culture medium used for the preculture should also preferably be a culture medium to which FGF2 (fibroblast growth factor 2) is not added. In some cases, the efficiency of differentiation to endodermal cells can be increased by using a culture medium to which FGF2 is not added.

The culture medium used for the preculture should also preferably be a culture medium to which TGFβ1 (transforming growth factor β1) is not added. In some cases, the efficiency of differentiation to endodermal cells can be increased by using a culture medium to which TGFβ1 is not added.

The culture medium used for the preculture should also preferably be a culture medium to which a WNT signaling activator is not added. In some cases, the efficiency of differentiation to endodermal cells can be increased by using a culture medium to which a WNT signaling activator is not added.

The culture medium used for the preculture should also preferably be a culture medium to which activin A is not added. In some cases, the efficiency of differentiation to endodermal cells can be increased by using a culture medium to which activin A is not added.

Amino acids, antibiotics, antioxidants, and other additives may also be added to the culture medium used for the preculture. For example, it is possible to add 0.1% to 2% (volume/volume) of NEAA (non-essential amino acids), 0.1% to 2% (volume/volume) of penicillin/streptomycin, 0.1 to 20 mg/mL of BSA or 1% to 25% (volume/volume) (preferably 1% to 20% (volume/volume)) of KnockOut serum replacement (KSR), or the like.

The culture temperature is not particularly limited as long as it is a culture temperature suitable for culturing the pluripotent stem cells that are used. Generally, the temperature is 30° C. to 40° C., and is preferably about 37° C.

The cells are preferably cultured by using a $CO_2$ incubator or the like in an atmosphere with a $CO_2$ concentration of about 1% to 10%, preferably 5%.

The culture period of the preculture of pluripotent stem cells is not particularly limited as long as it is a number of days allowing the cells to be cultured until the pluripotency is increased. For example, it is sufficient that the period not exceed 1 week. More specifically, the culture period may be shorter than 6 days, shorter than 5 days, shorter than 4 days, shorter than 3 days, or 6 hours to 48 hours, about 12 hours to 36 hours, or 18 hours to 24 hours.

[9] Induced Differentiation into Endodermal Cells

In the present invention, the cell population obtained by the above-described preculture is cultured under conditions that allow induced differentiation to endodermal cells, thereby producing endodermal cells.

Endodermal cells have the ability to differentiate into the tissues of organs such as the digestive tract, the lung, the thyroid gland, the pancreas, and the liver, the cells of secretory glands opening onto the digestive tract, and the peritoneum, the pleura, the larynx, the auditory tube, the trachea, the bronchi, and the urinary tract (most of the bladder and the urethra, and part of the ureter). In general, they are sometimes referred to as the definitive endoderm (DE). Differentiation from pluripotent stem cells to endodermal cells can be confirmed by measuring the expression levels of genes specific to endodermal cells. Examples of genes specific to endodermal cells include SOX17, FOXA2, CXCR4, AFP, GATA4, EOMES, and the like. In the present description, endodermal cells are sometimes referred to alternatively as the definitive endoderm.

When inducing the pluripotent stem cells to differentiate into endodermal cells, the pluripotent stem cells are cultured by using a differentiation induction medium.

The differentiation induction medium is not particularly limited as long as it is a culture medium that induces the differentiation of pluripotent stem cells. Examples thereof include serum-containing media and serum-free media containing serum replacement components.

In accordance with the type of cells being used, it is possible to use a primate ES/iPS cell culture medium (ReproCELL medium), a BME medium, a BGJb medium, a CMRL 1066 medium, a Glasgow MEM medium, an Improved MEM Zinc Option medium, an IMDM medium, a Medium 199 medium, an Eagle MEM medium, an αMEM medium, a DMEM medium, a Ham's medium, an RPMI1640 medium, a Fischer's medium, and culture media obtained by mixing two or more media arbitrarily selected from these media. The culture medium is not particularly limited as long as it is a culture medium that can be used to culture animal cells.

The differentiation induction medium may contain a serum component or a serum replacement component. Examples of the serum component or the serum replacement component include albumin, insulin, transferrin, fatty acids, collagen precursors, trace elements (for example, zinc or selenium), B-27 Supplement (Thermo Fisher Scientific), N2

Supplement, N21 Supplement (R&D Systems), NeuroBrew-21 supplement (Miltenyi Biotec), KnockOut serum replacement (KSR), 2-mercaptoethanol, 3'thiolglycerol, and equivalents thereof.

Various additives, antibiotics, antioxidants, and the like may be further added to the differentiation induction medium. For example, it is possible to add 0.1 mM to 5 mM of sodium pyruvate, 0.1% to 2% (volume/volume) of non-essential amino acids, 0.1% to 2% (volume/volume) of penicillin, 0.1% to 2% (volume/volume) of streptomycin, and 0.1% to 2% (volume/volume) of amphotericin B, catalase, glutathione, galactose, retinoic acid (vitamin A), superoxide dismutase, ascorbic acid (vitamin C), D-α-tocopherol (vitamin E), and the like.

A differentiation-inducing factor is further added to the differentiation induction medium. Details regarding the differentiation-inducing factor will be described below.

The pluripotent stem cells are preferably cultured in a suspension culture during the induced differentiation. The cells may be suspension cultured by being adhered to a microcarrier or the like, suspension cultured in the form of cell clumps composed only of cells, or a polymer such as collagen may be intermixed into the cell clumps. Thus, the form of the culture is not particularly limited.

The culture temperature used when culturing the cells to induce differentiation is not particularly limited as long as it is a culture temperature suitable for culturing the pluripotent stem cells that are used. Generally, the temperature is 30° C. to 40° C., and is preferably about 37° C.

The cells are preferably cultured by using a $CO_2$ incubator or the like in an atmosphere with a $CO_2$ concentration of about 1% to 10%, preferably 5%.

The culture period for the differentiation culture from the pluripotent stem cells to endodermal cells is not particularly limited as long as the cells are converted to a cell type in which the cell properties of endodermal cells are exhibited. For example, it is sufficient for the period to be within 2 weeks. More specifically, the culture period may be 2 days or longer and 8 days or shorter, more preferably 2 days or longer and 7 days or shorter, and even more preferably 3 days or longer and 6 days or shorter. As an example, the culture period may be 4 or 5 days.

[10] Differentiation-Inducing Factor Used to Induce Differentiation into Endodermal Cells, and Other Additives Preferably, the endodermal cells are endodermal cells that have been induced to differentiate by culturing a pluripotent stem cell population in a culture medium containing a TGFβ (transforming growth factor β) superfamily signaling activator, and thereafter culturing the cells in a culture medium to which FGF2 and BMP4 (bone morphogenetic protein 4) are not added.

When activin A is used in the culture medium containing a TGFβ superfamily signaling activator, the initial concentration of activin A added is preferably 1 ng/mL or more, 2 ng/mL or more, 3 ng/mL or more, 5 ng/mL or more, 10 ng/mL or more, 20 ng/mL or more, 30 ng/mL or more, 40 ng/mL or more, or 50 ng/mL or more, and preferably 1,000 ng/mL or less, 900 ng/mL or less, 800 ng/mL or less, 700 ng/mL or less, 600 ng/mL or less, 500 ng/mL or less, 400 ng/mL or less, 300 ng/mL or less, 200 ng/mL or less, 150 ng/mL or less, or 100 ng/mL or less.

When FGF2 is used in the culture medium containing a TGFβ superfamily signaling activator, the initial concentration of FGF2 added is preferably 1 ng/mL or more, 2 ng/mL or more, 3 ng/mL or more, 5 ng/mL or more, 10 ng/mL or more, 20 ng/mL or more, 30 ng/mL or more, or 40 ng/mL or more, and preferably 1,000 ng/mL or less, 900 ng/mL or less, 800 ng/mL or less, 700 ng/mL or less, 600 ng/mL or less, 500 ng/mL or less, 400 ng/mL or less, 300 ng/mL or less, 200 ng/mL or less, 150 ng/mL, 100 ng/mL or less, 90 ng/mL or less, 80 ng/mL or less, or 70 ng/mL or less.

When BMP4 is used in the culture medium containing a TGFβ superfamily signaling activator, the initial concentration of BMP4 added is preferably 1 ng/mL or more, 2 ng/mL or more, 3 ng/mL or more, 5 ng/mL or more, 6 ng/mL or more, 7 ng/mL or more, 8 ng/mL or more, 9 ng/mL or more, 10 ng/mL or more, 11 ng/mL or more, 12 ng/mL or more, 13 ng/mL or more, 14 ng/mL or more, or 15 ng/mL or more, and preferably 1,000 ng/mL or less, 900 ng/mL or less, 800 ng/mL or less, 700 ng/mL or less, 600 ng/mL or less, 500 ng/mL or less, 400 ng/mL or less, 300 ng/mL or less, 200 ng/mL or less, 150 ng/mL, 100 ng/mL or less, 90 ng/mL or less, 80 ng/mL or less, 70 ng/mL or less, 60 ng/mL or less, 50 ng/mL or less, 40 ng/mL or less, or 30 ng/mL or less.

The culture medium to which FGF2 and BMP4 are not added preferably contains activin A.

When the culture medium to which FGF2 and BMP4 are not added contains activin A, the initial concentration of activin A added is preferably 1 ng/mL or more, 2 ng/mL or more, 3 ng/mL or more, 5 ng/mL or more, 10 ng/mL or more, 20 ng/mL or more, 30 ng/mL or more, 40 ng/mL or more, or 50 ng/mL or more, and preferably 1,000 ng/mL or less, 900 ng/mL or less, 800 ng/mL or less, 700 ng/mL or less, 600 ng/mL or less, 500 ng/mL or less, 400 ng/mL or less, 300 ng/mL or less, 200 ng/mL or less, 150 ng/mL or less, or 100 ng/mL or less.

The culture medium to which FGF2 and BMP4 are not added preferably contains at least one or more substances selected from the group consisting of insulin, transferrin, sodium selenite, and ethanolamine.

The concentration of insulin added is preferably 0.001 μg/mL or more, 0.01 μg/mL or more, 0.05 μg/mL or more, 0.1 μg/mL or more, or 0.2 μg/mL or more, and preferably 10,000 μg/mL or less, 1,000 μg/mL or less, 100 μg/mL or less, 10 μg/mL or less, 9 μg/mL or less, 8 μg/mL or less, 7 μg/mL or less, 6 μg/mL or less, 5 μg/mL or less, 4 μg/mL or less, 3 μg/mL or less, or 2 μg/mL or less. The concentration of transferrin added is preferably 0.001 μg/mL or more, 0.01 μg/mL or more, 0.05 μg/mL or more, 0.06 μg/mL or more, 0.07 μg/mL or more, 0.08 μg/mL or more, 0.09 μg/mL or more, 0.1 μg/mL or more, or 0.11 μg/mL or more, and preferably 10,000 μg/mL or less, 1,000 μg/mL or less, 100 μg/mL or less, 10 μg/mL or less, 9 μg/mL or less, 8 μg/mL or less, 7 μg/mL or less, 6 μg/mL or less, 5 μg/mL or less, 4 μg/mL or less, 3 μg/mL or less, 2 μg/mL or less, 1.9 μg/mL or less, 1.8 μg/mL or less, 1.7 μg/mL or less, 1.6 μg/mL or less, 1.5 μg/mL or less, 1.4 μg/mL or less, 1.3 μg/mL or less, 1.2 μg/mL or less, or 1.1 μg/mL or less. The concentration of sodium selenite added is preferably 0.001 ng/mL or more, 0.01 ng/mL or more, or 0.1 ng/mL or more, and preferably 10,000 ng/mL or less, 1,000 ng/mL or less, 100 ng/mL or less, 10 ng/mL or less, or 1 ng/mL or less. The concentration of ethanolamine added is preferably 0.001 μg/mL or more, 0.01 μg/mL or more, 0.02 μg/mL or more, 0.03 μg/mL or more, or 0.04 μg/mL or more, and preferably 10,000 μg/mL or less, 1,000 μg/mL or less, 100 μg/mL or less, 10 μg/mL or less, 1 μg/mL or less, 0.9 μg/mL or less, 0.8 μg/mL or less, 0.7 μg/mL or less, 0.6 μg/mL or less, 0.5 μg/mL or less, or 0.4 μg/mL or less.

It is preferable for the culture medium containing a TGFβ superfamily signaling activator and/or the culture medium to which FGF2 and BMP4 are not added to further contain 2-mercaptoethanol. The action of 2-mercaptoethanol can raise the efficiency of induced differentiation to endodermal cells.

It is preferable for the culture medium containing a TGFβ superfamily signaling activator to further contain a WNT signaling activator.

When CHIR99021 is used in the culture medium containing a TGFβ superfamily signaling activator, the initial concentration added is preferably 0.01 μM or more, 0.02 μM or more, 0.03 μM or more, 0.04 μM or more, 0.05 μM or more, 0.1 μM or more, 0.2 μM or more, 0.3 μM or more, 0.4 μM or more, 0.5 μM or more, 0.6 μM or more, 0.7 μM or more, 0.8 μM or more, 0.9 μM or more, 1 μM or more, or 2 μM or more, and preferably 100 μM or less, 90 μM or less, 80 μM or less, 70 μM or less, 60 μM or less, 50 μM or less, 45 μM or less, 40 μM or less, 35 μM or less, 30 μM or less, 25 μM or less, 20 μM or less, 15 μM or less, 10 μM or less, or 5 μM or less. More preferably, the initial concentration is 3 μM or 4 μM.

The culture medium containing a TGFβ superfamily signaling activator and/or the culture medium to which FGF2 and BMP4 are not added contains at least glucose. The lower limit of the concentration of glucose contained in the culture medium is not particularly limited as long as it is a concentration at which the cells can proliferate, but it should preferably be 0.01 g/L or more. Additionally, the upper limit of the concentration of glucose contained in the culture medium is not particularly limited as long as it is a concentration at which the cells do not die, but it should preferably be, for example, 10 g/L or less. As another embodiment, a culture medium containing less than 2.0 g/L of glucose is preferable for the purposes of achieving efficient differentiation to endodermal somatic cells. The glucose concentration in the culture medium containing a TGFβ superfamily signaling activator and/or the culture medium to which FGF2 and BMP4 are not added may be 1.0 g/L or less, 0.9 g/L or less, 0.8 g/L or less, 0.7 g/L or less, or 0.6 g/L or less. The lower limit of the glucose concentration in the case in which the culture medium containing a TGFβ superfamily signaling activator and/or the culture medium to which FGF2 and BMP4 are not added contains glucose is not particularly limited, and may be 0.01 g/L or more, 0.02 g/L or more, 0.05 g/L or more, 0.1 g/L or more, 0.2 g/L or more, 0.3 g/L or more, 0.4 g/L or more, or 0.5 g/L or more.

[11] Step of Producing Primitive Gut Tube (PGT) Cells from Endodermal Cells

In the present invention, primitive gut tube (PGT) cells can be induced by culturing endodermal cells, which have been induced to differentiate from pluripotent cells, under conditions suitable for inducing differentiation to primitive gut tube (PGT) cells.

Preferably, the endodermal cells that have been induced from pluripotent stem cells can be cultured in a culture medium containing an insulin receptor signaling activator.

The lower limit of the amount of the insulin receptor signaling activator added to the culture medium is preferably 0.001 mg/L, more preferably 0.01 mg/L, more preferably 0.1 mg/L, more preferably 1 mg/L, more preferably 2 mg/L, and more preferably 3 mg/L. The upper limit of the amount of the insulin receptor signaling activator added to the culture medium is preferably 1000 mg/L, more preferably 500 mg/L, more preferably 100 mg/L, more preferably 90 mg/L, more preferably 80 mg/L, more preferably 70 mg/L, more preferably 60 mg/L, more preferably 50 mg/L, more preferably 40 mg/L, more preferably 30 mg/L, more preferably 20 mg/L, and more preferably 10 mg/L.

Preferably, the endodermal cells induced to differentiate from pluripotent stem cells can be cultured in a culture medium containing insulin, transferrin, and selenous acid.

The insulin, transferrin, and selenous acid may be contained in the culture medium in the form of a commercially available mixture such as a B27 supplement. Additionally, ethanolamine may be contained in addition to insulin, transferrin, and selenous acid.

The lower limit of the amount of transferrin added to the culture medium is preferably 0.001 mg/L, more preferably 0.01 mg/L, more preferably 0.1 mg/L, more preferably 1 mg/L, more preferably 1.1 mg/L, more preferably 1.2 mg/L, more preferably 1.3 mg/L, more preferably 1.4 mg/L, more preferably 1.5 mg/L, and more preferably 1.6 mg/L. The upper limit of the amount of transferrin added to the culture medium is preferably 1000 mg/L, more preferably 500 mg/L, more preferably 100 mg/L, more preferably 90 mg/L, more preferably 80 mg/L, more preferably 70 mg/L, more preferably 60 mg/L, more preferably 50 mg/L, more preferably 40 mg/L, more preferably 30 mg/L, more preferably 20 mg/L, more preferably 10 mg/L, more preferably 9 mg/L, more preferably 8 mg/L, more preferably 7 mg/L, more preferably 6 mg/L, more preferably 5 mg/L, more preferably 4 mg/L, more preferably 3 mg/L, and more preferably 2 mg/L.

The lower limit of the amount of selenous acid added to the culture medium is preferably 0.001 μg/L, more preferably 0.01 μg/L, more preferably 0.1 μg/L, more preferably 1 μg/L, more preferably 1.1 μg/L, more preferably 1.2 μg/L, more preferably 1.3 μg/L, more preferably 1.4 μg/L, more preferably 1.5 μg/L, more preferably 1.6 μg/L, more preferably 1.7 μg/L, more preferably 1.8 μg/L, more preferably 1.9 μg/L, and more preferably 2 μg/L. The upper limit of the amount of selenous acid added to the culture medium is preferably 1000 μg/L, more preferably 500 μg/L, more preferably 100 μg/L, more preferably 90 μg/L, more preferably 80 μg/L, more preferably 70 μg/L, more preferably 60 μg/L, more preferably 50 μg/L, more preferably 40 μg/L, more preferably μg/L, more preferably 20 μg/L, more preferably 10 μg/L, more preferably 9 μg/L, more preferably 8 μg/L, and more preferably 7 μg/L.

Preferably, the endodermal cells induced to differentiate from pluripotent stem cells can be cultured in a culture medium containing an FGF receptor signaling activator. For the purpose of achieving more efficient differentiation induction, it is preferable to culture the cells in the absence of FGF2.

The lower limit of the amount of the FGF receptor signaling activator added to the culture medium is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of the FGF receptor signaling activator added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

Preferably, the endodermal cells induced to differentiate from pluripotent stem cells can be cultured in a culture medium containing a B27 (registered trademark) supplement and/or FGF7.

The lower limit of the amount of the B27 (registered trademark) supplement added to the culture medium is preferably 0.01%, more preferably 0.1%, more preferably 0.2%, more preferably 0.3%, more preferably 0.4%, more preferably 0.5%, more preferably 0.6%, more preferably 0.7%, more preferably 0.8%, and more preferably 0.9%. The upper limit of the amount of the B27 (registered trademark) supplement added to the culture medium is preferably 10%, more preferably 9%, more preferably 8%, more preferably 7%, more preferably 6%, more preferably 5%, more preferably 4%, more preferably 3%, more preferably 2%, and more preferably 1%.

The lower limit of the amount of FGF7 added to the culture medium is preferably 1 ng/mL, more preferably 5 ng/mL, more preferably 10 ng/mL, more preferably 20 ng/mL, more preferably 30 ng/mL, more preferably 40 ng/mL, and more preferably 50 ng/mL. The upper limit of the amount of FGF7 added to the culture medium is preferably 500 ng/mL, more preferably 400 ng/mL, more preferably 300 ng/mL, more preferably 200 ng/mL, more preferably 100 ng/mL, more preferably 90 ng/mL, more preferably 80 ng/mL, more preferably 70 ng/mL, more preferably 60 ng/mL, and more preferably 50 ng/mL.

For the purposes of achieving more efficient differentiation induction and producing pancreatic β cells having excellent therapeutic effects, it is preferable for the differentiation induction from the endodermal cells, which have been induced from pluripotent stem cells, to primitive gut tube (PGT) cells to be performed by culturing the cells in the absence of a bone morphogenetic protein (BMP) signaling inhibitor. The cells can be cultured in a culture medium containing an FGF receptor signaling activator.

More preferably, the cells are cultured in the absence of a hedgehog (HH) signaling inhibitor, cultured in the absence of a TGFβ signaling inhibitor, and cultured in the absence of retinoic acid and analogs thereof.

As the culture medium, in accordance with the types of cells that are used, an MEM medium, a BME medium, a DMEM medium, a DMEM/F12 medium, an αMEM medium, an IMDM medium, an ES medium, a DM-160 medium, a Fisher medium, an F12 medium, a WE medium, an RPMI1640 medium, an Essential6™ medium (Thermo Fisher Scientific), or the like may be used.

The culture medium may further contain bovine serum albumin (BSA) or human serum albumin (HSA). Preferably, the BSA or HSA contains 2 mg/g or less of lipids and 0.2 mg/g or less of free fatty acids.

The lower limit of the amount of BSA added to the culture medium is preferably 0.01% (% by weight), more preferably 0.05%, more preferably 0.10%, more preferably 0.15%, more preferably 0.20%, and more preferably 0.25%. The upper limit of the amount of BSA added to the culture medium is preferably 1.00%, more preferably 0.90%, more preferably 0.80%, more preferably 0.70%, more preferably 0.60%, more preferably 0.50%, more preferably 0.40%, more preferably 0.30%, and more preferably 0.25%.

The culture medium may further contain sodium pyruvate.

The lower limit of the amount of sodium pyruvate added to the culture medium is preferably 0.01 mmol/L, more preferably 0.05 mmol/L, more preferably 0.1 mmol/L, more preferably 0.2 mmol/L, more preferably 0.5 mmol/L, more preferably 0.6 mmol/L, more preferably 0.7 mmol/L, more preferably 0.8 mmol/L, more preferably 0.9 mmol/L, and more preferably 1 mmol/L. The upper limit of the amount of sodium pyruvate added to the culture medium is preferably 20 mmol/L, more preferably 15 mmol/L, more preferably 10 mmol/L, more preferably 5 mmol/L, more preferably 4 mmol/L, more preferably 3 mmol/L, more preferably 2 mmol/L, and more preferably 1 mmol/L.

The culture medium may further contain NEAA (for example, 1× non-essential amino acids (NEAA, Wako) or the like).

The lower limit of the amount of NEAA contained in the culture medium is preferably 0.05× NEAA, more preferably 0.1× NEAA, more preferably 0.5× NEAA, more preferably 0.6× NEAA, more preferably 0.7× NEAA, more preferably 0.8× NEAA, more preferably 0.9× NEAA, and more preferably 1× NEAA. The upper limit of the amount of NEAA contained in the culture medium is preferably 20× NEAA, more preferably 15× NEAA, more preferably 10× NEAA, more preferably 5× NEAA, more preferably 4× NEAA, more preferably 3× NEAA, more preferably 2× NEAA, and more preferably 1× NEAA.

The differentiation induction medium may further contain antibiotics such as penicillin and streptomycin.

The culture temperature is not particularly limited as long as it is a culture temperature suitable for culturing the pluripotent stem cells that are used. Generally, the temperature is 30° C. to 40° C., and is preferably about 37° C.

The cells are preferably cultured by using a $CO_2$ incubator or the like in an atmosphere with a $CO_2$ concentration of about 1% to 10%, preferably 5%.

The culture may be implemented while stirring. Although the stirring speed is not particularly limited, the upper limit is preferably 200 rpm, more preferably 150 rpm, even more preferably 120 rpm, more preferably 110 rpm, more preferably 100 rpm, more preferably 90 rpm, more preferably 80 rpm, more preferably 70 rpm, particularly preferably 60 rpm, and most preferably 55 rpm. The lower limit is preferably 1 rpm, more preferably 10 rpm, even more preferably 20 rpm, more preferably 30 rpm, more preferably 40 rpm, particularly preferably 50 rpm, and most preferably 55 rpm.

The culture duration for inducing differentiation from endodermal cells (definitive endoderm) to primitive gut tube cells is generally from 24 hours to 120 hours, and is preferably about 48 hours to 96 hours. For example, it may be 72 hours.

[12] Use of Pancreatic β Cells

The pancreatic β cells obtained by the method of the present invention have high insulin secretory capacity and can provide strong therapeutic effects for diabetes. In other words, when the method of the present invention is used to obtain pancreatic β cells (sometimes referred to as insulin-producing cells), they can be used to treat diabetes by transplanting the cells with a catheter or the like, or by transplanting the cells sealed in an immunoisolation device or the like. Additionally, by obtaining pancreatic cells that are metabolic, such as pancreatic β cells, they can be used to treat type I diabetes by directly injecting insulin produced by the pancreatic β cells.

Hereinafter, the present invention will be explained in detail by providing examples, but the present invention is not limited to these examples.

EXAMPLES

Comparative Example 11

<Maintenance Culture of Pluripotent Stem Cells>

The human iPS cell line TKDN4-M (The Institute of Medical Science, The University of Tokyo) was subjected to an undifferentiated-state maintenance culture using a human iPS cell medium (DMEM/Ham's F12 (Wako) containing 20% KnockOut serum replacement (KSR; Gibco), 1× non-essential amino acids (NEAA; Wako), 55 μmoL/L 2-mercaptoethanol (2-ME; Gibco), 7.5 ng/mL recombinant human fibroblast growth factor (FGF2; PeproTech), and 0.5× penicillin and streptomycin (PS; Wako)) on SNL feeder cells treated with mitomycin-C(Wako). Alternatively, the cell line was subjected to an undifferentiated-state maintenance culture on a plate coated with vitronectin (Gibco) using an Essential 8 medium (E8; Gibco) containing 1× penicillin, streptomycin and amphotericin B (Wako). The cells were cultured by adding Y27632 in such a way that the final concentration was 10 µM only at the time of seeding. The cells were cultured at 37° C. in a 5% $CO_2$ incubator.

<Preparation of Aggregates>

The human iPS cell line TkDN4-M (The Institute of Medical Science, The University of Tokyo) was rinsed once with PBS and incubated using accumax (Innovative Cell Technologies, Inc.) at 37° C. for 5 to 15 minutes, then dispersed to single cells by pipetting and collected. The cells, numbering $3 \times 10^7$, were suspended in 30 mL of an mTeSR1 medium containing 10 µM of Y27632, transferred to a 30 mL single-use bioreactor (ABLE Corporation), mounted on a six-channel magnetic stirrer (ABLE Corporation), and suspension cultured for 1 day in a 5% $CO_2$ incubator at 37° C., while stirring at a speed of 45 rpm.

<Preculture of Pluripotent Stem Cells>

A cell population forming an aggregate obtained by the maintenance culture was suspended in DMEM/Ham's F12 (Wako) containing 20% (volume/volume) KnockOut serum replacement (KSR; Gibco), 1× non-essential amino acids (NEAA; Wako), 55 µmol/L 2-mercaptoethanol (Gibco), and 0.5× penicillin and streptomycin (PS; Wako), transferred to a 30 mL single-use bioreactor (ABLE Corporation), mounted on a six-channel magnetic stirrer (ABLE Corporation), and suspension cultured for 1 day in a 5% $CO_2$ incubator at 37° C., while stirring at a speed of 45 rpm.

<Induced Differentiation to Pancreatic β Cells>

A cell population obtained by a preculture was first induced to differentiate to endodermal cells (definitive endoderm; DE). Specifically, for the first and second days, the cells were suspension cultured in RPMI1640 (Wako) containing 0.25% bovine serum albumin (BSA; Sigma), 0.4× PS, 1 mmol/L sodium pyruvate (Wako), 1× NEAA, 80 ng/mL recombinant human activin A (PeproTech), 20 ng/mL recombinant bone morphogenetic protein 4 (BMP4; PeproTech), and 3 µmol/L CHIR99021 (Wako). On the third day, the cells were suspension cultured after removing only CHIR99021, or CHIR99021, BMP4 and FGF2 from this culture medium, and on the fourth day, the cells were suspension cultured for one day in a culture medium to which 0.5% KSR was further added, thereby inducing differentiation to endodermal cells. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 45 rpm.

The endodermal cells obtained above were induced to differentiate to primitive gut tube (PGT) cells. Specifically, the cells were suspension cultured for 2 to 3 days in an RPMI1640 medium containing 0.25% BSA, 1 mmol/L sodium pyruvate, 1× NEAA, 0.4× PS, 50 ng/mL recombinant human FGF7 (PeproTech), 1% B27 supplement (Gibco), 0.3% ITS-X, 0.5 µmol/L EC23, 0.3 µmol/L ILV (indolactam V), 0.2 µmol/L LDN193189, and 0.25 µmol/L SANT1. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm.

The primitive gut tube (PGT) cells obtained above were induced to differentiate to posterior foregut (PFG) cells. Specifically, the cells were suspension cultured for 4 days in DMEM (with 8 mM glucose) containing 0.15% BSA, 0.4× PS, 1× NEAA, 1% B27 supplement (Gibco), 0.3% ITS-X, 50 ng/mL recombinant human FGF7 (PeproTech), 0.5 µmol/L EC23, 1 µmol/L dorsomorphin (Wako), and 0.25 µmol/L SANT1. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm.

The posterior foregut (PFG) cells obtained above were induced to differentiate to pancreatic progenitor (PP) cells. Specifically, the cells were suspension cultured for 3 days in DMEM (with 8 mM glucose) containing 0.15% BSA, 0.4× PS, 1× NEAA, 50 ng/mL recombinant human FGF10 (PeproTech), 1% B27 supplement (Gibco), 0.3% ITS-X, 0.04 µmol/L EC23, 0.3 µmol/L indolactam V (ILV, Cayman), 0.2 µmol/L LDN193189, 0.25 µmol/L SANT1, 10 µmol/L Alk5 inhibitor II (Biovision, RepSox), and µmol/L $ZnSO_4$. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm.

The pancreatic progenitor (PP) cells obtained above were induced to differentiate to pancreatic endocrine progenitor (EP) cells. Specifically, the cells were suspension cultured for 7 days in DMEM (with 20 mM glucose) containing 0.15% BSA, 0.4× PS, 2 mmol/L L-glutamine, 1% B27 supplement (Gibco), 0.3% ITS-X, 20 ng/mL EGF, 50 ng/mL Exendin 4, 0.02 µmol/L EC23, 0.2 µmol/L LDN193189, 0.25 µmol/L SANT1, 10 µmol/L Alk5 inhibitor II (RepSox), 0.5 µmol/L DBZ, 10 µmol/L Y27632, 5 µmol/L $ZnSO_4$, 10 ng/mL heparin, and 5 mmol/L nicotinamide. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm.

The pancreatic endocrine progenitor (EP) cells obtained above were induced to differentiate to pancreatic β cells. Specifically, the cells were suspension cultured for 10 days in DMEM (with 20 mM glucose) containing 0.15% BSA, 0.4× PS, 2 mmol/L L-glutamine, 1% B27 supplement (Gibco), 0.3% ITS-X, 10 ng/mL BMP4, 50 ng/mL recombinant human hepatocyte growth factor (HGF, PeproTech), 50 ng/mL insulin-like growth factor 1 (IGF1, PeproTech), 10 µmol/L Alk5 inhibitor II (RepSox), 50 ng/mL Exendin 4, 5 mmol/L nicotinamide (Sigma), 5 µmol/L forskolin (Wako), 5 µmol/L $ZnSO_4$, and 10 ng/mL heparin. The cells obtained as a result thereof will be referred to as iPS-β cells. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm.

Example 1

Primitive gut tube (PGT) cells were produced by the same method as in Comparative Example 1, then the primitive gut tube (PGT) cells were induced to differentiate to posterior foregut (PFG) cells by suspension culturing the cells for 4 days in DMEM (with 8 mM glucose) containing 0.15% BSA, 0.4× PS, 1× NEAA, 1% B27 supplement (Gibco), 0.3% ITS-X, 50 ng/mL recombinant human FGF7 (PeproTech), 0.5 µmol/L EC23, 0.3 µmol/L ILV (indolactam V), 0.2 µmol/L LDN193189, and 0.25 µmol/L SANT1. The suspension culture was implemented by mounting a 30 mL single-use bioreactor (ABLE Corporation) on a six-channel magnetic stirrer (ABLE Corporation), and suspension culturing the cells in a 5% $CO_2$ incubator at 37° C., while stirring at a speed of 55 rpm. The induced differentiation to pancreatic progenitor (PP) cells, the induced differentiation to pancreatic endocrine progenitor (EP) cells, and the induced differentiation to pancreatic β cells were performed by culturing the cells by the same methods as in Comparative Example 1.

Example 2

Endodermal cells were produced by the same method as in Comparative Example 1, and the endodermal cells were induced to differentiate to primitive gut tube (PGT) cells by suspension culturing the cells for 3 days in an RPM11640 medium containing 0.25% BSA, 0.4× PS, 1× NEAA, 1% B27 supplement (Gibco), 0.3% ITS-X, and 50 ng/mL recombinant human FGF7 (PeproTech). The suspension culture was implemented by mounting a 30 mL single-use bioreactor (ABLE Corporation) on a six-channel magnetic stirrer (ABLE Corporation), and suspension culturing the cells in a $CO_2$ incubator at 37° C., while stirring at a speed of 55 rpm. The induced differentiation to posterior foregut (PFG) cells, pancreatic progenitor (PP) cells, pancreatic endocrine progenitor (EP) cells, and pancreatic β cells were performed by culturing the cells by the same methods as in Example 1.

Reference Example 1

<Maintenance Culture of Pluripotent Stem Cells>

The human iPS cell line TKDN4-M (The Institute of Medical Science, The University of Tokyo) was subjected to an undifferentiated-state maintenance culture using a human iPS cell medium (DMEM/Ham's F12 (Wako) containing 20% KnockOut serum replacement (KSR; Gibco), 1× non-essential amino acids (NEAA; Wako), 55 µmoL/L 2-mercaptoethanol (2-ME; Gibco), 7.5 ng/mL recombinant human fibroblast growth factor (FGF2; PeproTech), and 0.5× penicillin and streptomycin (PS; Wako)) on SNL feeder cells treated with mitomycin-C(Wako). Alternatively, the cell line was subjected to an undifferentiated-state maintenance culture on a plate coated with vitronectin (Gibco) using an Essential 8 medium (E8; Gibco) containing 1× penicillin, streptomycin and amphotericin B (Wako). The cells were cultured by adding Y27632 in such a way that the final concentration was 10 µM only at the time of seeding. The cells were cultured at 37° C. in a 5% $CO_2$ incubator.
<Preculture of Pluripotent Stem Cells>

Cell populations obtained by the maintenance culture were cultured for 1 day in a state of adhesion to feeder cells or a dish, in other words, the TkDN4-M cell line was cultured on SNL feeder cells treated with mitomycin-C, and the 454E2 cell line was cultured on a dish coated with vitronectin, in DMEM/Ham's F12 (Wako) containing 20% KnockOut serum replacement, 1× non-essential amino acids, 55 µmol/L 2-mercaptoethanol, 7.5 ng/mL recombinant human fibroblast growth factor, and 0.5× penicillin and streptomycin (PS; Wako). The culture was implemented in a 5% $CO_2$ incubator at 37° C.
<Induced Differentiation to Pancreatic β Cells>

The induced differentiation to pancreatic β cells was performed in accordance with the method described in Yabe, S. G., Fukuda, S., Takeda, E, Nashiro, K., Shimoda, M., Okochi, H., "Efficient generation of functional pancreatic n-cells from human induced pluripotent stem cells", J. Diabetes, 2017 Feb., 9(2):168-179.

The cell populations obtained by the preculture were first induced to differentiate to endodermal cells (definitive endoderm, DE). Specifically, for the first 2 days, the cells were cultured in a state of adhesion to a dish in RPM11640 containing 0.5% bovine serum albumin, 0.4× PS, 1 mmol/L sodium pyruvate, 1× NEAA, 80 ng/mL recombinant human activin A, 50 ng/mL FGF2, 20 ng/mL recombinant bone morphogenetic protein 4, and 3 µmol/L CHIR99021. On the third day, the cells were cultured in the state of adhesion to the dish after removing only CHIR99021 from this culture medium, and on the fourth day, the cells were cultured in the state of adhesion to the dish for 1 day in a culture medium to which 1% (volume/volume) KSR was further added. The culture was implemented in a 5% $CO_2$ incubator at 37° C.

The endodermal cells obtained above were induced to differentiate to primitive gut tube (PGT) cells. Specifically, the cells were cultured for 2 days in an RPM11640 medium containing 0.5% BSA, 1 mmol/L sodium pyruvate, 1× NEAA, 0.4× PS, 50 ng/mL FGF2, 50 ng/mL recombinant human FGF7 (PeproTech), 2% B27 supplement (Gibco), 0.67 µmol/L EC23 (Santa Cruz), 1 µmol/L dorsomorphin (Wako), 10 µmol/L SB431542 (Wako), and 0.25 µmol/L SANT1 (Wako). The culture was implemented in a 5% $CO_2$ incubator at 37° C.

The primitive gut tube (PGT) cells obtained above were induced to differentiate to posterior foregut (PFG) cells. Specifically, the cells were cultured for 4 days in DMEM-high glucose (Wako) containing 0.4× PS, 1× NEAA, 50 ng/mL FGF2, 2% B27, 0.67 µmol/L EC23, 1 µmol/L dorsomorphin, 10 µmol/L SB431542, and 0.25 µmol/L SANT1. The culture was implemented in a 5% $CO_2$ incubator at 37° C.

The posterior foregut (PFG) cells obtained above were induced to differentiate to pancreatic progenitor (PP) cells. Specifically, the cells were cultured for 3 days in DMEM-high glucose containing 0.4× PS, 1× NEAA, 50 ng/mL recombinant human FGF10 (PeproTech), 2% B27, 0.5 µmol/L EC23, 1 µmol/L dorsomorphin, 0.25 µmol/L SANT1, 5 µmol/L Alk5 inhibitor II (Biovision), and 0.3 µmol/L indolactam V (ILV, Cayman). The culture was implemented in a 5% $CO_2$ incubator at 37° C.

The pancreatic progenitor (PP) cells obtained above were induced to differentiate to pancreatic endocrine progenitor (EP) cells. Specifically, the cells were cultured for 3 days in Advanced-DMEM (Gibco) containing 0.4× PS, 2 mmol/L L-glutamine, 2% B27, 0.2 µmol/L EC23, 1 µmol/L dorsomorphin, 0.25 µmol/L SANT1, 5 µmol/L Alk5 inhibitor II (RepSox), and 50 ng/mL Exendin 4 (Sigma). The culture was implemented in a 5% $CO_2$ incubator at 37° C.

The pancreatic endocrine progenitor (EP) cells obtained above were induced to differentiate to pancreatic β cells (hereinafter sometimes referred to as "iPS-β cells"). Specifically, the cells were cultured for 6 days in Advanced-DMEM containing 0.4× PS, 2 mmol/L L-glutamine, 2% B27, 10 ng/mL BMP4, 10 ng/mL FGF2, 50 ng/mL recombinant human hepatocyte growth factor (HGF, PeproTech), 50 ng/mL insulin-like growth factor 1 (IGF1, PeproTech), 5 µmol/L Alk5 inhibitor II (RepSox), 50 ng/mL Exendin 4, 5 mmol/L nicotinamide (Sigma), and 5 µmol/L forskolin (Wako). The culture was implemented in a 5% $CO_2$ incubator at 37° C.

<Quantitative RT-PCR>

The total RNA of the differentiation-induced iPS-β cells was isolated and purified using ISOGEN (Wako), and cDNA was synthesized using PrimeScript II (Takara Bio). Using the synthesized cDNA as a template, quantitative PCR was implemented by means of a MyiQ qPCR machine (Bio-Rad), using GoTaq qPCR master mix (Promega). The detection was performed by the intercalation method using SYBR Green, and the gene expression level comparison was carried out by the relative quantification method by means of the comparative Ct method. The expression level of each gene was standardized by OAZi or β-actin, which are housekeeping genes.

The base sequences of the primers used in the quantitative PCR are as indicated below.

```
OAZ1 F:
                                   (SEQ ID NO: 1)
GTC AGA GGG ATC ACA ATC TTT CAG

OAZ1 R:
                                   (SEQ ID NO: 2)
GTC TTG TCG TTG GAC GTT AGT TC

INS F:
                                   (SEQ ID NO: 3)
TTG TGA ACC AAC ACC TGT GC

INS R:
                                   (SEQ ID NO: 4)
GTG TGT AGA AGA AGC CTC GTT CC

NKX6.1 F:
                                   (SEQ ID NO: 5)
ATC TTC GCC CTG GAG AAG AC

NKX6.1 R:
                                   (SEQ ID NO: 6)
CGT GCT TCT TCC TCC ACT TG

β-Actin F:
                                   (SEQ ID NO: 7)
CCT CAT GAA GAT CCT CAC CGA β-Actin R:
                                   (SEQ ID NO: 8)
TTG CCA ATG GTG ATG ACC TGG GNAS F:
                                   (SEQ ID NO: 9)
ACA TCA TTC AGC GCA TGC AC GNAS R:
                                   (SEQ ID NO: 10)
GTA GGC CGC CTT AAG CTT TC GCK F:
                                   (SEQ ID NO: 11)
CAG CTT GAC CAG ACC TAG AC GCK R:
                                   (SEQ ID NO: 12)
CAT CCC AGA ATC ACA AGC CA CD44 F:
                                   (SEQ ID NO: 13)
GAG TCA AGA AGG TGG AGC AA CD44 R:
                                   (SEQ ID NO: 14)
TGG TCT GGA GTT TCT GAC GA LIG1 F:
                                   (SEQ ID NO: 15)
TGT GTT TGT ACG CCT TCG AC LIG1 R:
                                   (SEQ ID NO: 16)
ACT GAC TGC TCC AGG AAC TC ADCY1 F:
                                   (SEQ ID NO: 17)
GGG ACT CGA CAT GAT TGA TAC C ADCY1 R:
                                   (SEQ ID NO: 18)
ACT GTT CCT CTC ATG TCC GTA A ADCY2 F:
                                   (SEQ ID NO: 19)
GAG CAT CTT ATA CGC TGA CAT C ADCY2 R:
                                   (SEQ ID NO: 20)
CAG TTC TTG GCA TGG TTA GG PLCB4 F:
                                   (SEQ ID NO: 21)
TGC AAA GGA ACA CAG TAC CA PLCB4 R:
                                   (SEQ ID NO: 22)
CTC GGA TTT CTT GCT CCT CA SMAD9 F:
                                   (SEQ ID NO: 23)
AGG TCA TGC TTT CAG AAC GA SMAD9 R:
                                   (SEQ ID NO: 24)
CGT ACT CCA TCA CAA AGT ACA G
```

<Measurement Results>

The results of the measurements of the gene expression levels are shown in FIG. 1.

Comparing the iPS-β cells obtained by the method in Example 1 with the iPS-β cells obtained by the methods in Reference Example 1 and Comparative Example 1, the NKX6.1 gene was clearly more highly expressed in the iPS-β cells obtained by the method in Example 1 (FIG. 1). In other words, it was made clear that, when pancreatic β cells are produced by culturing, by the method of the present invention, primitive gut tube cells that have been induced to differentiate from pluripotent stem cells, the differentiation induction efficiency to pancreatic β cells is improved. Additionally, in Comparative Example 1 and Example 1, only the culture conditions used when inducing differentiation from primitive gut tube (PGT) cells to posterior foregut (PFG) cells are different, and the methods for producing the pancreatic progenitor (PP) cells, the pancreatic endocrine progenitor (EP) cells, and the pancreatic β cells are the same, thus suggesting that the step of inducing differentiation from primitive gut tube (PGT) cells to posterior foregut (PP) cells is important for achieving efficient induced differentiation to pancreatic β cells. In other words, the differentiation induction efficiency to pancreatic β cells can be considered to be able to be improved by culturing primitive gut tube (PGT) cells in the presence of a protein kinase C (PKC) activator.

[Comprehensive Gene Expression Analysis]

Comprehensive gene expression analysis was performed for the cells at each differentiation stage (PFG, PP, EP, and iPS-β).

<RNA Extraction>

The total RNA of PFG cells, PP cells, EP cells and iPS-β cells induced to differentiate by being cultured by the method described in Example 1 or Reference Example 1 were isolated and purified using ISOGEN (Wako).

<DNA Microarray Analysis>

The extracted total RNA were used to perform DNA microarray analysis.

(1) cRNA Synthesis

A 3' IVT PLUS Reagent Kit was used to perform cRNA synthesis. The method followed the protocol recommended by Affymetrix (registered trademark). The total RNA (100 ng) were used to prepare cDNA by a reverse transcription reaction. The produced cDNA were transcribed to cRNA by means of in vitro transcription and the cRNA were biotin-labeled.

(2) Hybridization

The labeled cRNA (12.5 kg) were added to a hybridization buffer and hybridized for 16 hours on a Human Genome U133 Plus 2.0 Array. After rinsing and phycoerythrin-dyeing the cRNA in a GeneChip (registered trademark) Fluidics Station 450, they were scanned with a GeneChip (registered trademark) Scanner 3000 7G, image-analyzed with AGCC (Affymetrix (registered trademark) GeneChip (registered trademark) Command Console (registered trademark) software), and quantified by using an Affymetrix (registered trademark) Expression Console™.

Regarding the steps in (1) and (2) above, a contractual analysis service using the Affymetrix DNA microarray "GeneChip (registered trademark) Human Genome U133 Plus 2.0 Array", provided by Riken Genesis Co., Ltd. was utilized (https://rikengenesis.jp/contents/ja_JPY/microarray_affymetrix.html). This contractual analysis service is a service that performs comprehensive gene expression analysis using GeneChip (registered trademark) simply by being provided with samples (total RNA or the like).

<Enrichment Analysis Using DNA Microarray Data>

Statistical analysis of the data was performed using R version 3.4.2 and Bioconductor version 3.6 (The R Foundation for Statistical Computing, 2017). Additionally, enrichment analysis was performed using the Database for Annotation, Visualization and Integrated Discovery (DAVID) 6.8 (National Institute of Allergy and Infectious Diseases (NIAID), NIH) (https://david.ncifcrf.gov/home.jsp).

The Affymetrix array data (CEL file) obtained by the above-mentioned DNA microarray analysis and Affymetrix array data (CEL file) from a primitive gut tube cell population induced to differentiate by being cultured by the method described in Reference Example 1 were read into R with a ReadAffyo function. Thereafter, an rma( ) function was used to normalize the microarray data. This rma( ) function is a function for implementing a robust multi-array average (RMA) method (Irizarry, R., Hobbs, B., Collin, F., Beazer-Barclay, Y., Antonellis, K., Scherf, U., Speed, T., "Exploration, normalization, and summaries of high density oligonucleotide array probe level data", *Biostatistics,* 2003, 4:249). The RMA method is currently one of the normalization methods that are most commonly used, and is a method for performing background correction, normalization, and calculating expression at once. The RMA method involves performing a normalization procedure by applying a base-2 logarithmic transformation to a perfect match (PM) value. Thus, the normalized result is also output as a base-2 logarithmic transformation value.

Next, for the normalized signals, the difference between the signal value from the primitive gut tube cell population induced to differentiate by culturing cells with the method described in Example 1 and the signal value from the primitive gut tube cell population induced to differentiate by culturing cells with the method described in Reference Example 1 was calculated.

The normalized signals obtained by the RMA method have undergone a base-2 logarithmic transformation. Therefore, the difference between the signals is $(\log_2(x)-\log_2(y) =\log_2(x/y))$, which is the base-2 logarithmic transformation value of the fold change. Thus, the fold change was calculated by performing an inverse transformation on the difference. Thereafter, transcription products having a fold change of 2 or higher and transcription products having a fold change of 0.5 or lower were extracted and respectively defined as differentially expressed genes. In this experiment, there is no repetition of samples at each condition and there is just one sample. Thus, it is not possible to select a differentially expressed gene by t-testing or related hypothesis testing. For this reason, as standards that are generally used, standards in which the fold change is 2 or higher and 0.5 or lower were employed. Transcription products in which the fold change was 2 or higher and 0.5 or lower were used as the targets for enrichment analysis.

Enrichment analysis is a method in which, among differentially expressed genes, those having many functions are analyzed, and is one of annotation analysis. For example, it is possible to analyze whether the differentially expressed genes include relatively more transcription factors, relatively more cell cycles or the like in terms of probability theory. The transcription product list selected in the above-mentioned analysis was read into DAVID without information such as expression levels, and enrichment analysis was performed. Although various types of enrichment analysis are possible with DAVID, the analysis was limited to KEGG pathway analysis on this occasion in order to reduce the risk of redundancy by implementing many analyses.

KEGG pathway analysis is performed by DAVID accessing the Kyoto Encyclopedia of Genes and Genomes (KEGG) database (www.genome.jp/kegg/) and statistically extracting pathways highly correlated with the transcription product list. Although p values regarding the correlations to the respective pathways are displayed, it is possible to compute various redundancy-adjusted p values with DAVID because hypothesis testing is implemented on multiple pathways at once. In the current analysis, the Benjamini-Hochberg method, which is the most commonly used in microarray analysis, was used (Benjamini, Y., Hochberg, Y, 1995, "Controlling the false discovery rate: a practical and powerful approach to multiple testing", Journal of the Royal Statistical Society, Series B, 57(1): 289-300). The adjusted p values computed by the Benjamini-Hochberg method were used to select pathways with high correlations to the signal set. The Bonferroni method was used to further adjust for redundancies, and when the adjusted p value was less than $0.05/20>0.0033=3.3\times10^{-3}$, that pathway was determined as being a statistically significant pathway.

As a result of the enrichment analysis, in the PFG cells induced to differentiate by being cultured by the method described in Example 1, in comparison with the PFG cells induced to differentiate by being cultured by the method described in Reference Example 1, the gene expression relating to the pathway "Maturity onset diabetes of the young" was elevated, and the gene expression relating to the pathways "Viral myocarditis" and "Proteoglycans in cancer" was reduced. Due to the changes in the expression levels of these genes, the differentiation efficiency to PFG cells can be considered to have been improved. The genes that are differentially expressed in the respective pathways are indicated in Tables 1-3.

Figure 4:
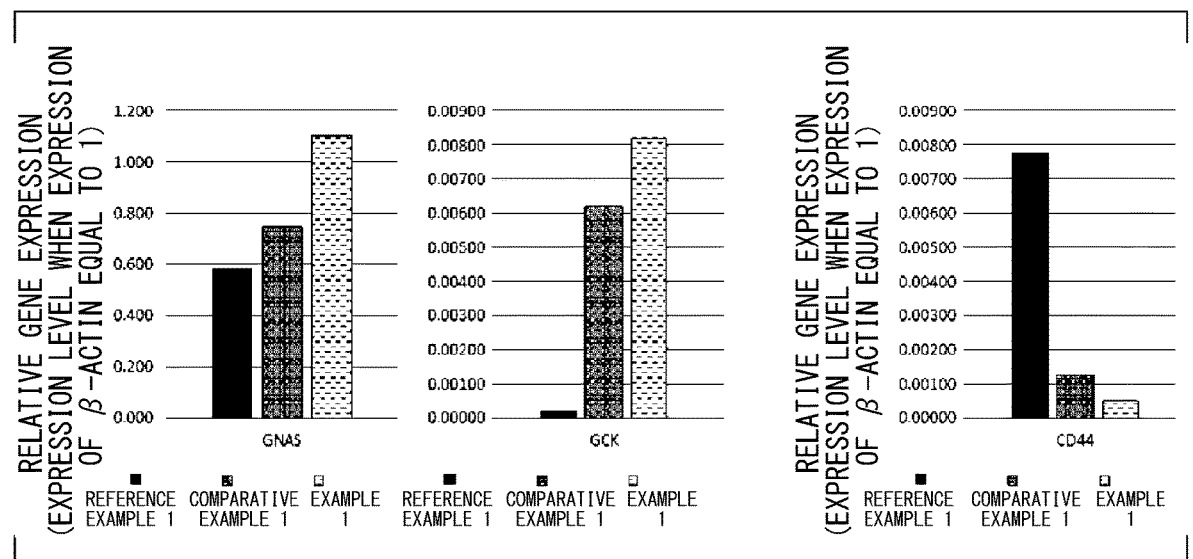
FIG. 4 indicates the results of analysis of the expression of the GNAS gene, the GCK gene, and the CD44 gene in pancreatic progenitor (PP) cells induced to differentiate from human iPS cells.

Additionally, in the pancreatic progenitor (PP) cells induced to differentiate by being cultured by the method described in Example 1, in comparison with the pancreatic progenitor (PP) cells induced to differentiate by being cultured by the method described in Reference Example 1, the expression of multiple genes relating to the pathway "Maturity onset diabetes of the young", the pathway "Morphine addiction", the pathway "GABAergic synapse", the pathway "Dopaminergic synapse", the pathway "Retrograde endocannabinoid signaling", the pathway "Serotonergic synapse", the pathway "Insulin secretion", the pathway "Glutamatergic synapse", the pathway "Circadian entrainment", the pathway "Amphetamine addiction", the pathway "Neuroactive ligand-receptor interaction", the pathway "cAMP signaling pathway", and the pathway "Alcoholism" was elevated, and the expression of multiple genes relating to the pathway "p53 signaling pathway", the pathway "Focal adhesion", the pathway "PI3K-Akt signaling pathway", the pathway "ECM-receptor interaction", and the pathway "Graft-versus-host disease" was reduced. The genes that are differentially expressed in the respective pathways are indicated in Tables 4 to 21. Furthermore, when expression analysis by quantitative RT-PCR was performed by the above-mentioned method for the genes included above, for example, expression was elevated in Example 1 in comparison with Reference Example 1 or Comparative Example 1 for the GNAS gene and the GCK gene, and expression was reduced in Example 1 in comparison with Reference Example 1 or Comparative Example 1 for the CD44 gene (FIG. 4 and Table 65). Therefore, due to the changes in the expression levels of these genes obtained from the results of the expression analysis by quantitative RT-PCR, the differentiation efficiency to pancreatic progenitor cells and iPS-β cells can be considered to have been improved.

Figure 5:
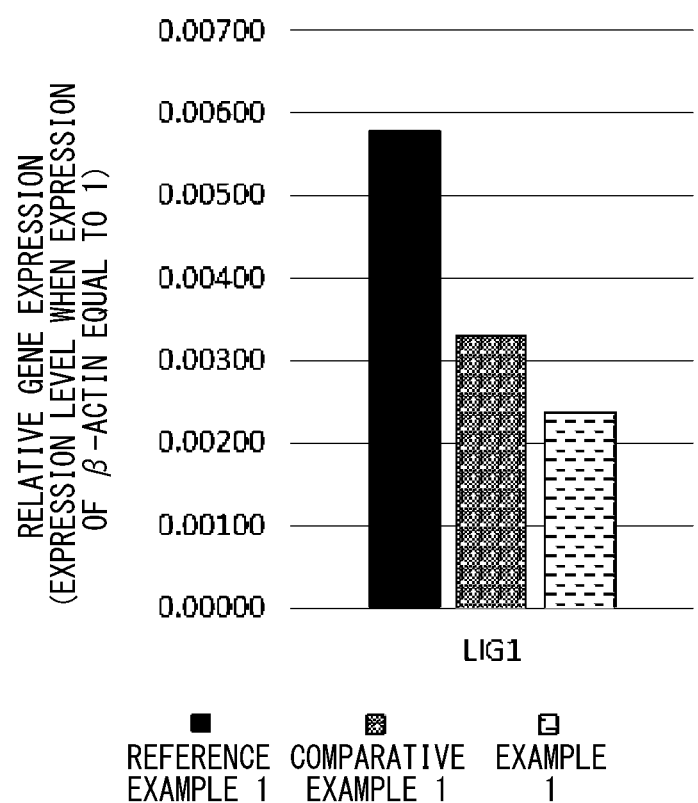
FIG. 5 indicates the results of analysis of the expression of the LIG1 gene in pancreatic endocrine precursor (EP) cells induced to differentiate from human iPS cells.

Additionally, in the pancreatic endocrine progenitor (EP) cells induced to differentiate by being cultured by the method described in Example 1, in comparison with the pancreatic endocrine progenitor (EP) cells induced to differentiate by being cultured by the method described in Reference Example 1, the expression of multiple genes relating to the pathway "Insulin secretion", the pathway "Maturity onset diabetes of the young", the pathway "GABAergic synapse", the pathway "Dopaminergic synapse", the pathway "Synaptic vesicle cycle", the pathway "Glutamatergic synapse", the pathway "Retrograde endocannabinoid signaling", the pathway "cAMP signaling pathway", the pathway "Circadian entrainment", the pathway "Serotonergic synapse", the pathway "Alcoholism", and the pathway "Morphine addiction" was elevated, and the expression of multiple genes relating to the pathway "DNA replication", the pathway "Cell cycle", the pathway "Pathways in cancer", the pathway "Mismatch repair", the pathway "PI3K-Akt signaling pathway", the pathway "p53 signaling pathway", the pathway "Fanconi anemia pathway", the pathway "Homologous recombination", the pathway "ECM-receptor interaction", and the pathway "Small cell lung cancer" was reduced. The genes that are differentially expressed in the respective pathways are indicated in Tables 22 to 43. Furthermore, when expression analysis by quantitative RT-PCR was performed by the above-mentioned method for the genes included above, for example, expression was reduced in Example 1 in comparison with Reference Example 1 or Comparative Example 1 for the LIG1 gene (FIG. 5 and Table 66). Therefore, due to the changes in the expression levels of these genes obtained from the results of the expression analysis by quantitative RT-PCR, the differentiation efficiency to pancreatic endocrine progenitor cells and iPS-β cells can be considered to have been improved.

Figure 6:
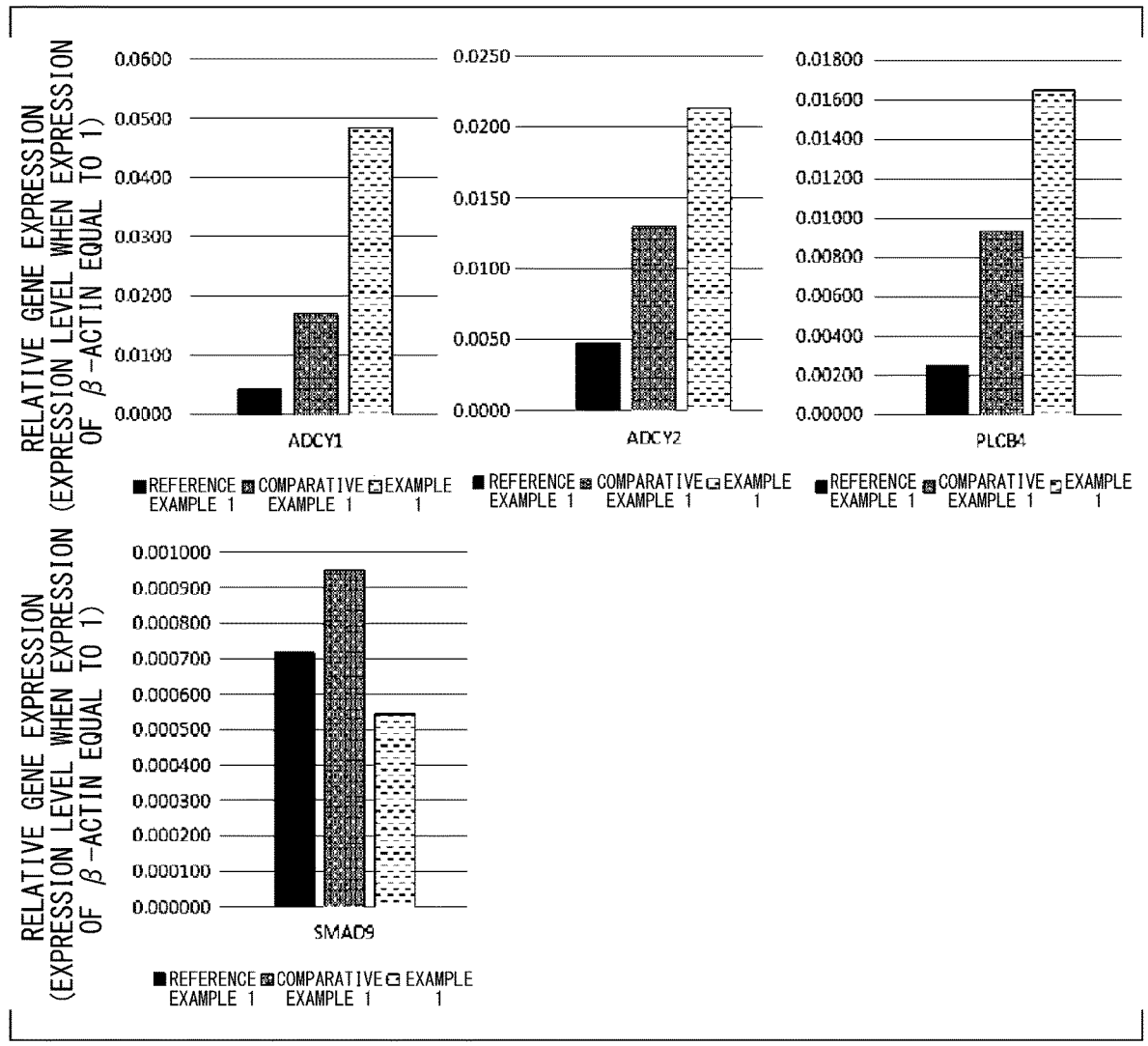
FIG. 6 indicates the results of analysis of the expression of the ADCY1 gene, the ADCY2 gene, the PLCB4 gene, and the SMAD9 gene in pancreatic β cells induced to differentiate from human iPS cells.

Additionally, in the iPS-β cells induced to differentiate by being cultured by the method described in Example 1, in comparison with the iPS-0 cells induced to differentiate by being cultured by the method described in Reference Example 1, the expression of multiple genes relating to the pathway "Dopaminergic synapse", the pathway "Insulin secretion", the pathway "Synaptic vesicle cycle", the pathway "GABAergic synapse", the pathway "Synaptic vesicle cycle", the pathway "GABAergic synapse", the pathway "Glutamatergic synapse", the pathway "Retrograde endocannabinoid signaling", the pathway "Circadian entrainment", the pathway "Alcoholism", the pathway "Serotonergic synapse", the pathway "Cholinergic synapse", the pathway "Morphine addiction", the pathway "Adrenergic signaling in cardiomyocytes", and the pathway "Maturity onset diabetes of the young" was elevated, and the expression of multiple genes relating to the pathway "Cell cycle", the pathway "ECM-receptor interaction", the pathway "PI3K-Akt signaling pathway", the pathway "Proteoglycans in cancer", the pathway "Pathways in cancer", the pathway "Focal adhesion", the pathway "DNA replication", and the pathway "TGF-beta signaling pathway" was reduced. For details on the pathways, see "KEGG pathway" (http://www.genome.jp/kegg/pathway.html). The genes that are differentially expressed in the respective pathways are indicated in Tables 44 to 64. Due to the changes in the expression levels of these genes, the differentiation efficiency to iPS-β cells can be considered to have been improved. Furthermore, when expression analysis by quantitative RT-PCR was performed by the above-mentioned method for the genes included above, for example, expression was elevated in Example 1 in comparison with Reference Example 1 or Comparative Example 1 for the ADCY1 gene, the ADCY2 gene, and the PLCB4 gene, and expression was reduced in Example 1 in comparison with Reference Example 1 or Comparative Example 1 for the SMAD9 gene (FIG. 6 and Table 67). Therefore, due to the changes in the expression levels of these genes obtained from the results of the expression analysis by quantitative RT-PCR, the differentiation efficiency to iPS-β cells can be considered to have been improved.

[Table 1]

TABLE 1

Genes with elevated expression relating to "Maturity onset diabetes of the young" (PFG cells)
Gene Name (Abbreviation)

NK2 homeobox 2 (NKX2-2)
forkhead box A3 (FOXA3)
glucokinase (GCK)
hematopoietically expressed homeobox (HHEX)
hepatocyte nuclear factor 4 alpha (HNF4A)
hepatocyte nuclear factor 4 gamma (HNF4G)
neurogenin 3 (NEUROG3)
neuronal differentiation 1 (NEUROD1)
nuclear receptor subfamily 5 group A member 2 (NR5A2)
one cut homeobox 1 (ONECUT1)
paired box 4 (PAX4)
pancreatic and duodenal homeobox 1 (PDX1)

TABLE 2

Genes with elevated expression relating to "Viral myocarditis" (PFG cells)
Gene Name (Abbreviation)

CD55 molecule (Cromer blood group) (CD55)
caspase 8 (CASP8)

TABLE 2-continued

Genes with elevated expression relating to "Viral myocarditis" (PFG cells)
Gene Name (Abbreviation)

caveolin 1 (CAV1)
dystrophin (DMD)
intercellular adhesion molecule 1 (ICAM1)
major histocompatibility complex, class I, A (HLA-A)
major histocompatibility complex, class I, B (HLA-B)
major histocompatibility complex, class I, C (HLA-C)
major histocompatibility complex, class I, F (HLA-F)
major histocompatibility complex, class I, G (HLA-G)
major histocompatibility complex, class II, DM alpha (HLA-DMA)
major histocompatibility complex, class II, DO alpha (HLA-DOA)
major histocompatibility complex, class II, DP alpha 1 (HLA-DPA1)
major histocompatibility complex, class II, DP beta 1 (HLA-DPB1)
major histocompatibility complex, class II, DQ beta 1 (HLA-DQB1)
ras-related C3 botulinum toxin substrate 1 (rho family, small GTP binding protein Rac1) (RAC1)
ras-related C3 botulinum toxin substrate 2 (rho family, small GTP binding protein Rac2) RAC2)
sarcoglycan gamma (SGCG)

[Table 3]

TABLE 3

Genes with elevated expression relating to
"Proteoglycans in cancer" (PFG cells)
Gene Name (Abbreviation)

Cbl proto-oncogene C (CBLC)
Cbl proto-oncogene (CBL)
Fas cell surface death receptor (FAS)
IQ motif containing GTPase activating protein 1 (IQGAP1)
T-cell lymphoma invasion and metastasis 1 (TIAM1)
ankyrin 1( ANK1)
ankyrin 2 (ANK2)
ankyrin 3 (ANK3)
caveolin 1 (CAV1)
cortactin (CTTN)
cyclin dependent kinase inhibitor 1A (CDKN1A)
eukaryotic translation initiation factor 4B (EIF4B)
ezrin (EZR)
fibroblast growth factor 2 (FGF2)
fibroblast growth factor receptor 1 (FGFR1)
frizzled class receptor 4 (FZD4)
frizzled class receptor 7 (FZD7)
glypican 3 (GPC3)
inositol 1,4,5-trisphosphate receptor type 1 (ITPR1)
insulin like growth factor 1 receptor (IGF1R)
insulin like growth factor 1 (IGF1)
integrin subunit alpha 2 (ITGA2)
integrin subunit beta 5 (ITGB5)
kinase insert domain receptor (KDR)
microRNA 10a (MIR10A)
mitogen-activated protein kinase 1 (MAPK1)
mitogen-activated protein kinase 14 (MAPK14)
phosphatidylinositol-4,5-bisphosphate 3-kinase catalytic subunit beta (PIK3CB)
phosphoinositide-3-kinase regulatory subunit 5 (PIK3R5)
protein kinase C beta (PRKCB)
protein kinase cAMP-activated catalytic subunit beta (PRKACB)
protein tyrosine kinase 2 (PTK2)
ras-related C3 botulinum toxin substrate 1 (rho family, small GTP binding protein Rac1) (RAC1)
related RAS viral (r-ras) oncogene homolog (RRAS)
signal transducer and activator of transcription 3 (STAT3)
twist family bHLH transcription factor 1 (TWIST1)

[Table 4]

TABLE 4

Genes with elevated expression relating to "Maturity onset
diabetes of the young" (PP cells)
Gene Name (Abbreviation)

NK2 homeobox 2 (NKX2-2)
NK6 homeobox 1 (NKX6-1)
glucokinase (GCK)
hepatocyte nuclear factor 4 alpha (HNF4A)
insulin (INS)
islet amyloid polypeptide (IAPP)
motor neuron and pancreas homeobox 1 (MNX1)
neurogenin 3 (NEUROG3)
neuronal differentiation 1 (NEUROD1)
nuclear receptor subfamily 5 group A member 2 (NR5A2)
one cut homeobox 1 (ONECUT1)
paired box 4 (PAX4)
paired box 6 (PAX6)
pancreatic and duodenal homeobox 1 (PDX1)

[Table 5]

TABLE 5

Genes with elevated expression relating to "Morphine addiction" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
G protein-coupled receptor kinase 4 (GRK4)
GNAS complex locus (GNAS)
adenylate cyclase 1 (ADCY1)
calcium voltage-gated channel subunit alpha1 A (CACNA1A)
calcium voltage-gated channel subunit alpha1 B (CACNA1B)
gamma-aminobutyric acid type A receptor alpha2 subunit (GABRA2)
gamma-aminobutyric acid type A receptor beta2 subunit (GABRB2)
gamma-aminobutyric acid type A receptor beta3 subunit (GABRB3)
gamma-aminobutyric acid type B receptor subunit 2 (GABBR2)
phosphodiesterase 1A (PDE1A)
phosphodiesterase 2A (PDE2A)
phosphodiesterase 3B (PDE3B)
phosphodiesterase 4B (PDE4B)
phosphodiesterase 8B (PDE8B)
potassium voltage-gated channel subfamily J member 5 (KCNJ5)
potassium voltage-gated channel subfamily J member 6 (KCNJ6)

[Table 6]

TABLE 6

Genes with elevated expression relating to "GABAergic synapse" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
adenylate cyclase 1 (ADCY1)
calcium voltage-gated channel subunit alpha1 A (CACNA1A)
calcium voltage-gated channel subunit alpha1 B (CACNA1B)
calcium voltage-gated channel subunit alpha1 C (CACNA1C)
gamma-aminobutyric acid type A receptor alpha2 subunit (GABRA2)
gamma-aminobutyric acid type A receptor beta2 subunit (GABRB2)
gamma-aminobutyric acid type A receptor beta3 subunit (GABRB3)
gamma-aminobutyric acid type B receptor subunit 2 (GABBR2)
glutamate decarboxylase 2 (GAD2)
huntingtin associated protein 1 (HAP1)
phospholipase C like 1 (PLCL1)
potassium voltage-gated channel subfamily J member 6 (KCNJ6)
solute carrier family 38 member 3 (SLC38A3)

[Table 7]

TABLE 7

Genes with elevated expression relating to "Dopaminergic synapse" (PP cells)
Gene Name (Abbreviation)

Fos proto-oncogene, AP-1 transcription factor subunit (FOS)
G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium/calmodulin dependent protein kinase II beta (CAMK2B)
dopa decarboxylase (DDC)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
monoamine oxidase A (MAOA)
phospholipase C beta 4 (PLCB4)
potassium voltage-gated channel subfamily J member 5 (KCNJ5)
potassium voltage-gated channel subfamily J member 6 (KCNJ6)
protein phosphatase 3 catalytic subunit beta (PPP3CB)
solute carrier family 18 member A1 (SLC18A1)
tyrosine hydroxylase (TH)

[Table 8]

TABLE 8

Genes with elevated expression relating to
"Retrograde endocannabinoid signaling" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
adenylate cyclase 1 (ADCY1)
calcium voltage-gated channel subunit alpha1 A (CACNA1A)
calcium voltage-gated channel subunit alpha1 B (CACNA1B)
calcium voltage-gated channel subunit alpha1 C (CACNA1C)
gamma-aminobutyric acid type A receptor alpha2 subunit (GABRA2)
gamma-aminobutyric acid type A receptor beta2 subunit (GABRB2)
gamma-aminobutyric acid type A receptor beta3 subunit (GABRB3)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
phospholipase C beta 4 (PLCB4)
potassium voltage-gated channel subfamily J member 5 (KCNJ5)
potassium voltage-gated channel subfamily J member 6 (KCNJ6)
solute carrier family 18 member A1 (SLC18A1)

[Table 9]

TABLE 9

Genes with elevated expression relating to
"Serotonergic synapse" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
calcium voltage-gated channel subunit alpha1 A (CACNA1A)
calcium voltage-gated channel subunit alpha1 B (CACNA1B)
calcium voltage-gated channel subunit alpha1 C (CACNA1C)
cytochrome P450 family 2 subfamily C member 8 (CYP2C8)
cytochrome P450 family 4 subfamily X member 1 (CYP4X1)
dopa decarboxylase (DDC)

TABLE 9-continued

Genes with elevated expression relating to
"Serotonergic synapse" (PP cells)
Gene Name (Abbreviation)

gamma-aminobutyric acid type A receptor beta2 subunit (GABRB2)
gamma-aminobutyric acid type A receptor beta3 subunit (GABRB3)
monoamine oxidase A (MAOA)
phospholipase C beta 4 (PLCB4)
potassium voltage-gated channel subfamily J member 5 (KCNJ5)
potassium voltage-gated channel subfamily J member 6 (KCNJ6)
solute carrier family 18 member A1 (SLC18A1)
tryptophan hydroxylase 1 (TPH1)

[Table 10]

TABLE 10

Genes with elevated expression relating to
"Insulin secretion" (PP cells)
Gene Name (Abbreviation)

ATP binding cassette subfamily C member 8 (ABCC8)
GNAS complex locus (GNAS)
Rap guanine nucleotide exchange factor 4 (RAPGEF4)
adenylate cyclase 1 (ADCY1)
calcium voltage-gated channel subunit alpha1 C (CACNA1C)
calcium/calmodulin dependent protein kinase II beta (CAMK2B)
cholinergic receptor muscarinic 3 (CHRM3)
glucagon (GCG)
glucokinase (GCK)
insulin (INS)
pancreatic and duodenal homeobox 1 (PDX1)
phospholipase C beta 4 (PLCB4)
potassium calcium-activated channel subfamily M alpha 1 (KCNMA1)
regulating synaptic membrane exocytosis 2 (RIMS2)
solute carrier family 2 member 1 (SLC2A1)
synaptosome associated protein 25 (SNAP25)
syntaxin 1A (STX1A)

[Table 11]

TABLE 11

Genes with elevated expression relating to
"Glutamatergic synapse" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
adenylate cyclase 1 (ADCY1)
calcium voltage-gated channel subunit alpha1 A (CACNA1A)
calcium voltage-gated channel subunit alpha1 C (CACNA1C)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
glutamate ionotropic receptor kainate type subunit 2 (GRIK2)
glutamate metabotropic receptor 8 (GRM8)
phospholipase C beta 4 (PLCB4)
protein phosphatase 3 catalytic subunit beta (PPP3CB)
solute carrier family 1 member 6 (SLC1A6)
solute carrier family 17 member 8 (SLC17A8)
solute carrier family 38 member 3 (SLC38A3)

[Table 12]

TABLE 12

Genes with elevated expression relating to
"Circadian entrainment" (PP cells)
Gene Name (Abbreviation)

Fos proto-oncogene, AP-1 transcription factor subunit (FOS)
G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
adenylate cyclase 1 (ADCY1)
calcium voltage-gated channel subunit alpha1 C (CACNA1C)
calcium/calmodulin dependent protein kinase II beta (CAMK2B)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
guanylate cyclase 1 soluble subunit alpha (GUCY1A3)
phospholipase C beta 4 (PLCB4)
potassium voltage-gated channel subfamily J member 5 (KCNJ5)
potassium voltage-gated channel subfamily J member 6 (KCNJ6)
ras related dexamethasone induced 1 (RASD1)

[Table 13]

TABLE 13

Genes with elevated expression relating to
"Amphetamine addiction" (PP cells)
Gene Name (Abbreviation)

Fos proto-oncogene, AP-1 transcription factor subunit (FOS)
GNAS complex locus (GNAS)
calcium voltage-gated channel subunit alpha1 C (CACNA1C)
calcium/calmodulin dependent protein kinase II beta (CAMK2B)
dopa decarboxylase (DDC)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
monoamine oxidase A (MAOA)
protein phosphatase 3 catalytic subunit beta (PPP3CB)
solute carrier family 18 member A1 (SLC18A1)
syntaxin 1A (STX1A)
tyrosine hydroxylase (TH)

[Table 14]

TABLE 14

Genes with elevated expression relating to
"Neuroactive ligand-receptor interaction" (PP cells)
Gene Name (Abbreviation)

adrenoceptor alpha 2A (ADRA2A)
cholinergic receptor muscarinic 3 (CHRM3)
cholinergic receptor nicotinic alpha 3 subunit (CHRNA3)
galanin receptor 1 (GALR1)
gamma-aminobutyric acid type A receptor alpha2 subunit (GABRA2)
gamma-aminobutyric acid type A receptor beta2 subunit (GABRB2)
gamma-aminobutyric acid type A receptor beta3 subunit (GABRB3)
gamma-aminobutyric acid type B receptor subunit 2 (GABBR2)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
glutamate ionotropic receptor kainate type subunit 2 (GRIK2)
glutamate metabotropic receptor 8 (GRM8)
glycine receptor beta (GLRB)
luteinizing hormone/choriogonadotropin receptor (LHCGR)
lysophosphatidic acid receptor 1 (LPAR1)
lysophosphatidic acid receptor 6 (LPAR6)
neuropeptide Y receptor Y1 (NPY1R)
neuropeptide Y receptor Y5 (NPY5R)

TABLE 14-continued

Genes with elevated expression relating to
"Neuroactive ligand-receptor interaction" (PP cells)
Gene Name (Abbreviation)

opioid receptor kappa 1 (OPRK1)
parathyroid hormone 2 receptor (PTH2R)
prolactin releasing hormone receptor (PRLHR)
prostaglandin D2 receptor (PTGDR)
prostaglandin E receptor 2 (PTGER2)
prostaglandin E receptor 3 (PTGER3)
prostaglandin E receptor 4 (PTGER4)
protease, serine 3 (PRSS3)
secretin receptor (SCTR)
somatostatin receptor 1 (SSTR1)
somatostatin receptor 2 (SSTR2)
tachykinin receptor 1 (TACR1)
thyroid stimulating hormone receptor (TSHR)

[Table 15]

TABLE 15

Genes with elevated expression relating to
"cAMP signaling pathway" (PP cells)
Gene Name (Abbreviation)

Fos proto-oncogene, AP-1 transcription factor subunit (FOS)
GNAS complex locus (GNAS)
Rap guanine nucleotide exchange factor 4 (RAPGEF4)
SRY-box 9 (SOX9)
adenylate cyclase 1 (ADCY1)
afadin, adherens junction formation factor (AFDN)
calcium voltage-gated channel subunit alpha1 C (CACNA1C)
calcium/calmodulin dependent protein kinase II beta (CAMK2B)
cyclic nucleotide gated channel alpha 3 (CNGA3)
free fatty acid receptor 2 (FFAR2)
gamma-aminobutyric acid type B receptor subunit 2 (GABBR2)
ghrelin and obestatin prepropeptide (GHRL)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
neuropeptide Y receptor Y1 (NPY1R)
patched 1 (PTCH1)
phosphodiesterase 3B (PDE3B)
phosphodiesterase 4B (PDE4B)
phosphoinositide-3-kinase regulatory subunit 1 (PIK3R1)
prostaglandin E receptor 2 (PTGER2)
prostaglandin E receptor 3 (PTGER3)
somatostatin receptor 1 (SSTR1)
somatostatin receptor 2 (SSTR2)
thyroid stimulating hormone receptor (TSHR)

[Table 16]

TABLE 16

Genes with elevated expression relating to
"Alcoholism" (PP cells)
Gene Name (Abbreviation)

G protein subunit alpha o1 (GNAO1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
corticotropin releasing hormone (CRH)
dopa decarboxylase (DDC)
glutamate ionotropic receptor NMDA type subunit 3A (GRIN3A)
histone cluster 1 H2A family member c (HIST1H2AC)
histone cluster 1 H2A family member i (HIST1H2AI)
histone cluster 1 H2B family member d (HIST1H2BD)
histone cluster 1 H2B family member e (HIST1H2BE)
histone cluster 1 H2B family member g (HIST1H2BG)
histone cluster 1 H2B family member h (HIST1H2BH)
histone cluster 1 H2B family member j (HIST1H2BJ)

TABLE 16-continued

Genes with elevated expression relating to
"Alcoholism" (PP cells)
Gene Name (Abbreviation)

histone cluster 1 H2B family member k (HIST1H2BK)
histone cluster 1 H3 family member e (HIST1H3E)
histone cluster 2 H2B family member e (HIST2H2BE)
monoamine oxidase A (MAOA)
neurotrophic receptor tyrosine kinase 2 (NTRK2)
protein kinase (cAMP-dependent, catalytic) inhibitor alpha (PKIA)
solute carrier family 18 member A1 (SLC18A1)
tyrosine hydroxylase (TH)

[Table 17]

TABLE 17

Genes with reduced expression relating to
"p53 signaling pathway" (PP cells)
Gene Name (Abbreviation)

BCL2 associated X, apoptosis regulator (BAX)
Fas cell surface death receptor (FAS)
MDM2 proto-oncogene (MDM2)
PERP, TP53 apoptosis effector (PERP)
STEAP3 metalloreductase (STEAP3)
caspase 8 (CASP8)
cyclin D1 (CCND1)
cyclin D2 (CCND2)
cyclin dependent kinase 1 (CDK1)
cyclin dependent kinase 6 (CDK6)
cyclin dependent kinase inhibitor 1A (CDKN1A)
cyclin dependent kinase inhibitor 2A (CDKN2A)
damage specific DNA binding protein 2 (DDB2)
growth arrest and DNA damage inducible beta (GADD45B)
phorbol-12-myristate-13-acetate-induced protein 1 (PMAIP1)
ribonucleotide reductase regulatory TP53 inducible subunit M2B (RRM2B)
serpin family E member 1 (SERPINE1)
sestrin 1 (SESN1)
sestrin 2 (SESN2)
stratifin (SFN)
zinc finger matrin-type 3 (ZMAT3)

[Table 18]

TABLE 18

Genes with reduced expression relating to
"Focal adhesion" (PP cells)
Gene Name (Abbreviation)

Rho GTPase activating protein 5 (ARHGAP5)
SHC adaptor protein 1 (SHC1)
calpain 2 (CAPN2)
collagen type I alpha 1 chain (COL1A1)
collagen type I alpha 2 chain (COL1A2)
collagen type III alpha 1 chain (COL3A1)
collagen type IV alpha 5 chain (COL4A5)
collagen type IV alpha 6 chain (COL4A6)
collagen type VI alpha 2 chain (COL6A2)
collagen type VI alpha 6 chain (COL6A6)
collagen type XI alpha 1 chain (COL11A1)
cyclin D1 (CCND1)
cyclin D2 (CCND2)
epidermal growth factor (EGF)
filamin B (FLNB)
integrin subunit alpha 1 (ITGA1)
integrin subunit alpha 2 (ITGA2)
integrin subunit alpha 8 (ITGA8)
integrin subunit alpha V (ITGAV)
integrin subunit beta 5 (ITGB5)
laminin subunit alpha 3 (LAMA3)
laminin subunit gamma 1 (LAMC1)
laminin subunit gamma 2 (LAMC2)
myosin light chain 12A (MYL12A)
myosin light chain 12B (MYL12B)

TABLE 18-continued

Genes with reduced expression relating to
"Focal adhesion" (PP cells)
Gene Name (Abbreviation)

myosin light chain 7 (MYL7)
myosin light chain 9 (MYL9)
p21 (RAC1) activated kinase 1 (PAK1)
p21 (RAC1) activated kinase 6 (PAK6)
placental growth factor (PGF)
platelet derived growth factor C (PDGFC)
ras-related C3 botulinum toxin substrate 1
(rho family, small GTP binding protein Rac1) (RAC1)
ras-related C3 botulinum toxin substrate 3 (rho family,
small GTP binding protein Rac3)(RAC3)
secreted phosphoprotein 1 (SPP1)
tenascin C (TNC)
vascular endothelial growth factor C (VEGFC)
vasodilator-stimulated phosphoprotein (VASP)

[Table 19]

TABLE 19

Genes with reduced expression relating to
"PI3K-Akt signaling pathway" (PP cells)
Gene Name (Abbreviation)

BCL2 family apoptosis regulator (MCL1)
EPH receptor A2 (EPHA2)
G protein subunit beta 4 (GNB4)
Janus kinase 1 (JAK1)
KIT ligand (KITLG)
KRAS proto-oncogene, GTPase (KRAS)
MDM2 proto-oncogene (MDM2)
PH domain and leucine rich repeat protein phosphatase 1 (PHLPP1)
Ras homolog enriched in brain (RHEB)
TEK receptor tyrosine kinase (TEK)
chorionic somatomammotropin hormone 1 (CSH1)
collagen type I alpha 1 chain (COL1A1)
collagen type I alpha 2 chain (COL1A2)
collagen type III alpha 1 chain (COL3A1)
collagen type IV alpha 5 chain (COL4A5)
collagen type IV alpha 6 chain (COL4A6)
collagen type VI alpha 2 chain (COL6A2)
collagen type VI alpha 6 chain (COL6A6)
collagen type XI alpha 1 chain (COL11A1)
cyclin D1 (CCND1)
cyclin D2 (CCND2)
cyclin dependent kinase 6 (CDK6)
cyclin dependent kinase inhibitor 1A (CDKN1A)
ephrin A1 (EFNA1)
ephrin A5 (EFNA5)
epidermal growth factor (EGF)
fibroblast growth factor 10 (FGF10)
fibroblast growth factor 2 (FGF2)
fibroblast growth factor receptor 2 (FGFR2)
growth hormone 1 (GH1)
growth hormone receptor (GHR)
heat shock protein 90 beta family member 1 (HSP90B1)
insulin receptor substrate 1 (IRS1)
integrin subunit alpha 1 (ITGA1)
integrin subunit alpha 2 (ITGA2)
integrin subunit alpha 8 (ITGA8)
integrin subunit alpha V (ITGAV)
integrin subunit beta 5 (ITGB5)
laminin subunit alpha 3 (LAMA3)
laminin subunit gamma 1 (LAMC1)
laminin subunit gamma 2 (LAMC2)
lysophosphatidic acid receptor 3 (LPAR3)
oncostatin M receptor (OSMR)
phosphoenolpyruvate carboxykinase 2, mitochondrial (PCK2)
placental growth factor (PGF)
platelet derived growth factor C (PDGFC)
protein phosphatase 2 regulatory subunit B'epsilon (PPP2R5E)
protein phosphatase 2 regulatory subunit Bbeta (PPP2R2B)
ras-related C3 botulinum toxin substrate 1 (rho family,
small GTP binding protein Rac1) (RAC1)
secreted phosphoprotein 1 (SPP1)

TABLE 19-continued

Genes with reduced expression relating to
"PI3K-Akt signaling pathway" (PP cells)
Gene Name (Abbreviation)

tenascin C (TNC)
vascular endothelial growth factor C (VEGFC)

[Table 20]

TABLE 20

Genes with reduced expression relating to
"ECM-receptor interaction" (PP cells)
Gene Name (Abbreviation)

CD44 molecule (Indian blood group) (CD44)
CD47 molecule (CD47)
collagen type I alpha 1 chain (COL1A1)
collagen type I alpha 2 chain (COL1A2)
collagen type III alpha 1 chain (COL3A1)
collagen type IV alpha 5 chain (COL4A5)
collagen type IV alpha 6 chain (COL4A6)
collagen type VI alpha 2 chain (COL6A2)
collagen type VI alpha 6 chain (COL6A6)
collagen type XI alpha 1 chain (COL11A1)
integrin subunit alpha 1 (ITGA1)
integrin subunit alpha 2 (ITGA2)
integrin subunit alpha 8 (ITGA8)
integrin subunit alpha V (ITGAV)
integrin subunit beta 5 (ITGB5)
laminin subunit alpha 3 (LAMA3)
laminin subunit gamma 1 (LAMC1)
laminin subunit gamma 2 (LAMC2)
secreted phosphoprotein 1 (SPP1)
syndecan 1 (SDC1)
tenascin C (TNC)

[Table 21]

TABLE 21

Genes with reduced expression relating to
"Graft-versus-host disease" (PP cells)
Gene Name (Abbreviation)

Fas cell surface death receptor (FAS)
interleukin 1 alpha (IL1A)
major histocompatibility complex, class I, A (HLA-A)
major histocompatibility complex, class I, B (HLA-B)
major histocompatibility complex, class I, C (HLA-C)
major histocompatibility complex, class I, F (HLA-F)
major histocompatibility complex, class I, G (HLA-G)
major histocompatibility complex, class II, DM alpha (HLA-DMA)
major histocompatibility complex, class II, DO alpha (HLA-DOA)
major histocompatibility complex, class II, DP alpha 1 (HLA-DPA1)
major histocompatibility complex, class II, DP beta 1 (HLA-DPB1)
major histocompatibility complex, class II, DQ beta 1 (HLA-DQB1)
Fas cell surface death receptor (FAS)
interleukin 1 alpha (IL1A)
major histocompatibility complex, class I, A (HLA-A)
major histocompatibility complex, class I, B (HLA-B)
major histocompatibility complex, class I, C (HLA-C)
major histocompatibility complex, class I, F (HLA-F)
major histocompatibility complex, class I, G (HLA-G)
major histocompatibility complex, class II, DM alpha (HLA-DMA)
major histocompatibility complex, class II, DO alpha (HLA-DOA)
major histocompatibility complex, class II, DP alpha 1 (HLA-DPA1)
major histocompatibility complex, class II, DP beta 1 (HLA-DPB1)
major histocompatibility complex, class II, DQ beta 1 (HLA-DQB1)

[Table 22]

TABLE 22

Genes with elevated expression relating to "Insulin secretion" (EP cells)
Gene Name (Abbreviation)

ATP binding cassette subfamily C member 8 (ABCC8)
ATPase Na+/K+ transporting subunit beta 2 (ATP1B2)
ATPase Na+/K+ transporting subunit beta 3 (ATP1B3)
GNAS complex locus (GNAS)
Rap guanine nucleotide exchange factor 4 (RAPGEF4)
adenylate cyclase 1 (ADCY1)
adenylate cyclase 9 (ADCY9)
adenylate cyclase activating polypeptide 1 (ADCYAP1)
calcium voltage-gated channel subunit alpha1 C (CACNA1C)
calcium/calmodulin dependent protein kinase II beta (CAMK2B)
free fatty acid receptor 1 (FFAR1)
gastric inhibitory polypeptide (GIP)
glucagon like peptide 1 receptor (GLP1R)
glucagon (GCG)
glucokinase (GCK)
insulin (INS)
pancreatic and duodenal homeobox 1 (PDX1)
phospholipase C beta 4 (PLCB4)
piccolo presynaptic cytomatrix protein (PCLO)
potassium calcium-activated channel subfamily M alpha 1 (KCNMA1)
potassium calcium-activated channel subfamily M regulatory
beta subunit 2 (KCNMB2)
potassium calcium-activated channel subfamily N member 3 (KCNN3)
potassium voltage-gated channel subfamily J member 11 (KCNJ11)
regulating synaptic membrane exocytosis 2 (RIMS2)
solute carrier family 2 member 1 (SLC2A1)
synaptosome associated protein 25 (SNAP25)
syntaxin 1A (STX1A)

[Table 23]

TABLE 23

Genes with elevated expression relating to
"Maturity onset diabetes of the young" (EP cells)
Gene Name (Abbreviation)

NK2 homeobox 2 (NKX2-2)
NK6 homeobox 1 (NKX6-1)
forkhead box A3 (FOXA3)
glucokinase (GCK)
hematopoietically expressed homeobox (HHEX)
hepatocyte nuclear factor 4 alpha (HNF4A)
hepatocyte nuclear factor 4 gamma (HNF4G)
insulin (INS)
islet amyloid polypeptide (IAPP)
neurogenin 3 (NEUROG3)
neuronal differentiation 1 (NEUROD1)
paired box 4 (PAX4)
paired box 6 (PAX6)
pancreatic and duodenal homeobox 1 (PDX1)

[Table 24]

TABLE 24

Genes with elevated expression relating to
"GABAergic synapse" (EP cells)
Gene Name (Abbreviation)

4-aminobutyrate aminotransferase (ABAT)
G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
adenylate cyclase 1 (ADCY1)
adenylate cyclase 9 (ADCY9)
calcium voltage-gated channel subunit alpha1 A (CACNA1A)

TABLE 24-continued

Genes with elevated expression relating to
"GABAergic synapse" (EP cells)
Gene Name (Abbreviation)

calcium voltage-gated channel subunit alpha1 B (CACNA1B)
calcium voltage-gated channel subunit alpha1 C (CACNA1C)
gamma-aminobutyric acid type A receptor alpha2 subunit (GABRA2)
gamma-aminobutyric acid type A receptor beta3 subunit (GABRB3)
gamma-aminobutyric acid type B receptor subunit 2 (GABBR2)
glutamate decarboxylase 1 (GAD1)
glutamate decarboxylase 2 (GAD2)
glutaminase (GLS)
phospholipase C like 1 (PLCL1)
potassium voltage-gated channel subfamily J member 6 (KCNJ6)
solute carrier family 38 member 3 (SLC38A3)
solute carrier family 38 member 5 (SLC38A5)

[Table 25]

TABLE 25

Genes with elevated expression relating to
"Dopaminergic synapse" (EP cells)
Gene Name (Abbreviation)

Fos proto-oncogene, AP-1 transcription factor subunit (FOS)
G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium/calmodulin dependent protein kinase II beta (CAMK2B)
calcyon neuron specific vesicular protein (CALY)
dopa decarboxylase (DDC)
dopamine receptor D2 (DRD2)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
kinesin family member 5C (KIF5C)
mitogen-activated protein kinase 13 (MAPK13)
phospholipase C beta 4 (PLCB4)
potassium voltage-gated channel subfamily J member 3 (KCNJ3)
potassium voltage-gated channel subfamily J member 6 (KCNJ6)
protein phosphatase 2 regulatory subunit B'beta (PPP2R5B)
protein phosphatase 2 regulatory subunit Bbeta (PPP2R2B)
solute carrier family 18 member A1 (SLC18A1)
solute carrier family 18 member A2 (SLC18A2)
tyrosine hydroxylase (TH)

[Table 26]

TABLE 26

Genes with elevated expression relating to
"Synaptic vesicle cycle" (EP cells)
Gene Name (Abbreviation)

ATPase H+ transporting V0 subunit a1 (ATP6V0A1)
ATPase H+ transporting V0 subunit b (ATP6V0B)
ATPase H+ transporting V0 subunit c (ATP6V0C)
ATPase H+ transporting V0 subunit e2 (ATP6V0E2)
ATPase H+ transporting V1 subunit B2 (ATP6V1B2)
ATPase H+ transporting V1 subunit G2 (ATP6V1G2)
calcium voltage-gated channel subunit alpha1 A (CACNA1A)
calcium voltage-gated channel subunit alpha1 B (CACNA1B)
complexin 1 (CPLX1)
complexin 2 (CPLX2)
dynamin 1 (DNM1)
solute carrier family 17 member 6 (SLC17A6)
solute carrier family 17 member 8 (SLC17A8)
solute carrier family 18 member A1 (SLC18A1)

TABLE 26-continued

Genes with elevated expression relating to
"Synaptic vesicle cycle" (EP cells)
Gene Name (Abbreviation)

solute carrier family 18 member A2 (SLC18A2)
synaptosome associated protein 25 (SNAP25)
syntaxin 1A (STX1A)
syntaxin binding protein 1 (STXBP1)
unc-13 homolog A (UNC13A)

[Table 27]

TABLE 27

Genes with elevated expression relating to
"Glutamatergic synapse" (EP cells)
Gene Name (Abbreviation)

G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
SH3 and multiple ankyrin repeat domains 3 (SHANK3)
adenylate cyclase 1 (ADCY1)
adenylate cyclase 9 (ADCY9)
calcium voltage-gated channel subunit alpha1 A (CACNA1A)
calcium voltage-gated channel subunit alpha1 C (CACNA1C)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
glutamate ionotropic receptor kainate type subunit 2 (GRIK2)
glutamate ionotropic receptor kainate type subunit 3 (GRIK3)
glutaminase (GLS)
phospholipase C beta 4 (PLCB4)
phospholipase D1 (PLD1)
potassium voltage-gated channel subfamily J member 3 (KCNJ3)
solute carrier family 17 member 6 (SLC17A6)
solute carrier family 17 member 8 (SLC17A8)
solute carrier family 38 member 3 (SLC38A3)

[Table 28]

TABLE 28

Genes with elevated expression relating to
"Retrograde endocannabinoid signaling" (EP cells)
Gene Name (Abbreviation)

G protein subunit alpha i1 (GNAI1)
G protein subunit alpha 01 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
adenylate cyclase 1 (ADCY1)
adenylate cyclase 9 (ADCY9)
calcium voltage-gated channel subunit alpha1 A (CACNA1A)
calcium voltage-gated channel subunit alpha1 C (CACNA1C)
gamma-aminobutyric acid type A receptor alpha2 subunit (GABRA2)
gamma-aminobutyric acid type A receptor beta3 subunit (GABRB3)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
mitogen-activated protein kinase 13 (MAPK13)
monoglyceride lipase (MGLL)
phospholipase C beta 4 (PLCB4)
potassium voltage-gated channel subfamily J member 3 (KCNJ3)
potassium voltage-gated channel subfamily J member 6 (KCNJ6)
solute carrier family 17 member 6 (SLC17A6)
solute carrier family 17 member 8 (SLC17A8)

[Table 29]

TABLE 29

Genes with elevated expression relating to
"cAMP signaling pathway" (EP cells)
Gene Name (Abbreviation)

ATPase Na+/K+ transporting subunit beta 2 (ATP1B2)
ATPase Na+/K+ transporting subunit beta 3 (ATP1B3)
ATPase plasma membrane Ca2+ transporting 4 (ATP2B4)
Fos proto-oncogene, AP-1 transcription factor subunit (FOS)
G protein subunit alpha i1 (GNAI1)
GNAS complex locus (GNAS)
Jun proto-oncogene, AP-1 transcription factor subunit (JUN)
Rap guanine nucleotide exchange factor 4 (RAPGEF4)
adenylate cyclase 1 (ADCY1)
adenylate cyclase 9 (ADCY9)
afadin, adherens junction formation factor (AFDN)
calcium voltage-gated channel subunit alpha1 C (CACNA1C)
calcium/calmodulin dependent protein kinase II beta (CAMK2B)
cyclic nucleotide gated channel alpha 3 (CNGA3)
cyclic nucleotide gated channel alpha 4 (CNGA4)
dopamine receptor D2 (DRD2)
free fatty acid receptor 2 (FFAR2)
gamma-aminobutyric acid type B receptor subunit 2 (GABBR2)
gastric inhibitory polypeptide receptor (GIPR)
ghrelin and obestatin prepropeptide (GHRL)
glucagon like peptide 1 receptor (GLP1R)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
glutamate ionotropic receptor NMDA type subunit 3A (GRIN3A)
hyperpolarization activated cyclic nucleotide gated potassium channel 4 (HCN4)
phosphodiesterase 4B (PDE4B)
phospholipase D1 (PLD1)
prostaglandin E receptor 2 (PTGER2)
prostaglandin E receptor 3 (PTGER3)
solute carrier family 9 member A1 (SLC9A1)
somatostatin receptor 1 (SSTR1)
somatostatin receptor 2 (SSTR2)
thyroid stimulating hormone receptor (TSHR)
troponin I3, cardiac type (TNNI3)

[Table 30]

TABLE 30

Genes with elevated expression relating to
"Circadian entrainment" (EP cells)
Gene Name (Abbreviation)

Fos proto-oncogene, AP-1 transcription factor subunit (FOS)
G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
adenylate cyclase 1 (ADCY1)
adenylate cyclase 9 (ADCY9)
calcium voltage-gated channel subunit alpha1 C (CACNA1C)
calcium/calmodulin dependent protein kinase II beta (CAMK2B)
glutamate ionotropic receptor AMPA type subunit 2 (GRIA2)
glutamate ionotropic receptor AMPA type subunit 3 (GRIA3)
glutamate ionotropic receptor AMPA type subunit 4 (GRIA4)
nitric oxide synthase 1 (NOS1)
phospholipase C beta 4 (PLCB4)
potassium voltage-gated channel subfamily J member 3 (KCNJ3)
potassium voltage-gated channel subfamily J member 6 (KCNJ6)
ras related dexamethasone induced 1 (RASD1)
ryanodine receptor 1 (RYR1)

[Table 31]

TABLE 31

Genes with elevated expression relating to
"Serotonergic synapse" (EP cells)
Gene Name (Abbreviation)

G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
KRAS proto-oncogene, GTPase (KRAS)
arachidonate 5-lipoxygenase (ALOX5)
calcium voltage-gated channel subunit alpha1 A (CACNA1A)
calcium voltage-gated channel subunit alpha1 B (CACNA1B)
calcium voltage-gated channel subunit alpha1 C (CACNA1C)
cytochrome P450 family 2 subfamily C member 8 (CYP2C8)
cytochrome P450 family 2 subfamily J member 2 (CYP2J2)
dopa decarboxylase (DDC)
gamma-aminobutyric acid type A receptor beta3 subunit (GABRB3)
phospholipase C beta 4 (PLCB4)
potassium voltage-gated channel subfamily J member 3 (KCNJ3)
potassium voltage-gated channel subfamily J member 6 (KCNJ6)
solute carrier family 18 member A1 (SLC18A1)
solute carrier family 18 member A2 (SLC18A2)
solute carrier family 6 member 4 (SLC6A4)
tryptophan hydroxylase 1 (TPH1)

[Table 32]

TABLE 32

Genes with elevated expression relating to "Alcoholism" (EP cells)
Gene Name (Abbreviation)

G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
GNAS complex locus (GNAS)
H2A histone family member J (H2AFJ)
KRAS proto-oncogene, GTPase (KRAS)
corticotropin releasing hormone (CRH)
dopa decarboxylase (DDC)
dopamine receptor D2 (DRD2)
glutamate ionotropic receptor NMDA type subunit 3A (GRIN3A)
histone cluster 1 H2A family member c (HIST1H2AC)
histone cluster 1 H2A family member e (HIST1H2AE)
histone cluster 1 H2A family member i (HIST1H2AI)
histone cluster 1 H2B family member d (HIST1H2BD)
histone cluster 1 H2B family member e (HIST1H2BE)
histone cluster 1 H2B family member g (HIST1H2BG)
histone cluster 1 H2B family member h (HIST1H2BH)
histone cluster 1 H2B family member j (HIST1H2BJ)
histone cluster 1 H2B family member k (HIST1H2BK)
histone cluster 1 H3 family member e (HIST1H3E)
histone cluster 2 H2A family member a4 (HIST2H2AA4)
histone cluster 2 H2B family member e (HIST2H2BE)
histone cluster 3 H2A (HIST3H2A)
histone cluster 4 H4 (HIST4H4)
protein kinase (cAMP-dependent, catalytic) inhibitor alpha (PKIA)
solute carrier family 18 member A1 (SLC18A1)
solute carrier family 18 member A2 (SLC18A2)
tyrosine hydroxylase (TH)

[Table 33]

TABLE 33

Genes with elevated expression relating to
"Morphine addiction" (EP cells)
Gene Name (Abbreviation)

G protein subunit alpha i1 (GNAI1)
G protein subunit alpha o1 (GNAO1)
G protein subunit beta 1 (GNB1)
G protein subunit gamma 2 (GNG2)
G protein subunit gamma 3 (GNG3)
G protein subunit gamma 4 (GNG4)
G protein subunit gamma 8 (GNG8)
G protein-coupled receptor kinase 4 (GRK4)
GNAS complex locus (GNAS)
adenylate cyclase 1 (ADCY1)
adenylate cyclase 9 (ADCY9)
calcium voltage-gated channel subunit alpha1 A (CACNA1A)
gamma-aminobutyric acid type A receptor alpha1 subunit (GABRA1)
gamma-aminobutyric acid type A receptor alpha2 subunit (GABRA2)
gamma-aminobutyric acid type A receptor beta3 subunit (GABRB3)
gamma-aminobutyric acid type B receptor subunit 2 (GABBR2)
phosphodiesterase 2A (PDE2A)
phosphodiesterase 4B (PDE4B)
potassium voltage-gated channel subfamily J member 3 (KCNJ3)
potassium voltage-gated channel subfamily J member 6 (KCNJ6)

[Table 34]

TABLE 34

Genes with reduced expression relating to
"DNA replication" (EP cells)
Gene Name (Abbreviation)

DNA ligase 1 (LIG1)
DNA polymerase alpha 1, catalytic subunit (POLA1)
DNA polymerase alpha 2, accessory subunit (POLA2)
DNA polymerase delta 1, catalytic subunit (POLD1)
DNA polymerase delta 3, accessory subunit (POLD3)
DNA polymerase epsilon 2, accessory subunit (POLE2)
DNA polymerase epsilon, catalytic subunit (POLE)
DNA replication helicase/nuclease 2 (DNA2)
flap structure-specific endonuclease 1 (FEN1)
minichromosome maintenance complex component 2 (MCM2)
minichromosome maintenance complex component 3 (MCM3)
minichromosome maintenance complex component 4 (MCM4)
minichromosome maintenance complex component 5 (MCM5)
minichromosome maintenance complex component 6 (MCM6)
minichromosome maintenance complex component 7 (MCM7)
primase (DNA) subunit 1 (PRIM1)
primase (DNA) subunit 2 (PRIM2)
proliferating cell nuclear antigen (PCNA)
replication factor C subunit 2 (RFC2)
replication factor C subunit 3 (RFC3)
replication factor C subunit 4 (RFC4)
replication factor C subunit 5 (RFC5)
replication protein A1 (RPA1)
replication protein A3 (RPA3)
ribonuclease H2 subunit B (RNASEH2B)

[Table 35]

TABLE 35

Genes with reduced expression relating to "Cell cycle" (EP cells)
Gene Name (Abbreviation)

BUB1 mitotic checkpoint serine/threonine kinase B (BUB1B)
BUB1 mitotic checkpoint serine/threonine kinase (BUB1)
DBF4 zinc finger (DBF4)
E2F transcription factor 2 (E2F2)
E2F transcription factor 3 (E2F3)
MAD2 mitotic arrest deficient-like 1 (yeast) (MAD2L1)
MDM2 proto-oncogene (MDM2)
RB transcriptional corepressor like 1 (RBL1)

TABLE 35-continued

Genes with reduced expression relating to "Cell cycle" (EP cells)
Gene Name (Abbreviation)

S-phase kinase associated protein 2 (SKP2)
SMAD family member 3 (SMAD3)
TTK protein kinase (TTK)
cell division cycle 14B (CDC14B)
cell division cycle 20 (CDC20)
cell division cycle 25C (CDC25C)
cell division cycle 45 (CDC45)
cell division cycle 6 (CDC6)
cell division cycle 7 (CDC7)
checkpoint kinase 1 (CHEK1)
cyclin A2 (CCNA2)
cyclin B1 (CCNB1)
cyclin B2 (CCNB2)
cyclin D1 (CCND1)
cyclin D2 (CCND2)
cyclin E2 (CCNE2)
cyclin dependent kinase 1 (CDK1)
cyclin dependent kinase 2 (CDK2)
cyclin dependent kinase 6 (CDK6)
cyclin dependent kinase inhibitor 2A (CDKN2A)
extra spindle pole bodies like 1, separase (ESPL1)
minichromosome maintenance complex component 2 (MCM2)
minichromosome maintenance complex component 3 (MCM3)
minichromosome maintenance complex component 4 (MCM4)
minichromosome maintenance complex component 5 (MCM5)
minichromosome maintenance complex component 6 (MCM6)
minichromosome maintenance complex component 7 (MCM7)
origin recognition complex subunit 1 (ORC1)
pituitary tumor-transforming 1 (PTTG1)
proliferating cell nuclear antigen (PCNA)
structural maintenance of chromosomes 1A (SMC1A)
transforming growth factor beta 2 (TGFB2)
tumor protein p53 (TP53)

[Table 36]

TABLE 36

Genes with reduced expression relating to
"Pathways in cancer" (EP cells)
Gene Name (Abbreviation)

BCL2, apoptosis regulator (BCL2)
BCR, RhoGEF and GTPase activating protein (BCR)
BRCA2, DNA repair associated (BRCA2)
CDC28 protein kinase regulatory subunit 1B (CKS1B)
Cbl proto-oncogene (CBL)
E2F transcription factor 2 (E2F2)
E2F transcription factor 3 (E2F3)
Fas cell surface death receptor (FAS)
G protein subunit beta 4 (GNB4)
G protein subunit gamma 12 (GNG12)
GLI family zinc finger 2 (GLI2)
GLI family zinc finger 3 (GLI3)
KIT ligand (KITLG)
KRAS proto-oncogene, GTPase (KRAS)
MDM2 proto-oncogene (MDM2)
MDS1 and EVI1 complex locus (MECOM)
MET proto-oncogene, receptor tyrosine kinase (MET)
NK3 homeobox 1 (NKX3-1)
RAD51 recombinase (RAD51)
S-phase kinase associated protein 2 (SKP2)
SMAD family member 3 (SMAD3)
TNF receptor associated factor 5 (TRAF5)
Wnt family member 5A (WNT5A)
adenylate cyclase 3 (ADCY3)
adenylate cyclase 7 (ADCY7)
androgen receptor (AR)
aryl hydrocarbon receptor nuclear translocator (ARNT)
baculoviral IAP repeat containing 5 (BIRC5)
bone morphogenetic protein 2 (BMP2)
cadherin 1 (CDH1)
caspase 8 (CASP8)
collagen type IV alpha 1 chain (COL4A1)
collagen type IV alpha 2 chain (COL4A2)

TABLE 36-continued

Genes with reduced expression relating to
"Pathways in cancer" (EP cells)
Gene Name (Abbreviation)

collagen type IV alpha 5 chain (COL4A5)
collagen type IV alpha 6 chain (COL4A6)
cyclin D1 (CCND1)
cyclin E2 (CCNE2)
cyclin dependent kinase 2 (CDK2)
cyclin dependent kinase 6 (CDK6)
cyclin dependent kinase inhibitor 2A (CDKN2A)
death associated protein kinase 1 (DAPK1)
endothelin receptor type A (EDNRA)
endothelin receptor type B (EDNRB)
fibroblast growth factor 13 (FGF13)
fibroblast growth factor 2 (FGF2)
fibroblast growth factor receptor 2 (FGFR2)
fibronectin 1 (FN1)
frizzled class receptor 2 (FZD2)
frizzled class receptor 4 (FZD4)
frizzled class receptor 7 (FZD7)
heat shock protein 90 beta family member 1 (HSP90B1)
integrin subunit alpha 2 (ITGA2)
laminin subunit alpha 1 (LAMA1)
laminin subunit alpha 3 (LAMA3)
laminin subunit beta 1 (LAMB1)
lysophosphatidic acid receptor 3 (LPAR3)
melanogenesis associated transcription factor (MITF)
mutS homolog 6 (MSH6)
phospholipase C beta 1 (PLCB1)
platelet derived growth factor receptor alpha (PDGFRA)
prostaglandin E receptor 3 (PTGER3)
ras-related C3 botulinum toxin substrate 1 (rho family, small GTP binding protein Rac1) (RAC1)
retinoic acid receptor beta (RARB)
sonic hedgehog (SHH)
transcription factor 7 like 1 (TCF7L1)
transcription factor 7 like 2 (TCF7L2)
transforming growth factor alpha (TGFA)
transforming growth factor beta 2 (TGFB2)
translocated promoter region, nuclear basket protein (TPR)
tumor protein p53 (TP53)
vascular endothelial growth factor C (VEGFC)

[Table 37]

TABLE 37

Genes with reduced expression relating to "Mismatch repair" (EP cells)
Gene Name (Abbreviation)

DNA ligase 1 (LIG1)
DNA polymerase delta 1, catalytic subunit (POLD1)
DNA polymerase delta 3, accessory subunit (POLD3)
exonuclease 1 (EXO1)
mutS homolog 6 (MSH6)
proliferating cell nuclear antigen (PCNA)
replication factor C subunit 2 (RFC2)
replication factor C subunit 3 (RFC3)
replication factor C subunit 4 (RFC4)
replication factor C subunit 5 (RFC5)
replication protein A1 (RPA1)
replication protein A3 (RPA3)

[Table 38]

TABLE 38

Genes with reduced expression relating to
"PI3K-Akt signaling pathway" (EP cells)
Gene Name (Abbreviation)

BCL2 family apoptosis regulator (MCL1)
BCL2, apoptosis regulator (BCL2)
BRCA1, DNA repair associated (BRCA1)
G protein subunit beta 4 (GNB4)
G protein subunit gamma 12 (GNG12)

TABLE 38-continued

Genes with reduced expression relating to
"PI3K-Akt signaling pathway" (EP cells)
Gene Name (Abbreviation)

Janus kinase 2 (JAK2)
KIT ligand (KITLG)
KRAS proto-oncogene, GTPase (KRAS)
MDM2 proto-oncogene (MDM2)
MET proto-oncogene, receptor tyrosine kinase (MET)
MYB proto-oncogene, transcription factor (MYB)
PH domain and leucine rich repeat protein phosphatase 1 (PHLPP1)
Ras homolog enriched in brain (RHEB)
chorionic somatomammotropin hormone 1 (CSH1)
collagen type I alpha 1 chain (COL1A1)
collagen type I alpha 2 chain (COL1A2)
collagen type II alpha 1 chain (COL2A1)
collagen type III alpha 1 chain (COL3A1)
collagen type IV alpha 1 chain (COL4A1)
collagen type IV alpha 2 chain (COL4A2)
collagen type IV alpha 5 chain (COL4A5)
collagen type IV alpha 6 chain (COL4A6)
collagen type VI alpha 1 chain (COL6A1)
collagen type XI alpha 1 chain (COL11A1)
cyclin D1 (CCND1)
cyclin D2 (CCND2)
cyclin E2 (CCNE2)
cyclin dependent kinase 2 (CDK2)
cyclin dependent kinase 6 (CDK6)
ephrin A2 (EFNA2)
ephrin A5 (EFNA5)
fibroblast growth factor 13 (FGF13)
fibroblast growth factor 2 (FGF2)
fibroblast growth factor receptor 2 (FGFR2)
fibronectin 1 (FN1)
forkhead box O3 (FOXO3)
growth hormone receptor (GHR)
heat shock protein 90 beta family member 1 (HSP90B1)
insulin receptor substrate 1 (IRS1)
integrin subunit alpha 2 (ITGA2)
integrin subunit beta 5 (ITGB5)
interleukin 4 receptor (IL4R)
laminin subunit alpha 1 (LAMA1)
laminin subunit alpha 3 (LAMA3)
laminin subunit beta 1 (LAMB1)
lysophosphatidic acid receptor 3 (LPAR3)
oncostatin M receptor (OSMR)
platelet derived growth factor C (PDGFC)
platelet derived growth factor receptor alpha (PDGFRA)
protein phosphatase 2 regulatory subunit B'epsilon (PPP2R5E)
ras-related C3 botulinum toxin substrate 1 (rho family, small GTP binding protein Rac1) (RAC1)
reelin (RELN)
secreted phosphoprotein 1 (SPP1)
serum/glucocorticoid regulated kinase 1 (SGK1)
spleen associated tyrosine kinase (SYK)
tenascin C (TNC)
thioesterase superfamily member 4 (THEM4)
tumor protein p53 (TP53)
vascular endothelial growth factor C (VEGFC)

[Table 39]

TABLE 39

Genes with reduced expression relating to
"p53 signaling pathway" (EP cells)
Gene Name (Abbreviation)

Fas cell surface death receptor (FAS)
G2 and S-phase expressed 1 (GTSE1)
MDM2 proto-oncogene (MDM2)
STEAP3 metalloreductase (STEAP3)
caspase 8 (CASP8)
checkpoint kinase 1 (CHEK1)
cyclin B1 (CCNB1)
cyclin B2 (CCNB2)
cyclin D1 (CCND1)
cyclin D2 (CCND2)

TABLE 39-continued

Genes with reduced expression relating to
"p53 signaling pathway" (EP cells)
Gene Name (Abbreviation)

cyclin E2 (CCNE2)
cyclin dependent kinase 1 (CDK1)
cyclin dependent kinase 2 (CDK2)
cyclin dependent kinase 6 (CDK6)
cyclin dependent kinase inhibitor 2A (CDKN2A)
damage specific DNA binding protein 2 (DDB2)
insulin like growth factor binding protein 3 (IGFBP3)
ribonucleotide reductase regulatory subunit M2 (RRM2)
tumor protein p53 (TP53)
zinc finger matrin-type 3 (ZMAT3)

[Table 40]

TABLE 40

Genes with reduced expression relating to
"Fanconi anemia pathway" (EP cells)
Gene Name (Abbreviation)

BRCA1 interacting protein C-terminal helicase 1 (BRIP1)
BRCA1, DNA repair associated (BRCA1)
BRCA2, DNA repair associated (BRCA2)
Bloom syndrome RecQ like helicase (BLM)
Fanconi anemia complementation group A (FANCA)
Fanconi anemia complementation group B (FANCB)
Fanconi anemia complementation group D2 (FANCD2)
Fanconi anemia complementation group G (FANCG)
Fanconi anemia complementation group I (FANCI)
Fanconi anemia complementation group M (FANCM)
RAD51 recombinase (RAD51)
RecQ mediated genome instability 2 (RMI2)
essential meiotic structure-specific endonuclease 1 (EME1)
hes family bHLH transcription factor 1 (HES1)
replication protein A1 (RPA1)
replication protein A3 (RPA3)
ubiquitin specific peptidase 1 (USP1)

[Table 41]

TABLE 41

Genes with reduced expression relating to
"Homologous recombination" (EP cells)
Gene Name (Abbreviation)

BRCA2, DNA repair associated (BRCA2)
Bloom syndrome RecQ like helicase (BLM)
DNA polymerase delta 1, catalytic subunit (POLD1)
DNA polymerase delta 3, accessory subunit (POLD3)
RAD51 paralog B (RAD51B)
RAD51 recombinase (RAD51)
RAD54 homolog B (S. cerevisiae) (RAD54B)
RAD54-like (S. cerevisiae) (RAD54L)
essential meiotic structure-specific endonuclease 1 (EME1)
nibrin (NBN)
replication protein A1 (RPA1)
replication protein A3 (RPA3)

[Table 42]

TABLE 42

Genes with reduced expression relating to
"ECM-receptor interaction" (EP cells)
Gene Name (Abbreviation)

CD47 molecule (CD47)
collagen type I alpha 1 chain (COL1A1)
collagen type I alpha 2 chain (COL1A2)
collagen type II alpha 1 chain (COL2A1)
collagen type III alpha 1 chain (COL3A1)

TABLE 42-continued

Genes with reduced expression relating to
"ECM-receptor interaction" (EP cells)
Gene Name (Abbreviation)

collagen type IV alpha 1 chain (COL4A1)
collagen type IV alpha 2 chain (COL4A2)
collagen type IV alpha 5 chain (COL4A5)
collagen type IV alpha 6 chain (COL4A6)
collagen type VI alpha 1 chain (COL6A1)
collagen type XI alpha 1 chain (COL11A1)
fibronectin 1 (FN1)
hyaluronan mediated motility receptor (HMMR)
integrin subunit alpha 2 (ITGA2)
integrin subunit beta 5 (ITGB5)
laminin subunit alpha 1 (LAMA1)
laminin subunit alpha 3 (LAMA3)
laminin subunit beta 1 (LAMB1)
reelin (RELN)
secreted phosphoprotein 1 (SPP1)
syndecan 1 (SDC1)
tenascin C (TNC)

[Table 43]

TABLE 43

Genes with reduced expression relating to
"Small cell lung cancer" (EP cells)
Gene Name (Abbreviation)

BCL2, apoptosis regulator (BCL2)
CDC28 protein kinase regulatory subunit 1B (CKS1B)
E2F transcription factor 2 (E2F2)
E2F transcription factor 3 (E2F3)
S-phase kinase associated protein 2 (SKP2)
TNF receptor associated factor 5 (TRAF5)
collagen type IV alpha 1 chain (COL4A1)
collagen type IV alpha 2 chain (COL4A2)
collagen type IV alpha 5 chain (COL4A5)
collagen type IV alpha 6 chain (COL4A6)
cyclin D1 (CCND1)
cyclin E2 (CCNE2)
cyclin dependent kinase 2 (CDK2)
cyclin dependent kinase 6 (CDK6)
fibronectin 1 (FN1)
integrin subunit alpha 2 (ITGA2)
laminin subunit alpha 1 (LAMA1)
laminin subunit alpha 3 (LAMA3)
laminin subunit beta 1 (LAMB1)
retinoic acid receptor beta (RARB)
tumor protein p53 (TP53)

[Table 44]

TABLE 44

Genes with elevated expression relating to
"Dopaminergic synapse" (iPS-β cells)
Gene Name (Abbreviation)

AKT serine/threonine kinase 2 (AKT2)
AKT serine/threonine kinase 3 (AKT3)
G protein subunit alpha L (GNAL)
G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
GNAS complex locus (GNAS)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium voltage-gated channel subunit alpha1 D (CACNA1D)
calcium/calmodulin dependent protein kinase II beta (CAMK2B)
calcyon neuron specific vesicular protein (CALY)

TABLE 44-continued

Genes with elevated expression relating to
"Dopaminergic synapse" (iPS-β cells)
Gene Name (Abbreviation)

dopa decarboxylase (DDC)
glutamate ionotropic receptor AMPA type subunit 1 (GRIA1)
glutamate ionotropic receptor AMPA type subunit 2 (GRIA2)
glutamate ionotropic receptor AMPA type subunit 4 (GRIA4)
kinesin family member 5A (KIF5A)
kinesin family member 5C (KIF5C)
mitogen-activated protein kinase 12 (MAPK12)
mitogen-activated protein kinase 13 (MAPK13)
phospholipase C beta 4 (PLCB4)
potassium voltage-gated channel subfamily J member 3 (KCNJ3)
potassium voltage-gated channel subfamily J member 6 (KCNJ6)
protein kinase C beta (PRKCB)
protein phosphatase 1 regulatory inhibitor subunit 1B (PPP1R1B)
protein phosphatase 2 regulatory subunit B"beta (PPP2R3B)
protein phosphatase 2 regulatory subunit B'beta (PPP2R5B)
protein phosphatase 2 regulatory subunit Bbeta (PPP2R2B)
protein phosphatase 2 regulatory subunit Bdelta (PPP2R2D)
solute carrier family 18 member A1 (SLC18A1)
solute carrier family 18 member A2 (SLC18A2)
tyrosine hydroxylase (TH)

[Table 45]

TABLE 45

Genes with elevated expression relating to
"Insulin secretion" (iPS-β cells)
Gene Name (Abbreviation)

ATP binding cassette subfamily C member 8 (ABCC8)
ATPase Na+/K+ transporting subunit beta 2 (ATP1B2)
FXYD domain containing ion transport regulator 2 (FXYD2)
GNAS complex locus (GNAS)
adenylate cyclase 1 (ADCY1)
adenylate cyclase 2 (ADCY2)
adenylate cyclase activating polypeptide 1 (ADCYAP1)
calcium voltage-gated channel subunit alpha1 C (CACNA1C)
calcium voltage-gated channel subunit alpha1 D (CACNA1D)
calcium/calmodulin dependent protein kinase II beta (CAMK2B)
free fatty acid receptor 1 (FFAR1)
gastric inhibitory polypeptide (GIP)
glucagon (GCG)
glucokinase (GCK)
insulin (INS)
phospholipase C beta 4 (PLCB4)
piccolo presynaptic cytomatrix protein (PCLO)
potassium calcium-activated channel subfamily M alpha 1 (KCNMA1)
potassium calcium-activated channel subfamily M regulatory beta subunit 2 (KCNMB2)
potassium calcium-activated channel subfamily N member 3 (KCNN3)
potassium voltage-gated channel subfamily J member 11 (KCNJ11)
protein kinase C beta (PRKCB)
regulating synaptic membrane exocytosis 2 (RIMS2)
solute carrier family 2 member 1 (SLC2A1)
synaptosome associated protein 25 (SNAP25)
syntaxin 1A (STX1A)
vesicle associated membrane protein 2 (VAMP2)

[Table 46]

TABLE 46

Genes with elevated expression relating to
"Synaptic vesicle cycle" (iPS-β cells)
Gene Name (Abbreviation)

ATPase H+ transporting V0 subunit a1 (ATP6V0A1)
ATPase H+ transporting V0 subunit e2 (ATP6V0E2)
ATPase H+ transporting V1 subunit B2 (ATP6V1B2)
ATPase H+ transporting V1 subunit G2 (ATP6V1G2)
calcium voltage-gated channel subunit alpha1 A (CACNA1A)
calcium voltage-gated channel subunit alpha1 B (CACNA1B)
clathrin heavy chain like 1 (CLTCL1)

TABLE 46-continued

Genes with elevated expression relating to
"Synaptic vesicle cycle" (iPS-β cells)
Gene Name (Abbreviation)

complexin 1 (CPLX1)
complexin 2 (CPLX2)
dynamin 1 (DNM1)
solute carrier family 17 member 6 (SLC17A6)
solute carrier family 17 member 8 (SLC17A8)
solute carrier family 18 member A1 (SLC18A1)
solute carrier family 18 member A2 (SLC18A2)
synaptosome associated protein 25 (SNAP25)
synaptotagmin 1 (SYT1)
syntaxin 1A (STX1A)
syntaxin 2 (STX2)
syntaxin binding protein 1 (STXBP1)
unc-13 homolog A (UNC13A)
unc-13 homolog B (UNC13B)
vesicle associated membrane protein 2 (VAMP2)

[Table 47]

TABLE 47

Genes with elevated expression relating to
"GABAergic synapse" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
GABA type A receptor associated protein like 1 (GABARAPL1)
GABA type A receptor associated protein like 2 (GABARAPL2)
adenylate cyclase 1 (ADCY1)
adenylate cyclase 2 (ADCY2)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium voltage-gated channel subunit alpha1 D (CACNA1D)
gamma-aminobutyric acid type A receptor beta3 subunit (GABRB3)
gamma-aminobutyric acid type B receptor subunit 2 (GABBR2)
glutamate decarboxylase 1 (GAD1)
glutamate decarboxylase 2 (GAD2)
glutaminase 2 (GLS2)
phospholipase C like 1 (PLCL1)
potassium voltage-gated channel subfamily J member 6 (KCNJ6)
protein kinase C beta (PRKCB)
solute carrier family 38 member 3 (SLC38A3)

[Table 48]

TABLE 48

Genes with elevated expression relating to
"Glutamatergic synapse" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
G protein-coupled receptor kinase 3 (GRK3)
GNAS complex locus (GNAS)
SH3 and multiple ankyrin repeat domains 3 (SHANK3)
adenylate cyclase 1 (ADCY1)
adenylate cyclase 2 (ADCY2)
calcium voltage-gated channel subunit alpha1 A (CACNA1A)
calcium voltage-gated channel subunit alpha1 C (CACNA1C)
calcium voltage-gated channel subunit alpha1 D (CACNA1D)
glutamate ionotropic receptor AMPA type subunit 1 (GRIA1)

TABLE 48-continued

Genes with elevated expression relating to
"Glutamatergic synapse" (iPS-β cells)
Gene Name (Abbreviation)

glutamate ionotropic receptor AMPA type subunit 2 (GRIA2)
glutamate ionotropic receptor AMPA type subunit 4 (GRIA4)
glutamate ionotropic receptor kainate type subunit 3 (GRIK3)
glutaminase 2 (GLS2)
phospholipase A2 group IVC (PLA2G4C)
phospholipase C beta 4 (PLCB4)
potassium voltage-gated channel subfamily J member 3 (KCNJ3)
protein kinase C beta (PRKCB)
solute carrier family 17 member 6 (SLC17A6)
solute carrier family 17 member 8 (SLC17A8)
solute carrier family 38 member 3 (SLC38A3)

[Table 49]

TABLE 49

Genes with elevated expression relating to
"Retrograde endocannabinoid signaling" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
adenylate cyclase 1 (ADCY1)
adenylate cyclase 2 (ADCY2)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium voltage-gated channel subunit alpha1 D (CACNA1D)
gamma-aminobutyric acid type A receptor beta3 subunit (GABRB3)
glutamate ionotropic receptor AMPA type subunit 1 (GRIA1)
glutamate ionotropic receptor AMPA type subunit 2 (GRIA2)
glutamate ionotropic receptor AMPA type subunit 4 (GRIA4)
mitogen-activated protein kinase 12 (MAPK12)
mitogen-activated protein kinase 13 (MAPK13)
phospholipase C beta 4 (PLCB4)
potassium voltage-gated channel subfamily J member 3 (KCNJ3)
potassium voltage-gated channel subfamily J member 6 (KCNJ6)
protein kinase C beta (PRKCB)
solute carrier family 17 member 6 (SLC17A6)
solute carrier family 17 member 8 (SLC17A8)

[Table 50]

TABLE 50

Genes with elevated expression relating to
"Circadian entrainment" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
GNAS complex locus (GNAS)
adenylate cyclase 1 (ADCY1)
adenylate cyclase 2 (ADCY2)
calcium voltage-gated channel subunit alpha1 C (CACNA1C)
calcium voltage-gated channel subunit alpha1 D (CACNA1D)
calcium voltage-gated channel subunit alpha1 H (CACNA1H)
calcium/calmodulin dependent protein kinase II beta (CAMK2B)
glutamate ionotropic receptor AMPA type subunit 1 (GRIA1)
glutamate ionotropic receptor AMPA type subunit 2 (GRIA2)
glutamate ionotropic receptor AMPA type subunit 4 (GRIA4)
period circadian clock 3 (PER3)
phospholipase C beta 4 (PLCB4)

TABLE 50-continued

Genes with elevated expression relating to
"Circadian entrainment" (iPS-β cells)
Gene Name (Abbreviation)

potassium voltage-gated channel subfamily J member 3 (KCNJ3)
potassium voltage-gated channel subfamily J member 6 (KCNJ6)
protein kinase C beta (PRKCB)
ras related dexamethasone induced 1 (RASD1)
ryanodine receptor 1 (RYR1)

[Table 51]

TABLE 51

Genes with elevated expression relating to
"Alcoholism" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
GNAS complex locus (GNAS)
SHC adaptor protein 2 (SHC2)
dopa decarboxylase (DDC)
histone cluster 1 H2A family member c (HIST1H2AC)
histone cluster 1 H2A family member e (HIST1H2AE)
histone cluster 1 H2A family member i (HIST1H2AI)
histone cluster 1 H2A family member k (HIST1H2AK)
histone cluster 1 H2B family member c (HIST1H2BC)
histone cluster 1 H2B family member d (HIST1H2BD)
histone cluster 1 H2B family member e (HIST1H2BE)
histone cluster 1 H2B family member g (HIST1H2BG)
histone cluster 1 H2B family member h (HIST1H2BH)
histone cluster 1 H2B family member j (HIST1H2BJ)
histone cluster 1 H2B family member k (HIST1H2BK)
histone cluster 1 H3 family member a (HIST1H3A)
histone cluster 2 H2A family member a4 (HIST2H2AA4)
histone cluster 2 H2B family member e (HIST2H2BE)
histone cluster 3 H2A (HIST3H2A)
histone cluster 4 H4 (HIST4H4)
histone deacetylase 11 (HDAC11)
histone deacetylase 5 (HDAC5)
prodynorphin (PDYN)
protein kinase (cAMP-dependent, catalytic) inhibitor alpha (PKIA)
protein phosphatase 1 regulatory inhibitor subunit 1B (PPP1R1B)
solute carrier family 18 member A1 (SLC18A1)
solute carrier family 18 member A2 (SLC18A2)
tyrosine hydroxylase (TH)

[Table 52]

TABLE 52

Genes with elevated expression relating to
"Serotonergic synapse" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
GNAS complex locus (GNAS)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium voltage-gated channel subunit alpha1 D (CACNA1D)
cytochrome P450 family 2 subfamily J member 2 (CYP2J2)
cytochrome P450 family 4 subfamily X member 1 (CYP4X1)
dopa decarboxylase (DDC)
gamma-aminobutyric acid type A receptor beta3 subunit (GABRB3)

TABLE 52-continued

Genes with elevated expression relating to
"Serotonergic synapse" (iPS-β cells)
Gene Name (Abbreviation)

phospholipase A2 group IVC (PLA2G4C)
phospholipase C beta 4 (PLCB4)
potassium voltage-gated channel subfamily J member 3 (KCNJ3)
potassium voltage-gated channel subfamily J member 6 (KCNJ6)
protein kinase C beta (PRKCB)
solute carrier family 18 member A1 (SLC18A1)
solute carrier family 18 member A2 (SLC18A2)
solute carrier family 6 member 4 (SLC6A4)
tryptophan hydroxylase 1 (TPH1)

[Table 53]

TABLE 53

Genes with elevated expression relating to
"Cholinergic synapse" (iPS-β cells)
Gene Name (Abbreviation)

AKT serine/threonine kinase 2 (AKT2)
AKT serine/threonine kinase 3 (AKT3)
G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
adenylate cyclase 1 (ADCY1)
adenylate cyclase 2 (ADCY2)
calcium voltage-gated channel subunit alpha1 A (CACNA1A)
calcium voltage-gated channel subunit alpha1 B (CACNA1B)
calcium voltage-gated channel subunit alpha1 C (CACNA1C)
calcium voltage-gated channel subunit alpha1 D (CACNA1D)
calcium/calmodulin dependent protein kinase II beta (CAMK2B)
cholinergic receptor nicotinic beta 2 subunit (CHRNB2)
phosphatidylinositol-4,5-bisphosphate 3-kinase catalytic subunit delta (PIK3CD)
phospholipase C beta 4 (PLCB4)
potassium voltage-gated channel subfamily J member 3 (KCNJ3)
potassium voltage-gated channel subfamily J member 6 (KCNJ6)
potassium voltage-gated channel subfamily Q member 2 (KCNQ2)
protein kinase C beta (PRKCB)

[Table 54]

TABLE 54

Genes with elevated expression relating to
"Morphine addiction" (iPS-β cells)
Gene Name (Abbreviation)

G protein subunit alpha o1 (GNAO1)
G protein subunit beta 5 (GNB5)
G protein subunit gamma 13 (GNG13)
G protein subunit gamma 2 (GNG2)
G protein subunit gamma 3 (GNG3)
G protein subunit gamma 4 (GNG4)
G protein subunit gamma 7 (GNG7)
G protein-coupled receptor kinase 3 (GRK3)
G protein-coupled receptor kinase 4 (GRK4)
GNAS complex locus (GNAS)
adenylate cyclase 1 (ADCY1)
adenylate cyclase 2 (ADCY2)
calcium voltage-gated channel subunit alpha1 A (CACNA1A)
calcium voltage-gated channel subunit alpha1 B (CACNA1B)
gamma-aminobutyric acid type A receptor beta3 subunit (GABRB3)
gamma-aminobutyric acid type B receptor subunit 2 (GABBR2)
phosphodiesterase 2A (PDE2A)
potassium voltage-gated channel subfamily J member 3 (KCNJ3)
potassium voltage-gated channel subfamily J member 6 (KCNJ6)
protein kinase C beta (PRKCB)

[Table 55]

TABLE 55

Genes with elevated expression relating to
"Adrenergic signaling in cardiomyocytes" (iPS-β cells)
Gene Name (Abbreviation)

AKT serine/threonine kinase 2 (AKT2)
AKT serine/threonine kinase 3 (AKT3)
ATPase Na+/K+ transporting subunit beta 2 (ATP1B2)
FXYD domain containing ion transport regulator 2 (FXYD2)
GNAS complex locus (GNAS)
adenylate cyclase 1 (ADCY1)
adenylate cyclase 2 (ADCY2)
adrenoceptor beta 1 (ADRB1)
cAMP responsive element modulator (CREM)
calcium voltage-gated channel auxiliary subunit alpha2delta 2 (CACNA2D2)
calcium voltage-gated channel auxiliary subunit alpha2delta 3 (CACNA2D3)
calcium voltage-gated channel auxiliary subunit beta 2 (CACNB2)
calcium voltage-gated channel subunit alpha1 C (CACNA1C)
calcium voltage-gated channel subunit alpha1 D (CACNA1D)
calcium/calmodulin dependent protein kinase II beta (CAMK2B)
mitogen-activated protein kinase 12 (MAPK12)
mitogen-activated protein kinase 13 (MAPK13)
phosphatidylinositol-4,5-bisphosphate 3-kinase catalytic subunit delta (PIK3CD)
phospholipase C beta 4 (PLCB4)
protein phosphatase 1 regulatory inhibitor subunit 1A (PPP1R1A)
protein phosphatase 2 regulatory subunit B"beta (PPP2R3B)
protein phosphatase 2 regulatory subunit B'beta (PPP2R5B)
protein phosphatase 2 regulatory subunit Bbeta (PPP2R2B)
protein phosphatase 2 regulatory subunit Bdelta (PPP2R2D)
sodium voltage-gated channel alpha subunit 7 (SCN7A)
sodium voltage-gated channel beta subunit 1 (SCN1B)
troponin I3, cardiac type (TNNI3)

[Table 56]

TABLE 56

Genes with elevated expression relating to
"Maturity onset diabetes of the young" (iPS-β cells)
Gene Name (Abbreviation)

NK2 homeobox 2 (NKX2-2)
NK6 homeobox 1 (NKX6-1)
forkhead box A2 (FOXA2)
glucokinase (GCK)
insulin (INS)
motor neuron and pancreas homeobox 1 (MNX1)
neurogenin 3 (NEUROG3)
neuronal differentiation 1 (NEUROD1)
paired box 4 (PAX4)
paired box 6 (PAX6)

[Table 57]

TABLE 57

Genes with reduced expression relating to "Cell cycle" (iPS-β cells)
Gene Name (Abbreviation)

BUB1 mitotic checkpoint serine/threonine kinase B (BUB1B)
BUB1 mitotic checkpoint serine/threonine kinase (BUB1)
DBF4 zinc finger (DBF4)
E2F transcription factor 5 (E2F5)
MAD2 mitotic arrest deficient-like 1 (yeast) (MAD2L1)
MDM2 proto-oncogene (MDM2)
RB transcriptional corepressor like 1 (RBL1)
S-phase kinase associated protein 2 (SKP2)
SMAD family member 3 (SMAD3)
SMAD family member 4 (SMAD4)
TTK protein kinase (TTK)
cell division cycle 14B (CDC14B)
cell division cycle 20 (CDC20)

TABLE 57-continued

Genes with reduced expression relating to "Cell cycle" (iPS-β cells)
Gene Name (Abbreviation)

cell division cycle 25A (CDC25A)
cell division cycle 25C (CDC25C)
cell division cycle 45 (CDC45)
cell division cycle 6 (CDC6)
cell division cycle 7 (CDC7)
checkpoint kinase 1 (CHEK1)
cyclin A2 (CCNA2)
cyclin B1 (CCNB1)
cyclin B2 (CCNB2)
cyclin D2 (CCND2)
cyclin dependent kinase 1 (CDK1)
cyclin dependent kinase 2 (CDK2)
cyclin dependent kinase 6 (CDK6)
cyclin dependent kinase inhibitor 2B (CDKN2B)
minichromosome maintenance complex component 2 (MCM2)
minichromosome maintenance complex component 3 (MCM3)
minichromosome maintenance complex component 4 (MCM4)
minichromosome maintenance complex component 5 (MCM5)
minichromosome maintenance complex component 6 (MCM6)
minichromosome maintenance complex component 7 (MCM7)
origin recognition complex subunit 1 (ORC1)
proliferating cell nuclear antigen (PCNA)
protein kinase, DNA-activated, catalytic polypeptide (PRKDC)
stratifin (SFN)
structural maintenance of chromosomes 1A (SMC1A)
transforming growth factor beta 2 (TGFB2)
tumor protein p53 (TP53)
v-myc avian myelocytomatosis viral oncogene homolog (MYC)

[Table 58]

TABLE 58

Genes with reduced expression relating to
"ECM-receptor interaction" (iPS-β cells)
Gene Name (Abbreviation)

CD44 molecule (Indian blood group) (CD44)
collagen type I alpha 1 chain (COL1A1)
collagen type I alpha 2 chain (COL1A2)
collagen type II alpha 1 chain (COL2A1)
collagen type III alpha 1 chain (COL3A1)
collagen type IV alpha 1 chain (COL4A1)
collagen type IV alpha 5 chain (COL4A5)
collagen type V alpha 1 chain (COL5A1)
collagen type VI alpha 1 chain (COL6A1)
collagen type VI alpha 3 chain (COL6A3)
collagen type VI alpha 6 chain (COL6A6)
collagen type XI alpha 1 chain (COL11A1)
fibronectin 1 (FN1)
hyaluronan mediated motility receptor (HMMR)
integrin subunit alpha 1 (ITGA1)
integrin subunit alpha 2 (ITGA2)
integrin subunit alpha 4 (ITGA4)
integrin subunit alpha 6 (ITGA6)
integrin subunit alpha 8 (ITGA8)
integrin subunit alpha 9 (ITGA9)
integrin subunit beta 4 (ITGB4)
integrin subunit beta 5 (ITGB5)
laminin subunit alpha 1 (LAMA1)
laminin subunit alpha 3 (LAMA3)
laminin subunit alpha 4 (LAMA4)
laminin subunit gamma 1 (LAMC1)
laminin subunit gamma 2 (LAMC2)
secreted phosphoprotein 1 (SPP1)
syndecan 1 (SDC1)
tenascin C (TNC)
thrombospondin 1 (THBS1)

[Table 59]

TABLE 59

Genes with reduced expression relating to
"PI3K-Akt signaling pathway" (iPS-β cells)
Gene Name (Abbreviation)

BCL2 family apoptosis regulator (MCL1)
BCL2, apoptosis regulator (BCL2)
BRCA1, DNA repair associated (BRCA1)
EPH receptor A2 (EPHA2)
G protein subunit beta 4 (GNB4)
G protein subunit gamma 11 (GNG11)
G protein subunit gamma 12 (GNG12)
Janus kinase 2 (JAK2)
KIT ligand (KITLG)
KRAS proto-oncogene, GTPase (KRAS)
MDM2 proto-oncogene (MDM2)
MET proto-oncogene, receptor tyrosine kinase (MET)
Ras homolog enriched in brain (RHEB)
SOS Ras/Rac guanine nucleotide exchange factor 1 (SOS1)
angiopoietin 1 (ANGPT1)
cAMP responsive element binding protein 3 like 3 (CREB3L3)
coagulation factor II thrombin receptor (F2R)
collagen type I alpha 1 chain (COL1A1)
collagen type I alpha 2 chain (COL1A2)
collagen type II alpha 1 chain (COL2A1)
collagen type III alpha 1 chain (COL3A1)
collagen type IV alpha 1 chain (COL4A1)
collagen type IV alpha 5 chain (COL4A5)
collagen type V alpha 1 chain (COL5A1)
collagen type VI alpha 1 chain (COL6A1)
collagen type VI alpha 3 chain (COL6A3)
collagen type VI alpha 6 chain (COL6A6)
collagen type XI alpha 1 chain (COL11A1)
cyclin D2 (CCND2)
cyclin dependent kinase 2 (CDK2)
cyclin dependent kinase 6 (CDK6)
ephrin A2 (EFNA2)
ephrin A5 (EFNA5)
epidermal growth factor receptor (EGFR)
epidermal growth factor (EGF)
eukaryotic translation initiation factor 4B (EIF4B)
fibroblast growth factor 2 (FGF2)
fibroblast growth factor 20 (FGF20)
fibroblast growth factor receptor 2 (FGFR2)
fibronectin 1 (FN1)
fms related tyrosine kinase 1 (FLT1)
growth hormone receptor (GHR)
heat shock protein 90 beta family member 1 (HSP90B1)
hepatocyte growth factor (HGF)
insulin receptor substrate 1 (IRS1)
integrin subunit alpha 1 (ITGA1)
integrin subunit alpha 2 (ITGA2)
integrin subunit alpha 4 (ITGA4)
integrin subunit alpha 6 (ITGA6)
integrin subunit alpha 8 (ITGA8)
integrin subunit alpha 9 (ITGA9)
integrin subunit beta 4 (ITGB4)
integrin subunit beta 5 (ITGB5)
interleukin 2 receptor subunit gamma (IL2RG)
kinase insert domain receptor (KDR)
laminin subunit alpha 1 (LAMA1)
laminin subunit alpha 3 (LAMA3)
laminin subunit alpha 4 (LAMA4)
laminin subunit gamma 1 (LAMC1)
laminin subunit gamma 2 (LAMC2)
lysophosphatidic acid receptor 3 (LPAR3)
lysophosphatidic acid receptor 6 (LPAR6)
oncostatin M receptor (OSMR)
phosphatidylinositol-4,5-bisphosphate 3-kinase catalytic subunit beta (PIK3CB)
phosphoenolpyruvate carboxykinase 1 (PCK1)
phosphoinositide-3-kinase regulatory subunit 1 (PIK3R1)
platelet derived growth factor C (PDGFC)
platelet derived growth factor receptor alpha (PDGFRA)
protein kinase N2 (PKN2)
protein phosphatase 2 regulatory subunit B"alpha (PPP2R3A)
ras-related C3 botulinum toxin substrate 1 (rho family, small GTP binding protein Rac1) (RAC1)

TABLE 59-continued

Genes with reduced expression relating to
"PI3K-Akt signaling pathway" (iPS-β cells)
Gene Name (Abbreviation)

secreted phosphoprotein 1 (SPP1)
serum/glucocorticoid regulated kinase 1 (SGK1)
spleen associated tyrosine kinase (SYK)
tenascin C (TNC)
thrombospondin 1 (THBS1)
toll like receptor 4 (TLR4)
tumor protein p53 (TP53)
v-myc avian myelocytomatosis viral oncogene homolog (MYC)

[Table 60]

TABLE 60

Genes with reduced expression relating to
"Proteoglycans in cancer" (iPS-β cells)
Gene Name (Abbreviation)

CD44 molecule (Indian blood group) (CD44)
Cbl proto-oncogene B (CBLB)
Cbl proto-oncogene (CBL)
Fas cell surface death receptor (FAS)
GRB2 associated binding protein 1 (GAB1)
IQ motif containing GTPase activating protein 1 (IQGAP1)
KRAS proto-oncogene, GTPase (KRAS)
MDM2 proto-oncogene (MDM2)
MET proto-oncogene, receptor tyrosine kinase (MET)
SOS Ras/Rac guanine nucleotide exchange factor 1 (SOS1)
T-cell lymphoma invasion and metastasis 1 (TIAM1)
TIMP metallopeptidase inhibitor 3 (TIMP3)
Wnt family member 5A (WNT5A)
ankyrin 3 (ANK3)
calcium/calmodulin dependent protein kinase II delta (CAMK2D)
caveolin 1 (CAV1)
caveolin 2 (CAV2)
decorin (DCN)
epidermal growth factor receptor (EGFR)
eukaryotic translation initiation factor 4B (EIF4B)
ezrin (EZR)
fibroblast growth factor 2 (FGF2)
fibronectin 1 (FN1)
frizzled class receptor 2 (FZD2)
frizzled class receptor 4 (FZD4)
frizzled class receptor 5 (FZD5)
frizzled class receptor 7 (FZD7)
glypican 3 (GPC3)
hepatocyte growth factor (HGF)
inositol 1,4,5-trisphosphate receptor type 2 (ITPR2)
integrin subunit alpha 2 (ITGA2)
integrin subunit beta 5 (ITGB5)
kinase insert domain receptor (KDR)
lumican (LUM)
matrix metallopeptidase 2 (MMP2)
matrix metallopeptidase 9 (MMP9)
microRNA 10a (MIR10A)
microRNA 21 (MIR21)
patched 1 (PTCH1)
phosphatidylinositol-4,5-bisphosphate 3-kinase catalytic subunit beta (PIK3CB)
phosphoinositide-3-kinase regulatory subunit 1 (PIK3R1)
plasminogen activator, urokinase (PLAU)
protein kinase cAMP-activated catalytic subunit beta (PRKACB)
radixin (RDX)
ras-related C3 botulinum toxin substrate 1 (rho family, small GTP binding protein Rac1) (RAC1)
syndecan 1 (SDC1)
thrombospondin 1 (THBS1)
toll like receptor 4 (TLR4)
transforming growth factor beta 2 (TGFB2)
tumor protein p53 (TP53)
twist family bHLH transcription factor 1 (TWIST1)
v-myc avian myelocytomatosis viral oncogene homolog (MYC)

[Table 61]

TABLE 61

Genes with reduced expression relating to
"Pathways in cancer" (iPS-β cells)
Gene Name (Abbreviation)

BCL2, apoptosis regulator (BCL2)
BRCA2, DNA repair associated (BRCA2)
C—X—C motif chemokine ligand 12 (CXCL12)
C—X—C motif chemokine ligand 8 (CXCL8)
CCAAT/enhancer binding protein alpha (CEBPA)
CRK like proto-oncogene, adaptor protein (CRKL)
Cbl proto-oncogene B (CBLB)
Cbl proto-oncogene (CBL)
Fas cell surface death receptor (FAS)
G protein subunit beta 4 (GNB4)
G protein subunit gamma 11 (GNG11)
G protein subunit gamma 12 (GNG12)
GLI family zinc finger 2 (GLI2)
GLI family zinc finger 3 (GLI3)
KIT ligand (KITLG)
KRAS proto-oncogene, GTPase (KRAS)
MDM2 proto-oncogene (MDM2)
MDS1 and EVI1 complex locus (MECOM)
MET proto-oncogene, receptor tyrosine kinase (MET)
RAD51 recombinase (RAD51)
RAS like proto-oncogene B (RALB)
S-phase kinase associated protein 2 (SKP2)
SMAD family member 3 (SMAD3)
SMAD family member 4 (SMAD4)
SOS Ras/Rac guanine nucleotide exchange factor 1 (SOS1)
TRK-fused gene (TFG)
Wnt family member 5A (WNT5A)
adenylate cyclase 3 (ADCY3)
adenylate cyclase 7 (ADCY7)
angiotensin II receptor type 1 (AGTR1)
baculoviral IAP repeat containing 3 (BIRC3)
baculoviral IAP repeat containing 5 (BIRC5)
cadherin 1 (CDH1)
caspase 8 (CASP8)
catenin alpha 1 (CTNNA1)
coagulation factor II thrombin receptor (F2R)
collagen type IV alpha 1 chain (COL4A1)
collagen type IV alpha 5 chain (COL4A5)
cullin 2 (CUL2)
cyclin dependent kinase 2 (CDK2)
cyclin dependent kinase 6 (CDK6)
cyclin dependent kinase inhibitor 2B (CDKN2B)
endothelin receptor type A (EDNRA)
endothelin receptor type B (EDNRB)
epidermal growth factor receptor (EGFR)
epidermal growth factor (EGF)
fibroblast growth factor 2 (FGF2)
fibroblast growth factor 20 (FGF20)
fibroblast growth factor receptor 2 (FGFR2)
fibronectin 1 (FN1)
frizzled class receptor 2 (FZD2)
frizzled class receptor 4 (FZD4)
frizzled class receptor 5 (FZD5)
frizzled class receptor 7 (FZD7)
heat shock protein 90 beta family member 1 (HSP90B1)
hedgehog interacting protein (HHIP)
hepatocyte growth factor (HGF)
integrin subunit alpha 2 (ITGA2)
integrin subunit alpha 6 (ITGA6)
laminin subunit alpha 1 (LAMA1)
laminin subunit alpha 3 (LAMA3)
laminin subunit alpha 4 (LAMA4)
laminin subunit gamma 1 (LAMC1)
laminin subunit gamma 2 (LAMC2)
lymphoid enhancer binding factor 1 (LEF1)
lysophosphatidic acid receptor 3 (LPAR3)
lysophosphatidic acid receptor 6 (LPAR6)
matrix metallopeptidase 1 (MMP1)
matrix metallopeptidase 2 (MMP2)
matrix metallopeptidase 9 (MMP9)
patched 1 (PTCH1)
peroxisome proliferator activated receptor gamma (PPARG)
phosphatidylinositol-4,5-bisphosphate 3-kinase catalytic subunit beta

TABLE 61-continued

Genes with reduced expression relating to
"Pathways in cancer" (iPS-β cells)
Gene Name (Abbreviation)

(PIK3CB)
phosphoinositide-3-kinase regulatory subunit 1 (PIK3R1)
platelet derived growth factor receptor alpha (PDGFRA)
prostaglandin E receptor 3 (PTGER3)
protein kinase cAMP-activated catalytic subunit beta (PRKACB)
ras-related C3 botulinum toxin substrate 1 (rho family, small GTP binding protein Rac1) (RAC1)
retinoic acid receptor beta (RARB)
sonic hedgehog (SHH)
transcription factor 7 like 2 (TCF7L2)
transforming growth factor beta 2 (TGFB2)
translocated promoter region, nuclear basket protein (TPR)
tumor protein p53 (TP53)
v-myc avian myelocytomatosis viral oncogene homolog (MYC)

[Table 62]

TABLE 62

Genes with reduced expression relating to
"Focal adhesion" (iPS-β cells)
Gene Name (Abbreviation)

BCL2, apoptosis regulator (BCL2)
CRK like proto-oncogene, adaptor protein (CRKL)
MET proto-oncogene, receptor tyrosine kinase (MET)
Rho GTPase activating protein 35 (ARHGAP35)
SOS Ras/Rac guanine nucleotide exchange factor 1 (SOS1)
actinin alpha 1 (ACTN1)
baculoviral IAP repeat containing 3 (BIRC3)
caveolin 1 (CAV1)
caveolin 2 (CAV2)
collagen type I alpha 1 chain (COL1A1)
collagen type I alpha 2 chain (COL1A2)
collagen type II alpha 1 chain (COL2A1)
collagen type III alpha 1 chain (COL3A1)
collagen type IV alpha 1 chain (COL4A1)
collagen type IV alpha 5 chain (COL4A5)
collagen type V alpha 1 chain (COL5A1)
collagen type VI alpha 1 chain (COL6A1)
collagen type VI alpha 3 chain (COL6A3)
collagen type VI alpha 6 chain (COL6A6)
collagen type XI alpha 1 chain (COL11A1)
cyclin D2 (CCND2)
epidermal growth factor receptor (EGFR)
epidermal growth factor (EGF)
fibronectin 1 (FN1)
fms related tyrosine kinase 1 (FLT1)
hepatocyte growth factor (HGF)
integrin subunit alpha 1 (ITGA1)
integrin subunit alpha 2 (ITGA2)
integrin subunit alpha 4 (ITGA4)
integrin subunit alpha 6 (ITGA6)
integrin subunit alpha 8 (ITGA8)
integrin subunit alpha 9 (ITGA9)
integrin subunit beta 4 (ITGB4)
integrin subunit beta 5 (ITGB5)
kinase insert domain receptor (KDR)
laminin subunit alpha 1 (LAMA1)
laminin subunit alpha 3 (LAMA3)
laminin subunit alpha 4 (LAMA4)
laminin subunit gamma 1 (LAMC1)
laminin subunit gamma 2 (LAMC2)
myosin light chain 12A (MYL12A)
myosin light chain kinase (MYLK)
parvin alpha (PARVA)
phosphatidylinositol-4,5-bisphosphate 3-kinase catalytic subunit beta (PIK3CB)
phosphoinositide-3-kinase regulatory subunit 1 (PIK3R1)
platelet derived growth factor C (PDGFC)
platelet derived growth factor receptor alpha (PDGFRA)
ras-related C3 botulinum toxin substrate 1 (rho family, small GTP binding protein Rac1) RAC1)
secreted phosphoprotein 1 (SPP1)

TABLE 62-continued

Genes with reduced expression relating to
"Focal adhesion" (iPS-β cells)
Gene Name (Abbreviation)

tenascin C (TNC)
thrombospondin 1 (THBS1)
vav guanine nucleotide exchange factor 3 (VAV3)

[Table 63]

TABLE 63

Genes with reduced expression relating to
"DNA replication" (iPS-β cells)
Gene Name (Abbreviation)

DNA polymerase alpha 1, catalytic subunit (POLA1)
DNA polymerase epsilon 2, accessory subunit (POLE2)
DNA polymerase epsilon 4, accessory subunit (POLE4)
flap structure-specific endonuclease 1 (FEN1)
minichromosome maintenance complex component 2 (MCM2)
minichromosome maintenance complex component 3 (MCM3)
minichromosome maintenance complex component 4 (MCM4)
minichromosome maintenance complex component 5 (MCM5)
minichromosome maintenance complex component 6 (MCM6)
minichromosome maintenance complex component 7 (MCM7)
primase (DNA) subunit 1 (PRIM1)
primase (DNA) subunit 2 (PRIM2)
proliferating cell nuclear antigen (PCNA)
replication factor C subunit 2 (RFC2)
replication factor C subunit 3 (RFC3)
ribonuclease H2 subunit B (RNASEH2B)

[Table 64]

TABLE 64

Genes with reduced expression relating to
"TGF-beta signaling pathway" (iPS-β cells)
Gene Name (Abbreviation)

BMP and activin membrane bound inhibitor (BAMBI)
E2F transcription factor 5 (E2F5)
RB transcriptional corepressor like 1 (RBL1)
SMAD family member 3 (SMAD3)
SMAD family member 4 (SMAD4)
SMAD family member 6 (SMAD6)
SMAD family member 7 (SMAD7)
SMAD family member 9 (SMAD9)
TGFB induced factor homeobox 1 (TGIF1)
bone morphogenetic protein 5 (BMP5)
bone morphogenetic protein receptor type 1A (BMPR1A)
bone morphogenetic protein receptor type 1B (BMPR1B)
cyclin dependent kinase inhibitor 2B (CDKN2B)
decorin (DCN)
follistatin (FST)
inhibitor of DNA binding 1, HLH protein (ID1)
inhibitor of DNA binding 2, HLH protein (ID2)
inhibitor of DNA binding 3, HLH protein (ID3)
inhibitor of DNA binding 4, HLH protein (ID4)
latent transforming growth factor beta binding protein 1(LTBP1)
left-right determination factor 1 (LEFTY1)
noggin (NOG)
paired like homeodomain 2 (PITX2)
thrombospondin 1 (THBS1)
transforming growth factor beta 2 (TGFB2)
v-myc avian myelocytomatosis viral oncogene homolog (MYC)

TABLE 65

| PP | Genes with elevated expression in Example 1 | | Genes with reduced expression in Example 1 |
| --- | --- | --- | --- |
| | GNAS | GCK | CD44 |
| Reference Example 1 | 0.585 | 0.00023 | 0.00777 |
| Comparative Example 1 | 0.752 | 0.00624 | 0.00130 |
| Example 1 | 1.107 | 0.00822 | 0.00057 |

TABLE 66

| EP | Genes with reduced expression in Example 1 LIG1 |
| --- | --- |
| Reference Example 1 | 0.00577 |
| Comparative Example 1 | 0.00331 |
| Example 1 | 0.00240 |

TABLE 67

| INS | Genes with elevated expression in Example 1 | | Genes with reduced expression in Example 1 | |
| --- | --- | --- | --- | --- |
| | ADCY1 | ADCY2 | PLCB4 | SMAD9 |
| Reference Example 1 | 0.0043 | 0.0047 | 0.00253 | 0.000719 |
| Comparative Example 1 | 0.0170 | 0.0130 | 0.00928 | 0.000952 |
| Example 1 | 0.0486 | 0.0214 | 0.01646 | 0.000548 |

<Mouse Transplantation Experiment: Analysis of c-Peptide Concentration in Blood>

The iPS-β cells obtained in Example 1 and Example 2 were rinsed once with HBSS, thereafter suspended in HBSS containing 3.33 µg/mL iMatrix-511 (Wako), and the suspended cells were transplanted ($6 \times 10^6$ cells were administered) under the left renal capsules of diabetes model mice (CLEA Japan) using a Hamilton syringe (Hamilton Company). NOD/SCID diabetes model mice were prepared by administering 130 mg/kg of streptozotocin (STZ, Sigma) via the caudal veins of normal NOD/SCID mice. At 10 weeks, 12 weeks, and 14 weeks after the transplantation, mouse blood samples were taken from the caudal vein with Fisher brand heparin-treated hematocrit tubes (Fisher Scientific), and centrifuged (10 minutes, 4° C., 800× g) to separate the serum. Thereafter, a Mercodia Ultrasensitive C-peptide ELISA kit (Mercodia) was used to measure the human c-peptide concentration in mouse blood. For comparison, a Mercodia Ultrasensitive C-peptide ELISA kit (Mercodia) was used to measure the human c-peptide concentration in mouse blood from mice into which iPS-β cells ($4 \times 10^6$) prepared by the method described in Reference Example 1 were transplanted, 12 weeks after transplantation.

Figure 2:
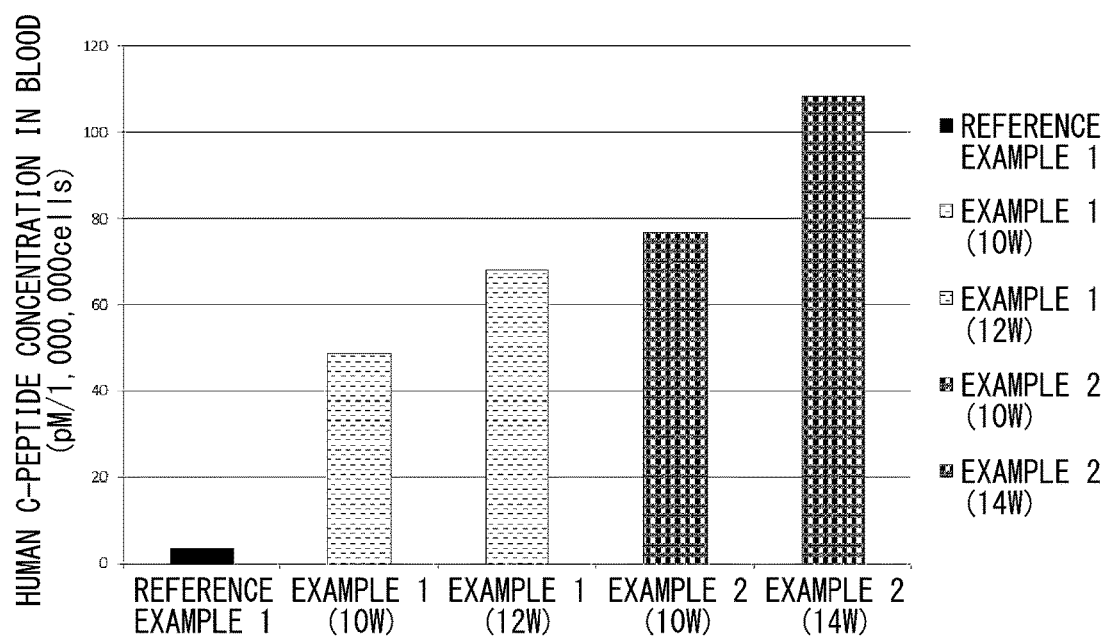
FIG. 2 indicates the results of measurement of the human c-peptide concentration in blood in a cell transplantation experiment in diabetes model mice.

The human c-peptide concentrations in the mouse blood after transplantation are shown in FIG. 2.

In the blood of individual mice in which the iPS-β cells produced by the method of Reference Example 1 were transplanted, an average of 3.5 µM of c-peptide per million transplanted cells was detected 12 weeks after transplantation. On the other hand, in the blood of individual mice in which the iPS-β cells produced by the method of Example 1 were transplanted, an average of 48.6 µM of c-peptide per million transplanted cells was detected 10 weeks after transplantation, and an average of 68.2 µM of c-peptide per million transplanted cells was detected 12 weeks after transplantation. Additionally, in the blood of individual mice in which the iPS-β cells produced by the method of Example 2 were transplanted, an average of 76.8 µM of c-peptide per million transplanted cells was detected 10 weeks after transplantation, and an average of 108.2 µM of c-peptide per million transplanted cells was detected 14 weeks after transplantation.

c-Peptide is a protein that is secreted from pancreatic β cells at a 1:1 molar ratio with respect to insulin. The amount of insulin secreted from pancreatic β cells can be estimated from the concentration of c-peptide. In other words, based on the above-described results, the pancreatic β cells produced by the methods in Examples 1 and 2 secrete extremely large quantities of insulin in comparison with the pancreatic β cells produced in Reference Example 1, and the pancreatic β cells can be estimated to have strong therapeutic effects as cell therapy formulations for diabetes and the like as target diseases.

Therefore, according to the method of the present invention, the differentiation efficiency to pancreatic β cells can be improved. Additionally, the pancreatic β cells obtained by being induced to differentiate from primitive gut tube cells obtained by the method in the present invention can be expected to have strong therapeutic effects in the treatment of diabetes and the like.

<Mouse Transplantation Experiment: Diabetes Model Experiment>

Figure 3:
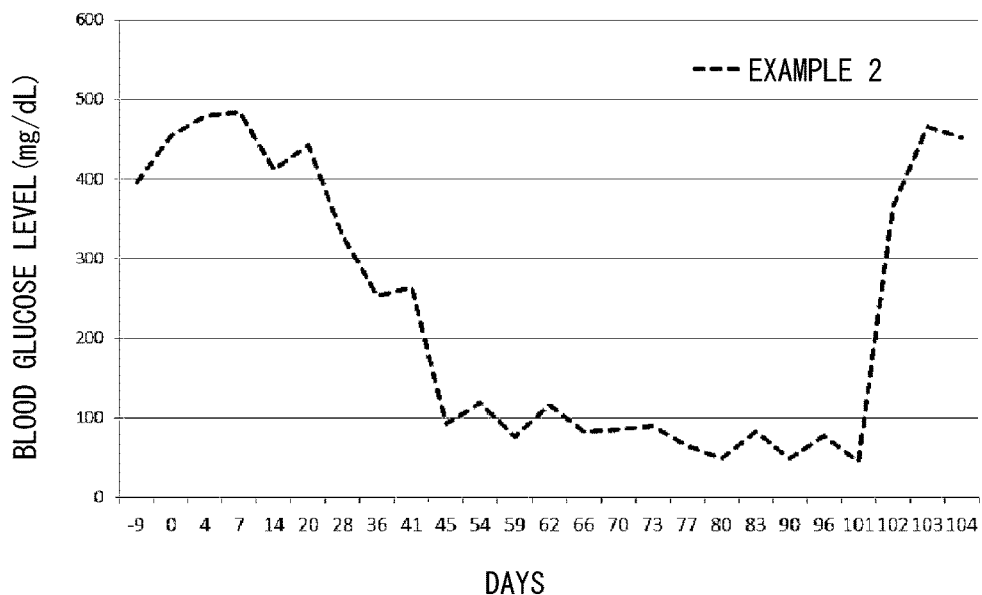
FIG. 3 indicates the results of measurement of the casual blood glucose level in a cell transplantation experiment in diabetes model mice.

In individual mice transplanted with iPS-β cells obtained by induced differentiation from the primitive gut tube cells prepared by the method in Example 2 (FIG. 3, Example 2), the blood glucose level fell to normal levels (200 mg/dL or lower) in about 40 days after transplantation. Additionally, when the kidneys were extracted (the transplanted cells were removed from the mice) 101 days after transplantation, the blood glucose level became elevated again, demonstrating that the transplanted iPS-β cells were regulating the blood glucose level. From these results, somatic cells (pancreatic β cells) obtained by being induced to differentiate from primitive gut tube cells obtained by the method of the present invention can be expected to be effective in applications to the treatment of diabetes and the like.

The invention claimed is:

1. A method for producing pancreatic β cells comprising:
   (a) a step of culturing primitive gut tube (PGT) cells, which have been induced to differentiate from pluripotent stem cells, in the presence of a protein kinase C (PKC) activator, thereby producing posterior foregut (PFC) cells;
   (b) a step of culturing the posterior foregut (PFG) cells in the presence of retinoic acid or an analog thereof, thereby producing pancreatic progenitor (PP) cells;
   (c) a step of culturing the pancreatic progenitor (PP) cells in the presence of a Notch signaling inhibitor and a ROCK signaling inhibitor, thereby producing pancreatic endocrine precursor (EP) cells; and
   (d) a step of culturing the pancreatic endocrine precursor (EP) cells in the presence of an insulin receptor signaling activator, transferrin, and selenous acid, thereby producing pancreatic β cells,
   wherein the step of culturing pancreatic progenitor (PP) cells in the presence of a Notch signaling inhibitor and a ROCK signaling inhibitor is a step of culturing the cells in a culture medium containing 0.0 mmol/L or more of nicotinamide.

2. The method for producing pancreatic β cells according to claim 1, wherein the step of culturing primitive gut tube (PGT) cells, which have been induced to differentiate from pluripotent stem cells, in the presence of a protein kinase C (PKC) activator is performed in the absence of FGF2.

3. The method for producing pancreatic β cells according to claim 1, wherein the step of culturing the pancreatic endocrine precursor (EP) cells in the presence of an insulin receptor signaling activator, transferrin, and selenous acid is performed in the absence of FGF2.

4. The method according to claim 1, wherein the primitive gut tube (PGT) cells, which have been induced to differentiate from pluripotent stem cells, are cells obtained by a step of culturing pluripotent stem cells under conditions in which the cells can be induced to differentiate to endodermal cells, and a step of culturing the cells under conditions in which the endodermal cells can be induced to differentiate to primitive gut tube (PGT) cells.

5. The method according to claim 4, wherein the step of culturing pluripotent stem cells under conditions in which the cells can be induced to differentiate to endodermal cells is a step of culturing the pluripotent stem cells in a culture medium containing a TGFβ superfamily signaling activator, and thereafter culturing the cells in a culture medium to which FGF2 and BMP4 are not added.

6. The method according to claim 4,
wherein the step of culturing the cells under conditions in which the endodermal cells can be induced to differentiate to primitive gut tube (PGT) cells is a step of culturing the endodermal cells in the absence of a bone morphogenetic protein (BMP) signaling inhibitor.

7. The method for producing pancreatic β cells according to claim 1,
wherein a step of culturing primitive gut tube (PGT) cells, which have been induced to differentiate from pluripotent stem cells, in the presence of a protein kinase C (PKC) activator is performed in the presence of a bone morphogenetic protein (BMP) signaling inhibitor.

8. The method according to claim 7,
wherein the protein kinase C (PKC) activator is Indolactam V.

9. The method according to claim 7,
wherein the bone morphogenetic protein (BMP) signaling inhibitor is LDN193189.

10. The method according to claim 7,
wherein the protein kinase C (PKC) activator is Indolactam V and the bone morphogenetic protein (BMP) signaling inhibitor is LDN193189.

\* \* \* \* \*

SEQUENCE LISTING

<160> NUMBER OF SEQ ID NOS: 24

<210> SEQ ID NO 1
<211> LENGTH: 24
<212> TYPE: DNA
<213> ORGANISM: Artificial Sequence
<220> FEATURE:
<223> OTHER INFORMATION: Description of Artificial Sequence: primer

```
<400> SEQUENCE: 1
gtcagaggga tcacaatctt tcag                                          24

<210> SEQ ID NO 2
<211> LENGTH: 23
<212> TYPE: DNA
<213> ORGANISM: Artificial Sequence
<220> FEATURE:
<223> OTHER INFORMATION: Description of Artificial Sequence: primer

<400> SEQUENCE: 2
gtcttgtcgt tggacgttag ttc                                           23

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 3
ttgtgaacca acacctgtgc                                               20

<210> SEQ ID NO 4
<211> LENGTH: 23
<212> TYPE: DNA
<213> ORGANISM: Artificial Sequence
<220> FEATURE:
<223> OTHER INFORMATION: Description of Artificial Sequence: primer

<400> SEQUENCE: 4
gtgtgtagaa gaagcctcgt tcc                                           23

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 5
atcttcgccc tggagaagac                                               20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 6
cgtgcttctt cctccacttg                                               20

<210> SEQ ID NO 7
<211> LENGTH: 21
<212> TYPE: DNA
<213> ORGANISM: Artificial Sequence
<220> FEATURE:
<223> OTHER INFORMATION: Description of Artificial Sequence: primer

<400> SEQUENCE: 7
cctcatgaag atcctcaccg a                                             21

<210> SEQ ID NO 8
<211> LENGTH: 21
```

```
<212> TYPE: DNA
<213> ORGANISM: Artificial Sequence
<220> FEATURE:
<223> OTHER INFORMATION: Description of Artificial Sequence: primer

<400> SEQUENCE: 8
ttgccaatgg tgatgacctg g                                          21

<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 9
acatcattca gcgcatgcac                                            20

<210> SEQ ID NO 10
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 10
gtaggccgcc ttaagctttc                                            20

<210> SEQ ID NO 11
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 11
cagcttgacc agacctagac                                            20

<210> SEQ ID NO 12
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 12
catcccagaa tcacaagcca                                            20

<210> SEQ ID NO 13
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 13
gagtcaagaa ggtggagcaa                                            20

<210> SEQ ID NO 14
<211> LENGTH: 20
<212> TYPE: DNA
<213> ORGANISM: Artificial Sequence
<220> FEATURE:
<223> OTHER INFORMATION: Description of Artificial Sequence: primer
```

<400> SEQUENCE: 14
tggtctggag tttctgacga                                          20

<210> SEQ ID NO 15
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 15
tgtgtttgta cgccttcgac                                          20

<210> SEQ ID NO 16
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 16
actgactgct ccaggaactc                                          20

<210> SEQ ID NO 17
<211> LENGTH: 22
<212> TYPE: DNA
<213> ORGANISM: Artificial Sequence
<220> FEATURE:
<223> OTHER INFORMATION: Description of Artificial Sequence: primer

<400> SEQUENCE: 17
gggactcgac atgattgata cc                                       22

<210> SEQ ID NO 18
<211> LENGTH: 22
<212> TYPE: DNA
<213> ORGANISM: Artificial Sequence
<220> FEATURE:
<223> OTHER INFORMATION: Description of Artificial Sequence: primer

<400> SEQUENCE: 18
actgttcctc tcatgtccgt aa                                       22

<210> SEQ ID NO 19
<211> LENGTH: 22
<212> TYPE: DNA
<213> ORGANISM: Artificial Sequence
<220> FEATURE:
<223> OTHER INFORMATION: Description of Artificial Sequence: primer

<400> SEQUENCE: 19
gagcatctta tacgctgaca tc                                       22

<210> SEQ ID NO 20
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 20
cagttcttgg catggttagg                                          20

<210> SEQ ID NO 21

```
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 21
tgcaaaggaa cacagtacca                                              20

<210> SEQ ID NO 22
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 22
ctcggatttc ttgctcctca                                              20

<210> SEQ ID NO 23
<211> LENGTH: 20
<212> TYPE: DNA
<213> ORGANISM: Artificial Sequence
<220> FEATURE:
<223> OTHER INFORMATION: Description of Artificial Sequence: primer

<400> SEQUENCE: 23
aggtcatgct ttcagaacga                                              20

<210> SEQ ID NO 24
<211> LENGTH: 22
<212> TYPE: DNA
<213> ORGANISM: Artificial Sequence
<220> FEATURE:
<223> OTHER INFORMATION: Description of Artificial Sequence: primer

<400> SEQUENCE: 24
cgtactccat cacaaagtac ag                                           22
```